US012218802B1

(12) United States Patent
Ros-Giralt et al.

(10) Patent No.: US 12,218,802 B1
(45) Date of Patent: Feb. 4, 2025

(54) DATA CENTER NETWORKS USING BOTTLENECK STRUCTURES

(71) Applicant: Reservoir Labs, Inc., San Diego, CA (US)

(72) Inventors: Jordi Ros-Giralt, Newport Beach, CA (US); Noah Amsel, New York, NY (US); Richard Lethin, New York, NY (US)

(73) Assignee: Reservoir Labs, Inc., San Diego, CA (US)

( * ) Notice: Subject to any disclaimer, the term of this patent is extended or adjusted under 35 U.S.C. 154(b) by 427 days.

(21) Appl. No.: 17/554,457

(22) Filed: Dec. 17, 2021

Related U.S. Application Data

(60) Provisional application No. 63/150,305, filed on Feb. 17, 2021.

(51) Int. Cl.
*H04L 41/14* (2022.01)
*H04L 47/127* (2022.01)
*H04L 49/1515* (2022.01)

(52) U.S. Cl.
CPC .......... *H04L 41/145* (2013.01); *H04L 47/127* (2013.01); *H04L 49/1515* (2013.01)

(58) Field of Classification Search
CPC .. H04L 41/145; H04L 47/127; H04L 49/1515
See application file for complete search history.

(56) References Cited

U.S. PATENT DOCUMENTS

| 8,107,458 | B1* | 1/2012 | Ranganathan | H04L 45/306 370/254 |
| 8,880,739 | B1* | 11/2014 | Brar | H04Q 3/0062 709/251 |
| 9,602,434 | B1* | 3/2017 | Saleh | H04J 14/08 |
| 2005/0195815 | A1* | 9/2005 | Chaudhuri | H04L 12/64 370/389 |
| 2012/0250574 | A1* | 10/2012 | Marr | H04L 41/12 370/254 |
| 2012/0250679 | A1* | 10/2012 | Judge | H04L 49/15 370/359 |
| 2014/0023084 | A1* | 1/2014 | Goldenberg | H04L 5/0058 370/400 |
| 2014/0245324 | A1* | 8/2014 | Minkenberg | G06F 9/546 719/313 |
| 2015/0103685 | A1* | 4/2015 | Butchko | H04L 43/55 455/67.14 |
| 2017/0054595 | A1* | 2/2017 | Zhang | H04L 41/0896 |
| 2017/0117966 | A1* | 4/2017 | Rickman | H04Q 11/00 |
| 2017/0195758 | A1* | 7/2017 | Schrans | H04Q 11/0066 |
| 2020/0120131 | A1* | 4/2020 | Soni | H04L 41/14 |
| 2021/0126870 | A1* | 4/2021 | Thiel | H04L 47/12 |
| 2022/0166705 | A1* | 5/2022 | Froese | H04L 43/10 |

* cited by examiner

*Primary Examiner* — Fadi Haj Said
(74) *Attorney, Agent, or Firm* — Seyfarth Shaw LLP

(57) ABSTRACT

Techniques are presented for designing a network based on its topology and the expected flow patterns in the network. The use of the latter can lead to efficient use of network resources and can minimize waster. Non-interference property of the expected flows can yield an optimal design.

16 Claims, 26 Drawing Sheets
(24 of 26 Drawing Sheet(s) Filed in Color)

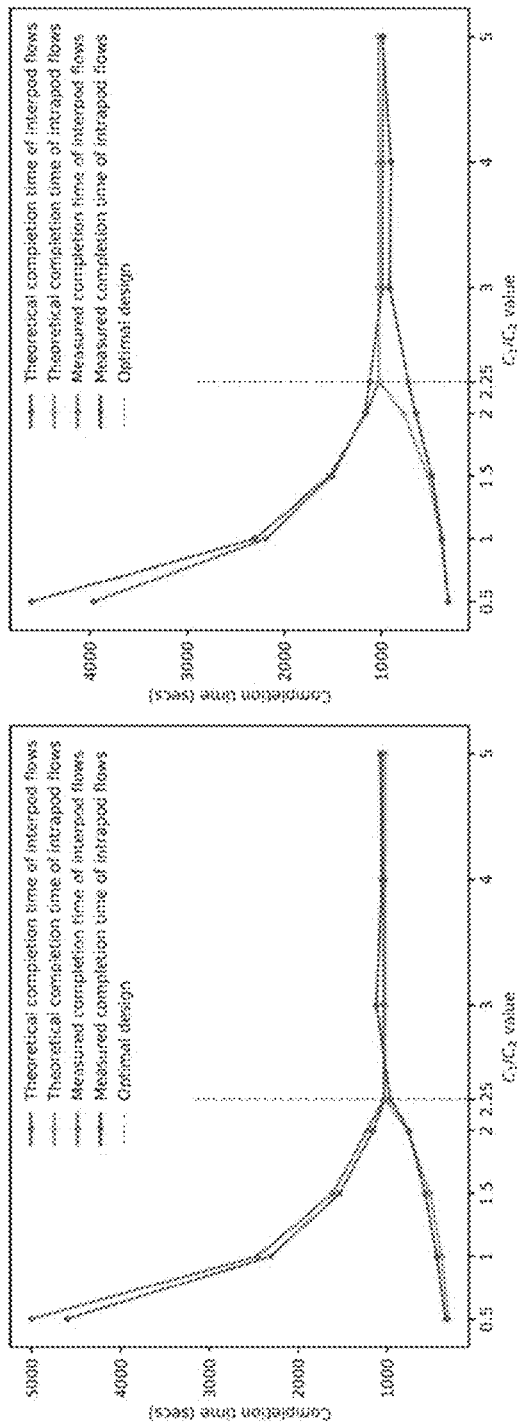
FIG. 11A
FIG. 11B
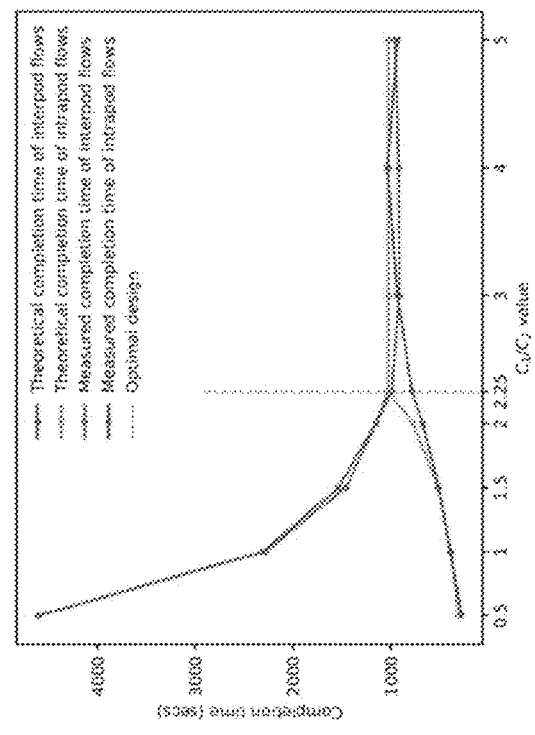
FIG. 11C

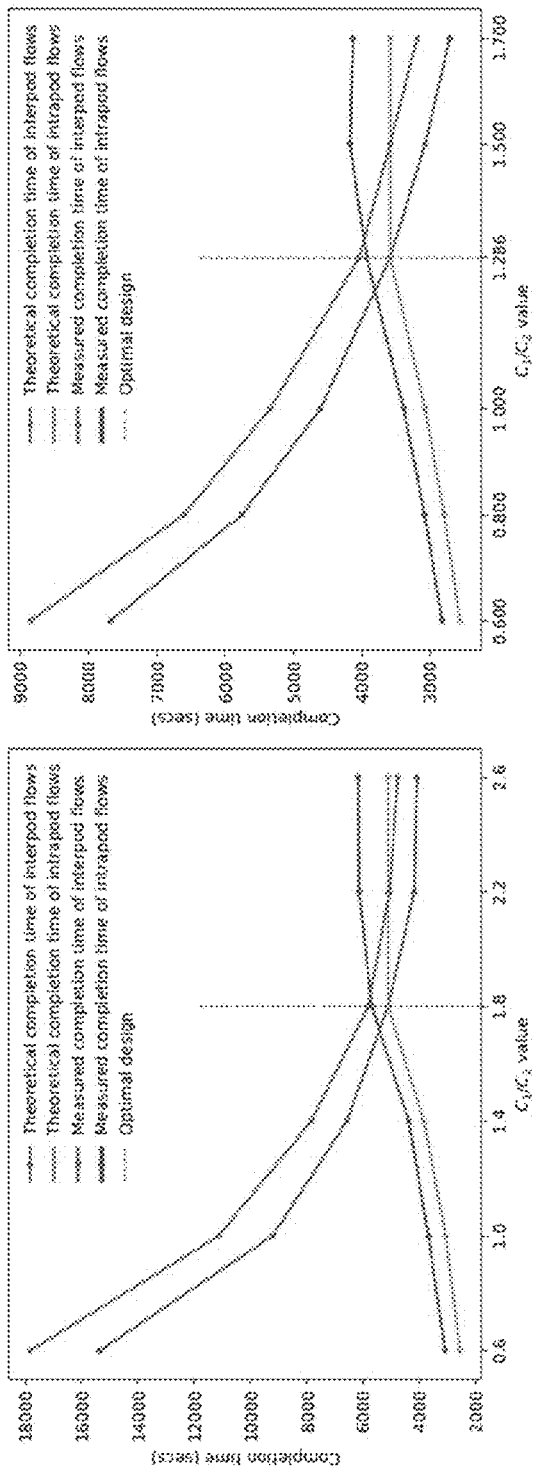
FIG. 14A
FIG. 14B
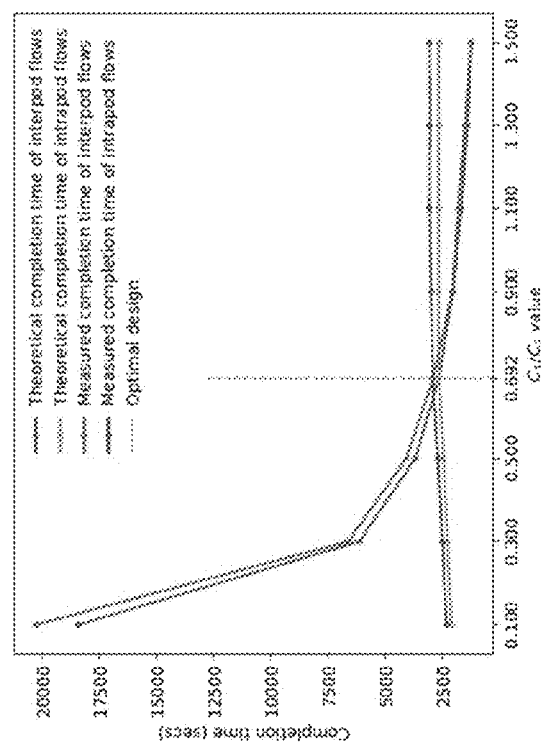
FIG. 14C

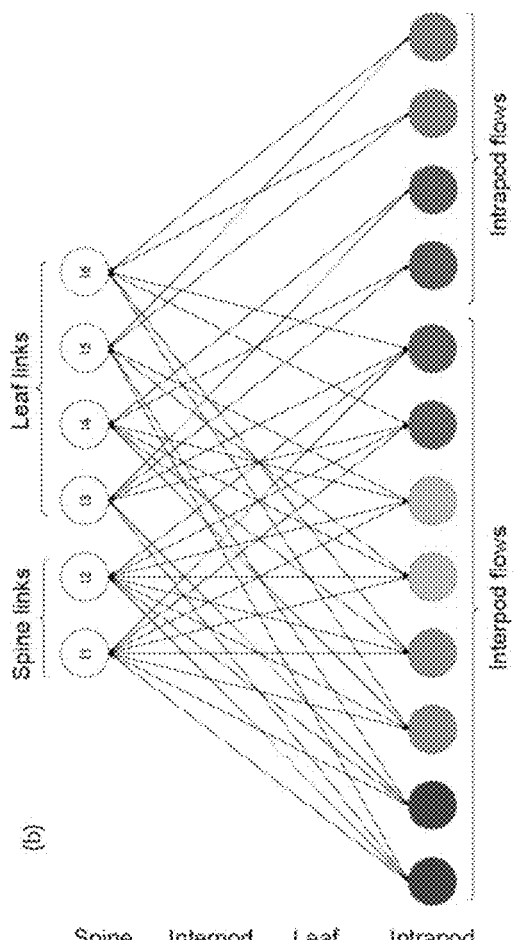
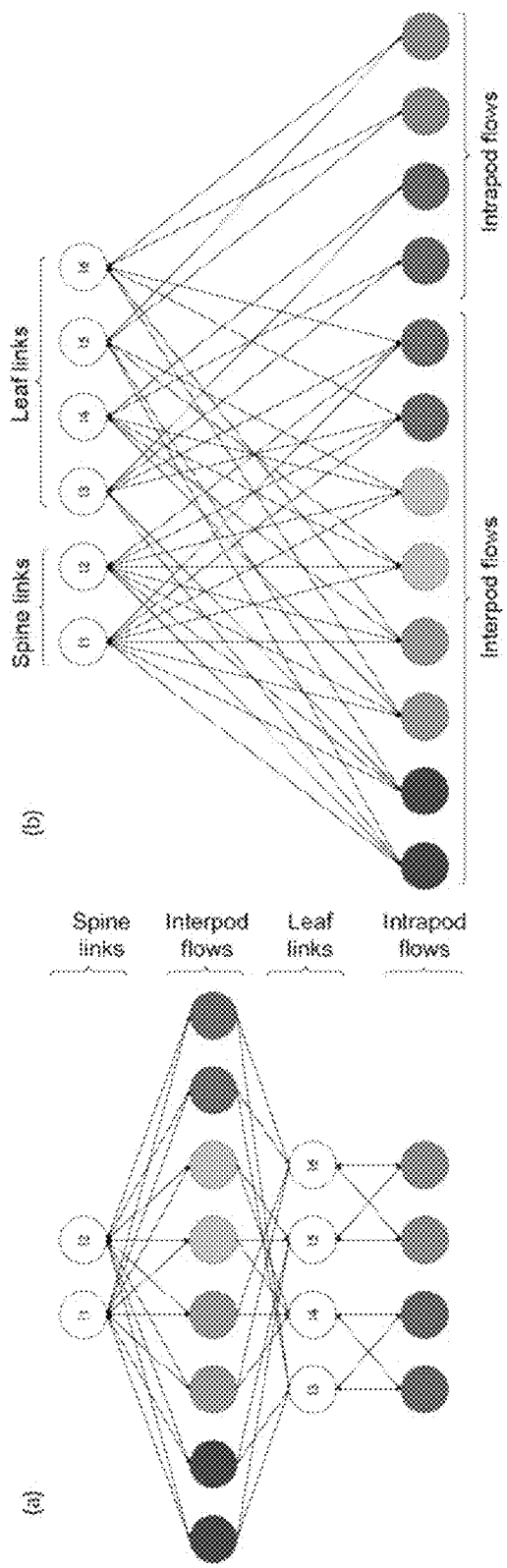
FIG. 21A
FIG. 21B
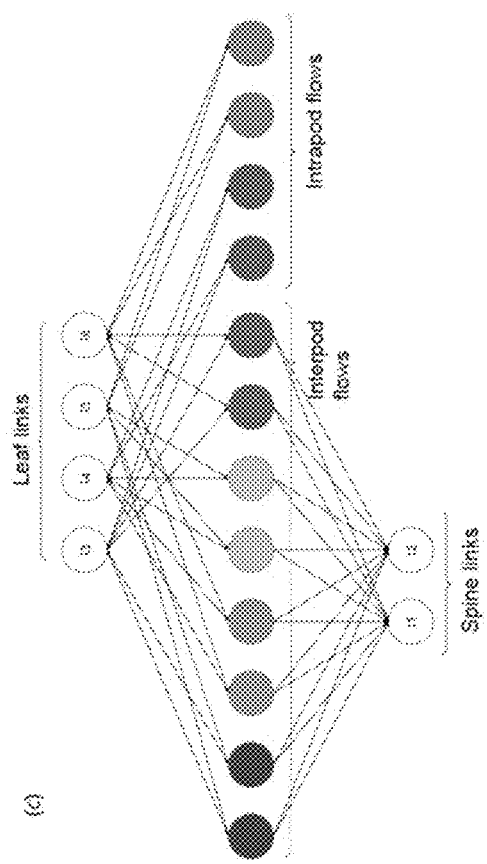
FIG. 21C

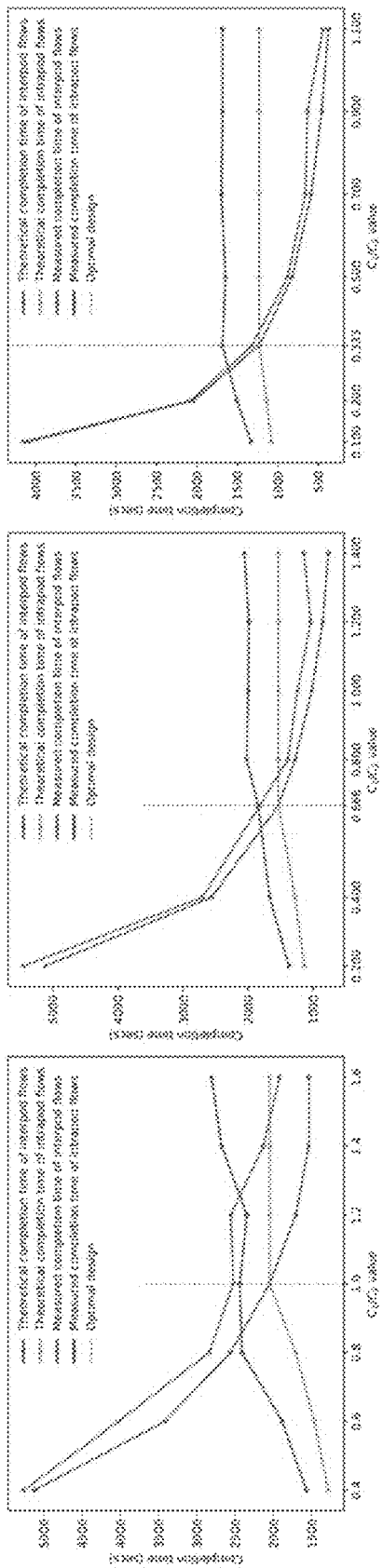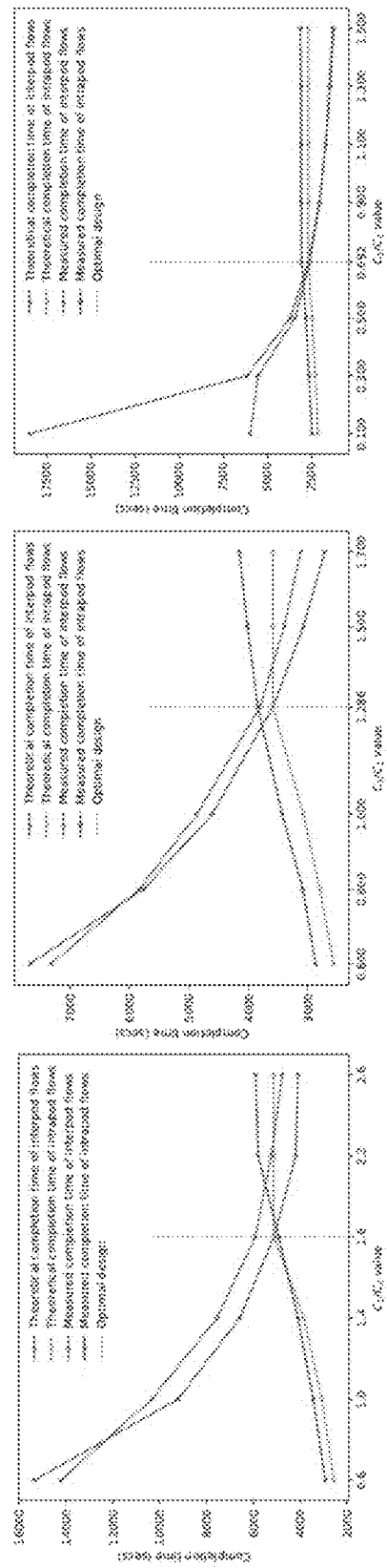
FIG. 28A  FIG. 28B  FIG. 28C
FIG. 29A  FIG. 29B  FIG. 29C

Table 1

FIG. 33

Table 2

FIG. 34

DATA CENTER NETWORKS USING BOTTLENECK STRUCTURES

CROSS-REFERENCE TO RELATED APPLICATIONS

This application claims priority to and benefit of U.S. Provisional Patent Application No. 63/150,305, titled "Design of Data Center Networks Using Bottleneck Structures," filed on Feb. 17, 2021, the entire contents of which are incorporated herein by reference.

GOVERNMENT LICENSE RIGHTS

This invention was made with government support under Contract No. DE-Sc0019523 awarded by the U.S. Department of Energy (DoE). The government has certain rights in the invention.

FIELD

This disclosure generally relates to networking systems and, in particular, to efficient design of networks.

BACKGROUND

Data center networks have been the subject of intense research in the networking community. While many different topologies have been proposed and studied, in our work we focus on three of the most widely used interconnects: fat-trees, folded-Clos and dragonflies. Folded-Clos is often the topology of choice in large-scale data centers. Al-Fares et al. demonstrated the scalability and cost-effectiveness of this class of interconnects. This and follow up work has produced an extensive literature around the subject of design and capacity planning driven by empirical production-scale experiments. Some publications provide an upper bound on network throughput for homogeneous topologies with the assumption that all switches are identical, and then experimentally demonstrate that random graphs achieve throughput close to the bound.

SUMMARY

Leiserson demonstrated that fat-trees are universally efficient interconnects. His work, however, did not take into account the effects of the congestion-control algorithms that are part of modern communication networks. In the discussion below, we show that, for congestion-controlled networks, full fat-trees are only cost-efficient when more traffic is sent between pairs of hosts that are farther apart than between hosts that are closer together. This implies that full fat-trees should not be used in interconnects that transport traffic with locality patterns. We also contribute to the understanding of fat-trees performance by identifying the set of link capacities that make a fat-tree optimal for a given traffic pattern.

To the best of our knowledge, regarding folded-Clos, the published work relies on empirical analysis only, and that our work is the first to provide a formal model that can help network architects identify optimal oversubscription configurations of a folded-Clos for a given traffic pattern.

Regarding the known techniques for homogeneous topologies our work differs from and may complement these techniques in two ways. First, we provide a general mathematical model of data centers that is applicable to both homogeneous and heterogeneous interconnects and reveals the designs that are simultaneously optimal in throughput and latency. Secondly, while in this work we focus on deterministic, well-structured topologies that allow us to derive closed-form symbolic equations of the optimal designs, it is also possible to use QTBS to perform non-symbolic numerical analysis. The proposed framework based on QTBS modeling may be used to numerically model and study the performance of unstructured topologies such as random graphs.

In order to address these problems, various techniques and embodiments described below can be used to design a network based on its topology (such as fat tree, folded-Clos, Dragonfly, etc.) and the expected flow patterns in the network. In particular, the proposed design technique described below can ensure minimization of the waste of network resources, e.g., link capacity, the number of switches/routers used, etc., can be minimized. Furthermore, we present techniques to ascertain whether the expected flow pattern is interference free (as described below). For such patterns, an optimal network design that avoids the waste of network resources without adversely affecting the throughput can be achieved.

This is enabled, in part, by deriving the bottleneck structures for a given network and using it to demonstrate the correctness of a relationship between network resources/parameters (e.g., link capacities, number of switches, etc.) and the flow pattern, which may be expressed as pairs of host-to-host flows (represented by flow sizes). The flow pattern may also include a measure of skewedness of the flows at different switch levels of the network.

Accordingly, in one aspect a method is provided for selecting a network parameter. The method includes performing by a processor the step of obtaining expected traffic pattern for a network, where the network has several levels of switches and corresponding links. The method also includes selecting a network parameter corresponding to a switch or link at a selected level based on, in part, a portion of the expected network traffic associated with that switch or link. For example, the capacity of a link may be proportional to the portion of the size of the expected network traffic traversing the link. The number of switches at a particular level may be proportional to the size of the expected traffic traversing links at that level.

In some embodiments, the method includes determining from the expected traffic pattern skewedness of the traffic. The network parameter may be selected based on, in part, the skewedness. The network parameter may also be based on, in part, a tapering parameter that is based on, in part, the skewedness.

In some embodiments, the network comprises a fat-tree network. The network parameter may include capacity of links at a particular level of switches. Selecting the capacity of links at one level of switches may be based on, in part, capacity of links at another level of switches. In some embodiments, the network comprises a folded-Clos network. The network parameter may include a number of spine blocks of the folded clos network. Selecting the number of spine blocks may be based on, in part, a radix of spine-level switches. All switches in the folded-Clos network may have the same radix.

In some embodiments, the network is or includes a Dragonfly network. The network parameter includes a capacity of interpod links and a capacity of intrapod links. Selecting the capacity of interpod links may be based on, in part, the capacity of intrapod links. The Dragonfly network may be canonical, and the capacity of interpod links may further be based on, in part, a number of switches in each pod of the canonical Dragonfly network. In some embodiments, the method includes iteratively partitioning pods in the Dragonfly network into several groups. Selecting the capacity of interpod links may further be based on, in part, a total number of groups and a total number of pods in a last group.

The capacity of a link at one of the several levels may be selected to be proportional to an expected size of flows traversing that link. The capacity of a link at one of the several levels may be selected based on a specified time of completion of all expected network flows.

In some embodiments, the method further includes obtaining an updated traffic pattern, and updating the network parameter based on, at least in part, the updated traffic pattern. The network may be an overlay network. The network may be or include a sliced network having several virtual network slices. Selecting the network parameter may include selecting a corresponding network parameter of at least one network slice.

The network, as described by its topology, may be a jellyfish network, a ring network, a torus network, or a butterfly network. The network may include a data network, a network-on-a-chip (NOC), a transportation network, an energy distribution network, a fluidic network, or a biological network.

In another aspect, a system is provided for selecting a network parameter. The system includes a first processor and a first memory in electrical communication with the first processor. The first memory includes instructions that, when executed by a processing unit that includes one or more computing units, where one of such computing units may include the first processor or a second processor, and where the processing unit is in electronic communication with a memory module that includes the first memory or a second memory, program the processing unit to: obtain expected traffic pattern for a network, where the network has several levels of switches and corresponding links.

The instructions also program the processing unit to select a network parameter corresponding to a switch or link at a selected level based on, in part, a portion of the expected network traffic associated with that switch or link. For example, the capacity of a link may be proportional to the portion of the size of the expected network traffic traversing the link. The number of switches at a particular level may be proportional to the size of the expected traffic traversing links at that level. In various embodiments, the instructions can program the processing unit to perform one or more of the method steps described above.

In another aspect, a network includes a number of levels of switches and corresponding links, and a network parameter corresponding to a switch or link at a selected level is proportional to an aggregate expected network traffic associated with that switch or link. The network parameter may be based on, in part, a skewedness of the expected network traffic. In some embodiments, the network parameter is based on, in part, a tapering parameter that is based on, in part, the skewedness.

The topology of the network may be fat-tree, where the network parameter includes a capacity of links at a particular level of switches. The capacity of links at one level of switches may be based on, in part, capacity of links at another level of switches.

The topology of the may be folded-Clos, where the network parameter may include a number of spine blocks of the folded clos network. The number of spine blocks may be based on, in part, a radix of spine-level switches. In some embodiments, the topology of the network is Dragonfly, and the network parameter may include a capacity of interpod links and a capacity of intrapod links. The capacity of interpod links may be based on, in part, the capacity of intrapod links. The topology of the network may also be canonical Dragonfly. In that case, the capacity of interpod links may further be based on, in part, a number of switches in each pod of the canonical Dragonfly network. The capacity of interpod links is based on, in part, a total number of groups obtained by iteratively partitioning pods in the Dragonfly network into a plurality of groups, and a total number of pods in a last group.

In some embodiments, a capacity of a link at one of the number of levels is proportional to an expected size of flows traversing that link. A capacity of a link at one of the several levels may be based on a specified time of completion of all expected network flows. The network parameter may be based on, at least in part, an updated traffic pattern. A type of the network may be overlay network. In some embodiments, the network includes a number of virtual network slices, and the network parameter may include a corresponding network parameter of at least one network slice.

The topology of the network may include a jellyfish topology, a ring topology, a torus topology, or a butterfly topology. The type of the network can be a data network, a network-on-a-chip (NOC), a transportation network, an energy distribution network, a fluidic network, or a biological network.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings:

FIGS. 11A-11C respectively show the flow completion times for a FT(3,2) network according to one embodiment for uniform traffic that is controlled using three different congestion-control algorithms, namely, BBR, Cubic, and Reno;

FIGS. 14A-14C show the Flow completion times for a FT(3,2) network according to one embodiment, when three different congestion control algorithms are applied;

FIGS. 21A-21C show three different bottleneck structures for a fat tree FT(2,2) network, according to three possible network designs;

FIGS. 28A-28C respectively show the flow completion times for different designs of a fat tree FT(2,2) network for three different values of traffic skewedness network, where Reno was employed for congestion control;

FIGS. 29A-29C respectively show the flow completion times for different designs of a fat tree FT(3,2) network for three different values of traffic skewedness network, where Cubic was employed for congestion control;

FIGS. 33 and 34 show sample tables that can be used to identify optimal designs based on traffic patterns and for different degrees of skewedness.

DETAILED DESCRIPTION

1 Introduction

Figure 1:
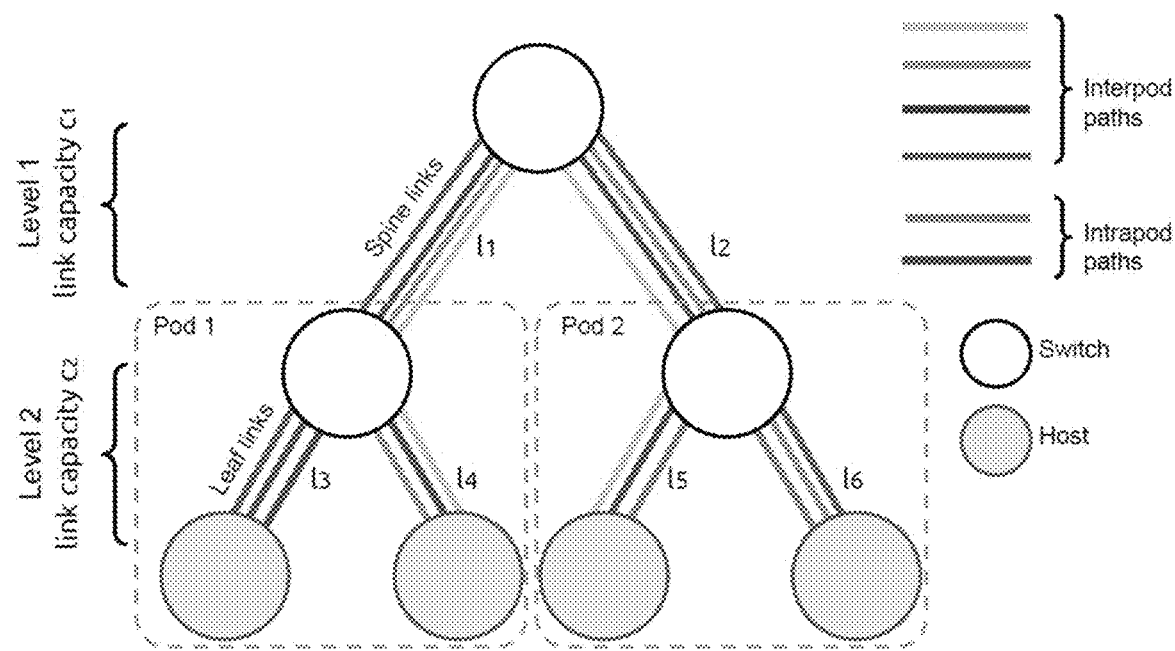
FIG. 1 depicts an example fat-tree network with two levels and two children per switch, denoted as FT(2,2)

The discussion below provides a mathematical model of data center performance based on Quantitative Theory of Bottleneck Structures (QTBS). Using the model, we prove that if the traffic pattern is interference-free, there exists a unique optimal design that both minimizes maximum flow completion time and yields maximal system-wide throughput. We show that interference-free patterns correspond to the important set of patterns that display data locality properties and use these theoretical insights to study three widely used interconnects-fat-trees, folded-Clos and dragonfly topologies. We derive equations that describe the optimal design for each interconnect as a function of the traffic pattern. Our model predicts, for example, that a 3-level folded-Clos interconnect with radix 24 that routes 10% of the traffic through the spine links can reduce the number of switches and cabling at the core layer by 25% without any performance penalty. We present experiments using production TCP/IP code to empirically validate the results and provide tables for network designers to identify optimal designs as a function of the size of the interconnect and traffic pattern.

Data centers are some of the largest centrally-managed networks in the world, responsible for storing, computing and distributing large amounts of data. Driven by ever increasing machine-to-machine workloads, network researchers and architects have focused on identifying data center topologies and designs that are able to scale and deliver high-performance at low cost. The steep cost of building and operating these interconnects motivates data centers to employ techniques such as oversubscription and bandwidth tapering, which allow them to optimize the performance-cost trade-off. However, because little is known about the mathematical principles that drive the performance of data center interconnects, network architects are forced to either take conservative approaches that waste bandwidth and unnecessarily increase costs or to use trial-and-error methodologies that are operationally very costly.

In the discussion below, we position a formal mathematical model of data center networks. We begin from the assumption that the network is congestion-controlled. Congestion control is implemented as part of the TCP and InfiniBand protocols used in many data center networks. Congestion control algorithms are designed to regulate traffic according to the following principle: maximize the throughput of each flow while ensuring fairness among flows. This principle ensures that the resources of the network are not wasted (which would not maximize throughput) and that no flow is entirely starved of the bandwidth it needs (which would be unfair).

A technique we reported, called Quantitative Theory of Bottleneck Structures (QTBS), builds on this assumption to create a mathematical model of congestion-controlled networks. QTBS is described in our co-pending U.S. patent application Ser. No. 16/580,718, (the "'718 application) titled "Systems and Methods for Quality of Service (QOS) Based Management of Bottlenecks and Flows in Networks," filed on Sep. 24, 2019; co-pending U.S. patent application Ser. No. 17/373,261 (the "'261 application") titled "Computationally Efficient Analysis and Management of Systems Modeled as Networks," filed on Jul. 12, 2021; and in co-pending U.S. patent application Ser. No. 17/459,387, (the "'387 application) titled "Manipulating Bottlenecks in Systems Modeled as Networks" filed on Aug. 27, 2021. Each of the '718 application, the '261 application, and the '387 application is incorporated herein by reference in its entirety. In the discussion below, we use QTBS to study the problem of designing data center networks. Our model predicts how a data center network will perform for a given traffic pattern. This allows us to derive optimal network designs and identify wasteful ones using our model alone, without resorting to costly trial-and-error deployments. For instance, the model reveals that a 3-level folded-Clos interconnect with radix 24 that routes 10% of the traffic through the spine links can reduce the number of switches and cabling at the core layer by 25% without any performance penalty.

2 Theoretical Background 2.1 Network Model

In our network model, a data center includes a set of hosts that are interconnected using a set of links. Each link has a finite capacity and hosts communicate with each other using flows. A flow between a pair of hosts traverses a subset of the links, which we call its path. We assume the network is regulated by a congestion control algorithm that determines the transmission rate of each flow according to the following principle: maximize the throughput of each flow while ensuring fairness among flows. More specifically, our mathematical model assumes the congestion control algorithm determines the rate of each flow according to the well-known max-min fairness criterion. While we acknowledge that production-grade congestion control algorithms do not precisely act according to max-min fairness, the max-min assumption has been demonstrated to enable a powerful mathematical model of the network that can be used to analyze and predict network performance.

Our work builds on the quantitative theory of bottleneck structures (QTBS) that we introduced in the '718 application, the '261 application, and the '387 application. QTBS provides a general-purpose mathematical framework to model communication networks.

Because of its predictive power, QTBS can be used to address a wide variety of communication problems such as traffic engineering, routing, flow scheduling, network design, capacity planning, resiliency analysis, network slicing, or service level agreement (SLA) management, among others, by incorporating an understanding of congestion control into its solution. In the discussion below, we rely on the QTBS model to develop a formal framework to design data center interconnects.

2.2 Designing Data Center Networks

In our framework, we assume that network architects are given a class of topology (e.g., folded-Clos) and the required size of the interconnect (i.e., the number of hosts to be connected). Their objective then is to set the capacity of each link so that the interconnect achieves maximal performance at the lowest possible cost. We refer to an assignment of capacity values to the links of an interconnect as a design:

Definition 2.1. Network design. Let $\mathcal{L}$ be the set of links in a given data center network. A network design (or simply a design) is a function c: $\mathcal{L} \to \mathbb{R}_{>0}$ mapping each link to its capacity. We use the notation $c_l$ interchangeably with c(l).

Careful network design is increasingly important, as improper allocation of bandwidth in an interconnect can lead to wasteful capital and operational expenditures at the scale of modern data centers. In performing our analysis, we need two kinds of inputs: information about the topological structure of the network and assumptions about the traffic pattern that it needs to support. We describe the topologies we study in detail in Sections 3 (fat-trees), 4 (folded-Clos), and 5 (dragonflies), where the mathematical framework for each specific interconnect is presented. As for the traffic pattern, we characterize it as follows:

Definition 2.2. Traffic Pattern. Let $\mathcal{H}$ be the set of hosts in a given interconnect. Then a traffic pattern is a function b: $\mathcal{H} \times \mathcal{H} \to \mathbb{R}_{\geq 0}$ mapping each ordered pair of hosts to the amount of data (e.g., in bits) to be transmitted from the first to the second.

We say that the traffic pattern is uniform if all pairs of hosts transmit the same number of bits, and skewed otherwise. We use the shorthand $\mathcal{F} = \mathcal{H} \times \mathcal{H}$ to denote the set of data flows connecting every pair of hosts in the network. We assume that for each ordered pair of hosts h, h'$\in \mathcal{H}$, there exists a single data flow f transmitting b(f) data from h to h'. We can now introduce our criteria for evaluating a network's performance:

Definition 2.3 Network completion time. Let $\mathcal{L}$ and $\mathcal{F}$ be the sets of links and flows, and let b be the traffic pattern. Assume all flows start transmitting data at the same time. For a given design c, let fct(b,c,f) be the time it takes for flow f to complete transmitting its b(f) units of data. Then, $\mu(b,c) = \max_{f \in \mathcal{F}}$ fct(b,c,f) is the completion time of the network for the given traffic pattern and design.

Since network completion time refers to the time it takes to complete the longest duration flow, minimizing network completion time provides a mechanism for reducing flow completion time tail. The latter is widely regarded as one of the key performance metrics in data centers, because a large flow completion time tail causes latency and jitter, harming application performance. In the discussion herein, we show that the optimal designs derived from our framework equalize the completion time of all flows (see Theorem 2.10), thus reducing to zero the tail of the flow completion time distribution. Moreover, network completion time is closely connected to network throughput, another key metric of system-wide performance, as follows. Assume that instead of just one flow f between each pair of hosts, the traffic pattern now contains n identical copies of f (or n copies of the original batch), each of which transmits the same amount of data b(f). Unlike before, flows can be scheduled arbitrarily, and flows from different batches may be transmitting simultaneously. The throughput of a network measures the average rate at which it can transmit data as the number of batches grows:

Definition 2.4 Network throughput. For a given traffic pattern b and design c, let bct(b,c,n) be the smallest possible time to complete transmitting n batches when using the best scheduling. Then, the network throughput of the design is $$T(b, c) = \lim_{n \to \infty} n/bct(b, c, n).$$

Note that if the network completion time is $\mu(b,c)$, the throughput is at least $1/\mu(b,c)$, since one can simply schedule the batches sequentially. In some cases, it is possible to achieve higher throughput by scheduling batches to partially overlap. However, this scheduling harms latency; the first batch takes longer to complete, since it must now share resources with the second batch. Designers must balance the goals of achieving high performance and low cost. Requirements differ from case to case, and so the best design depends on context. However, some designs are simply wasteful in that their cost is unnecessarily high for the level of performance they achieve. Ideally, a network is designed so that all of its capacity is utilized throughout the transmission of the traffic pattern. Intuitively, this means that the resources of the network are being used efficiently, as the operator is not paying for bandwidth that is idle. In this case, scheduling successive batches sequentially achieves optimal throughput without sacrificing latency. Since no bandwidth is wasted during transmission of the first batch, it is impossible to increase throughput by packing in flows from the second batch. The following definition and theorem capture this intuition and relate it to the criteria discussed above:

Definition 2.5 Wasteless designs. For a given topology and traffic pattern b, a design c is wasteless if all the bandwidth of each link is used throughout the transmission. That is, $\forall t \in [0, \mu(b,c)]$, $\Sigma_{f \in \mathcal{F}_l} r_{c,b}(f,t) = c(l)$, where $\mathcal{F}_l$ is the set of flows that traverse l and $r_{c,b}(f,t)$ is the rate of flow f at time t for design c and traffic pattern b according to the congestion control algorithm.

THEOREM 2.6. Optimality of wasteless designs. For a given topology and traffic pattern, if a design c is wasteless, then it is impossible to improve on the network completion time or network throughput of the design without adding more capacity. That is, if c' is an alternative design for which $\mu(b,c') < \mu(b,c)$ or $T(b,c') > T(b,c)$, then $\Sigma_{l \in \mathcal{L}} c'(l) > \Sigma_{l \in \mathcal{L}} c(l)$.

Proof. See Appendix A.1

Intuitively, for a given topology, a wasteless design achieves the best possible performance for a fixed cost, where cost is a function of the total capacity of the network. Note that in production networks, operators typically do not design interconnects to be wasteless. Rather, networks are provisioned with extra capacity to accommodate for potential link failures and to protect latency-sensitive flows that can arrive at arbitrary times. However, network designers must know how to provision their networks before they can know how to overprovision them. That is, they need to first identify the optimal design they would use if link failures, latency, and traffic variability did not exist, and then provision excess capacity to accommodate for these factors on top of the base design. Identifying the wasteless design first gives network designers a principled, quantitative way to tell how much they are overprovisioning each link. Our framework aims to help operators identify this base design.

2.3 Proportional Designs

To address the data center design problem described above, we introduce the following class of designs:

Definition 2.7. Proportional Designs. For a given traffic pattern b, a design c is proportional if each link's capacity is proportional to the sum of the sizes of the flows that traverse it. That is, $$c(l) = \alpha \sum_{f \in \mathcal{F}_l} b(f)$$

for some $\alpha > 0$, where $\mathcal{F}_l$ is the set of flows that traverse l.

In some cases, the capacity of each link can be selected directly, e.g., by selecting the number of cables (e.g., fiber-optic cables) in a link and/or by selecting the bandwidth for a link (e.g., a wireless link). In other cases (such as for a folded-Clos network), the link capacity can be selected indirectly, by selecting the number of switches to be used at a particular level. For example, in a folded-Clos network, a certain capacity is provided between two or more pods at a particular level if a single switch (or a single pair of switches) is provided at the next level. A certain specified number of links having pre-selected capacities are typically coupled to each switch (or switch pair), resulting in a fixed capacity for routing traffic via that switch (or switch pair). That capacity can be multiplied by adding more switches (or switch pairs) at the next level.

A proportional design exists for any topology and traffic pattern and is unique up to the scaling factor $\alpha$. By choosing $\alpha$, one can create a proportional design that achieves any desired level of performance. Our main theoretical result motivates the use of proportional designs: proportional designs are optimal in the sense that no other design can achieve zero waste, as shown next.

THEOREM 2.8. Non-proportional designs waste bandwidth. If a design wastes no bandwidth on a given traffic pattern, then it is the proportional design for that traffic pattern.

Proof. See Appendix A.2.

The converse of this theorem is not true in general, because for some traffic patterns, it is impossible not to waste bandwidth even if a proportional design is used. (For an example, see Lemma 3.3.)

The following definition and theorem give a sufficient condition on the traffic pattern to ensure that a wasteless design exists (and, by extension, that the proportional design is wasteless):

Definition 2.9. Interference-free. For a given topology, a traffic pattern b is said to be interference-free if each flow f traverses some link l that is traversed by no flow that transmits more bits than f. That is, $\forall f \in \mathcal{F}$, $\exists l \in \mathcal{L}$ s.t. $f \in \text{argmax}_{f' \in \mathcal{F}_l} b(f')$.

Theorem 2.10. Interference-free proportional designs are wasteless. If the traffic pattern is interference free, then the proportional design wastes no bandwidth and all flows finish transmitting at the same time.

Proof. See Appendix A.3.

To sum up, the above theorem shows that if a traffic pattern is interference free, then proportional designs (and only proportional designs) have all of the following optimality properties: (1) no bandwidth is wasted; (2) all flows terminate at the same time; (3) the network completion time is the smallest possible without adding more capacity to the network; (4) the network throughput is as large as possible without adding more capacity to the network. Further, in the following sections, we show that typical data center traffic patterns that display locality properties are interference-free, ensuring that proportional designs are optimal in these ways.

3 Designing Fat-Tree Networks

Fat-trees are a popular class of topologies first introduced by Leiserson. As he demonstrated, fat-trees are universally efficient networks in the following sense: for a given network size s, a fat-tree can emulate any other network of that size s with a performance slowdown at most logarithmic in s. This property makes fat-tree topologies highly competitive and is one of the reasons they are widely used in large-scale data centers and high-performance computing (HPC) networks. A fat-tree is a complete n-ary tree that satisfies the condition $c_l > c_{l'}$ for pairs of links such that l is nearer to the root than l'. Fat-trees are said to be full if every level has the same total capacity, that is:

$$\Sigma_{\forall l \in \mathcal{L}_i} c_l = \Sigma_{\forall l \in \mathcal{L}_j} c_{l'} \text{ for } 1 \leq i,j \leq L, \quad (1)$$

where $\mathcal{L}_i$ is the set of links at level i of the tree and L is the tree's total number of levels.

We will use the notation FT(n,L) to denote a fat-tree in which each switch has n children and the total number of levels is L. (Note that L is half the diameter of the fat-tree.) For example, FIG. 1 shows the topology of a FT(2,2). We will also consider a generalization of fat-trees in which nodes at different levels of the tree may have different numbers of children, so long as all nodes at a single given level have the same number of children. We use the notation FT($[n_1, n_2, \ldots, n_L]$) to denote such a tree, where each switch at level i of the tree has $n_i$ children—thus, FT(n,L)= FT([n, n, ..., n]). Note that because there is only a single path between every pair of hosts, routing can be straightforward.

For the specific case of fat-trees with 2-levels (L=2), we adopt the common terminology of spine and leaf links to refer to the upper-level links (connected to the root) and the lower-level links (connected to the hosts), respectively. We also use the terms interpod and intrapod paths to refer to paths that traverse the spine links and paths that traverse only the leaf links, respectively. Because every host communicates with every other host, each path accommodates two flows, one in each direction. For instance, the topology FT(2,2), shown in FIG. 1, has four hosts, two interpod links, four intrapod links, four interpod paths, two intrapod paths, eight interpod flows and four intrapod flows.

In our analysis, we will assume all links at level i of a fat-tree have the same capacity value $c_i$, as is the case in most production deployments. For the widely used case of 2-level n-ary fat-trees (L=2), we refer to the design parameter $\tau = c_1/(n \cdot c_2)$ as the tapering parameter of the network. It is easy to see from Equation (1) that $\tau = 1$ is the case of a full fat-tree, providing the full bisectional bandwidth in all fat-tree levels. In general, this parameter is the ratio of the actual spine link capacity divided by the spine link capacity of a full fat-tree network with the same leaf link capacity as the given network. The tapering parameter $\tau$ determines the performance/cost trade-off of the interconnect: increasing $\tau$ improves performance but it also increases the cost of the interconnect, and vice versa. This parameter also characterizes the degree to which the spine links are oversubscribed, usually expressed with the notation $1/\tau:1$. For instance, an FT(n,2) design with a tapering parameter of 0.5 is oversubscribed by a factor of 2:1.

3.1 Design Equations for Uniform Traffic

We start by solving the fat-tree design problem under the assumption of uniform traffic:

LEMMA 3.1. Optimal fat-tree with uniform traffic. Consider a generalized fat-tree FT($[n_1, n_2, \ldots, n_L]$) and let $c_i$ be the capacity of its links at level i, for $1 \leq i \geq L$. Then, if the traffic pattern is uniform, it is interference-free and the following design is optimal:

$$c_i = \frac{\rho_i}{\rho_L} c_L \quad (2)$$

where $$\rho_i = 2\left(\prod_{j=1}^{i} n_j - 1\right) \prod_{j=i+1}^{L} n_j^2 \quad (3)$$

Proof. See Appendix A.5.

This equation comes from applying the definition of a proportional design to a fat-tree with uniform traffic. Furthermore, since the uniform traffic pattern is interference-free, Theorem 2.10 states that this design equalizes the completion time of all the flows. Under the assumption of uniform traffic where all hosts send the same amount of data to each other, this is equivalent to equalizing the throughput of all the flows.

For example, the set of optimal two-level fat-trees FT(n,2) can be derived by using Equations (2) and (3) while setting L=2 and $n_1=n_2=n$, where n is the number of children of each switch in the tree. Doing some simple algebraic manipulations, this leads to the following optimal design:

$$c_1 = \frac{n^2}{n+1} c_2 \quad (4)$$

Figure 2:
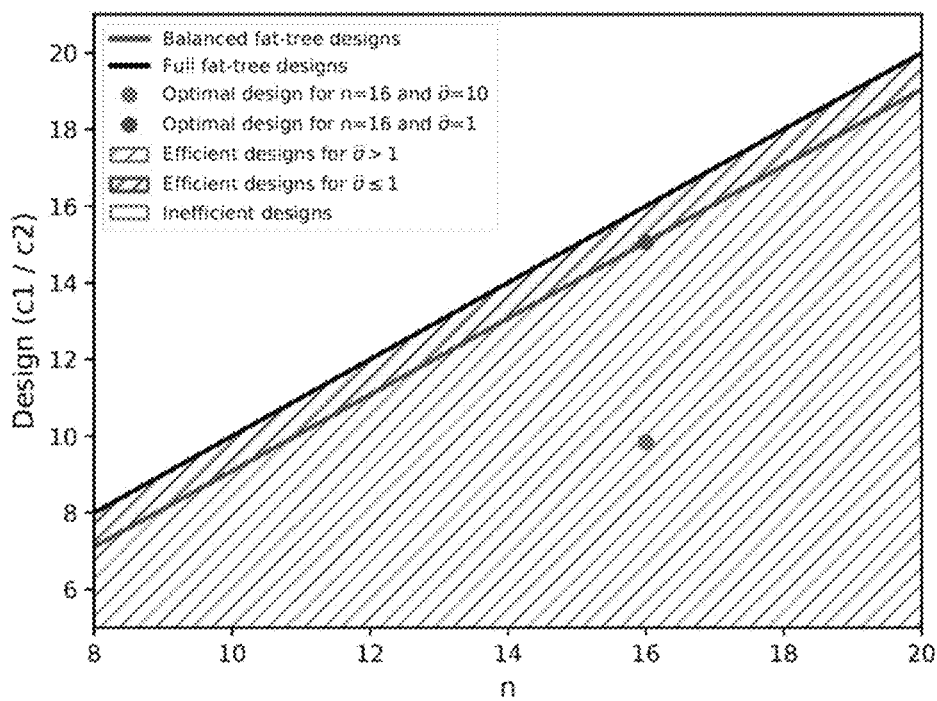
FIG. 2 depicts the design space for a FT(n,2) network according to various embodiments.

FIG. 2 represents the above designs using a red line. For a fixed leaf link capacity, the capacity of spine links increases quasi-linearly. Of special interest is also the set of designs corresponding to the full fat-tree solution, represented by the equation $c_1 = n \cdot c_2$ and shown in FIG. 2 as a black line. We can see that a full fat-tree is not an optimal design when traffic is uniform, because some of the bandwidth of the spine links goes to waste. In other words, the network operator is paying for bandwidth in the spine links that is never used. In the next section, we generalize this analysis of fat trees to skewed (non-uniform) traffic patterns.

3.2 Design Equations for Skewed Traffic

We now introduce the general equations of an optimal fat-tree design for skewed traffic:

LEMMA 3.2. Optimal fat-tree with skewed traffic. Consider a generalized fat-tree FT($[n_1, n_2, \ldots, n_L]$) and let $c_i$ be the capacity of its links at level i, for $1 \leq i \leq L$. Assume a traffic pattern b(f)=$\sigma_i$, where f is a flow that traverses a link in level i, but no link in level i−1. such that a flow that goes through all levels of the tree transmits $\sigma_1$, and a flow between a pair of hosts that are nearest neighbors in the tree transmits $\sigma_L$. If $i \leq j \sigma_i \leq \sigma_j$ for all $1 \leq i,j \leq L$, then the traffic pattern is interference free and the following design is optimal:

$$c_1 = \pi_1 \sigma_1 \quad (5)$$

$$c_i = \pi_i \sigma_i + \frac{c_{i-1}}{n_i} \quad (6)$$

where $$\pi_i = (n_i - 1) \prod_{j=i+1}^{L} n_j^2 \quad (7)$$

Proof. See Appendix A.6.

In addition to providing the equations of the optimal design, the above lemma characterizes the set of interference-free traffic patterns in a fat-tree topology. In particular, a traffic pattern is interference free if $i \leq j \Rightarrow \sigma_i \leq \sigma_j$ for all $1 \leq i,j \leq L$. This corresponds precisely to the set of traffic patterns that display locality properties—patterns where hosts transmit more data to others hosts in their same pod than to hosts in other pods. Because good design principles dictate that operators should map applications onto a data center by exploiting data locality, from a design standpoint, we reason that interference-freeness is the property that characterizes the set of interesting traffic patterns to achieve best performance in data center networks.

Applying some algebraic manipulations on Equations (5), (6) and (7), we can derive the set of optimal designs for a 2-level fat-tree FT(n,2) by setting L=2, $n_1=n_2=n$, and letting $\sigma=\sigma_2/\sigma_1$, which leads us to:

$$c_1 = \frac{n^2}{n+\sigma} c_2 \quad (8)$$

Note that the above equation corresponds to Equation (4) when traffic is uniform.) This leads to the following optimal tapering parameter:

$$\tau = \frac{c_1}{n \cdot c_2} = \frac{n}{n+\sigma} \quad (9)$$

Or, equivalently, an oversubscription of $(n+\sigma)/n$:1. For instance, a FT(16, 2) in which intrapod flows carry ten times more traffic than interpod flows ($\sigma=10$) has an optimal tapering parameter $\tau=0.61538$ (an oversubscription of 1.625:1), yielding the design $c_1/c_2=9.8462$. This design is shown in FIG. 2 as a blue dot. Similarly, the same interconnect with uniform traffic ($\sigma=1$) has an optimal tapering parameter $\tau=0.94118$ (an oversubscription of 1.0625:1), yielding the design $c_1/c_2=15.0588$. This design is shown in FIG. 2 as a green dot.

The following lemma characterizes the design space of fat-trees FT(n,2):

LEMMA 3.3. Design space of fat-trees FT(n,2). Consider a fat-tree FT(n,2) and let $c_1$ and $c_2$ be the capacity of its spine and leaf links, respectively. Without loss of generality, let b(f)=1 for interpod flows, and b(f)=$\sigma$ for intrapod flows. Then,
1. If $\sigma \geq 1$, the optimal design satisfies $c_1 \leq n^2 \cdot c_2/(n+1)$.
2. If $0<\sigma<1$, the proportional design satisfies $n^2 \cdot c_2/(n+1) < c_1 < n \cdot c_2$, but every design wastes bandwidth.
3. If $\sigma=0$, the optimal design corresponds to $c_1 = n \cdot c_2$.
Proof. See Appendix A.7.

This lemma can be generalized in a straightforward manner to support FT([$n_1, n_2, \ldots, n_L$]). Lemma 3.3 is pictured in FIG. 2 as follows. The region of optimal designs for traffic patterns such that $\sigma \geq 1$ (traffic patterns that are interference-free) is marked with gray hash lines. It is delimited by the optimal design line for uniform ($\sigma=1$) traffic $c_1=n^2 \cdot c_2/(n+1)$, shown as a red line. Note that the optimal designs for $\sigma>1$ correspond to oversubscribed interconnects. The region of optimal designs for $\sigma<1$ (traffic patterns that are not interference-free) is marked with red hash lines, bordered by the full fat-tree design line $c_1=n \cdot c_2$ and the optimal design line for uniform traffic. These designs correspond to undersubscribed interconnects. The design space lemma also shows that there exists no traffic pattern for which a design in the region above full fat-trees ($c_1 > n \cdot c_2$) is optimal. That's because for any traffic pattern, such a design would require more bandwidth in the spine links than a full fat tree with the same leaf links would, but delivers exactly the same performance.

In practice, data centers tend to experience traffic skewness ($\sigma>1$), as applications exploit data locality by sharing more data with other hosts in their own pod than to hosts in other pods. Thus, for typical traffic patterns, full fat-trees are inefficient interconnects too. Furthermore, a full fat-tree's inefficiency increases as $\sigma$ increases. This result may appear surprising since Leiserson demonstrated that full fat-trees are universally efficient. However, Leiserson's interconnect assumes a best-effort message-based communication system without congestion control regulation. The Internet generally operated in this manner prior to the publication of the first congestion control algorithm. Jacobson published the first congestion control algorithm for TCP/IP networks three years after Leiserson's work.

The presence of congestion control in modern interconnects has the effect of shifting the optimal design depending on the network's traffic pattern. While full fat-trees are rarely used in production networks due to their prohibitive costs, this result reaffirms that it is wasteful to do so, since the presence of traffic skewness implies that the optimal design is oversubscribed, with an oversubscription factor that depends on the degree of traffic skewness $\sigma$ according to Lemma 3.2. Moreover, the technique described above informs how a fat tree can be optimized, e.g., how link capacities can be selected while minimizing or even avoiding waste without sacrificing network throughput.

Figure 3:
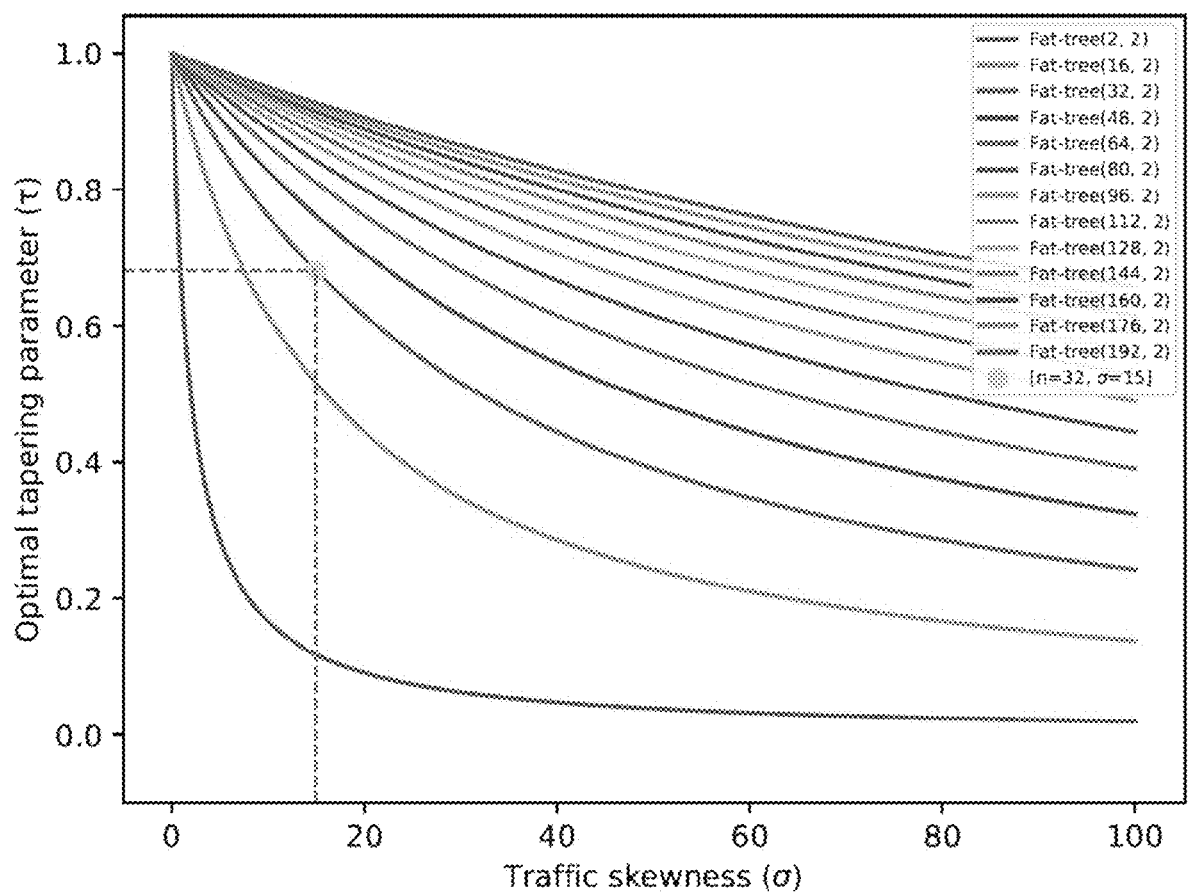
FIG. 3 shows optimal tapering parameter as a function of traffic skewness for various designs of a FT(n,2) network.

FIG. 3 shows the optimal tapering parameter t as a function of traffic skewness $\sigma$ for a variety of 2-level fat-trees. Once again, we see that all optimal designs correspond to oversubscribed interconnects (i.e., $\tau<1$) departing away from the full fat-tree design ($\tau=1$) as traffic skewness increases. We also note that as the size of the interconnect n increases, the optimal tapering parameter increases. For example, suppose that our goal is to design a fat-tree FT(32,2) to transport a traffic pattern with skewness $\sigma=15$. By using the chart in FIG. 3, we can identify the needed design (represented with a yellow dot) at the intersection of the green curve (FT(32,2)) with the line $\sigma=15$, resulting in a tapering parameter of $\tau=0.68085$.

Appendix D presents a chart that plots the traffic skewness value needed to optimally operate a FT(n,2) as a function of the number of hosts $n^2$ supported by the interconnect and for various tapering parameters t. Appendix I includes additional design tables for the more general class of fat-trees FT([$n_1, n_2$]) and various $\sigma$ values derived from the general equations in Lemma 3.2.

Per Equations (2), (4), (6), and (8), the link capacity at one level is a function of the link capacity at another level. Per Equation (6) for example, $c_i$ depends on $c_{(i-1)}$. The initial capacity at a particular level ($c_1$, for example) can be determined according to the number of children ($n_1$) at that level. The initial capacity at a particular may also be informed by other performance parameters, such as the specified network/flow completion time. Such a scaling parameter can be associated with the link capacities. The respective capacities at the other levels may then be determined according to the equations above.

4 Designing Folded-Clos Networks

Our next goal is to apply QTBS to derive the equations that drive the optimal design of folded-Clos networks. While often times folded-Clos are also referred as fat-trees, mathematically we treat them separately because they have topological differences that lead to different equations. Throughout this section, we will use the notation introduced by Al-Fares et al. to describe and analyze the performance of this important class of interconnects.

Figure 4:
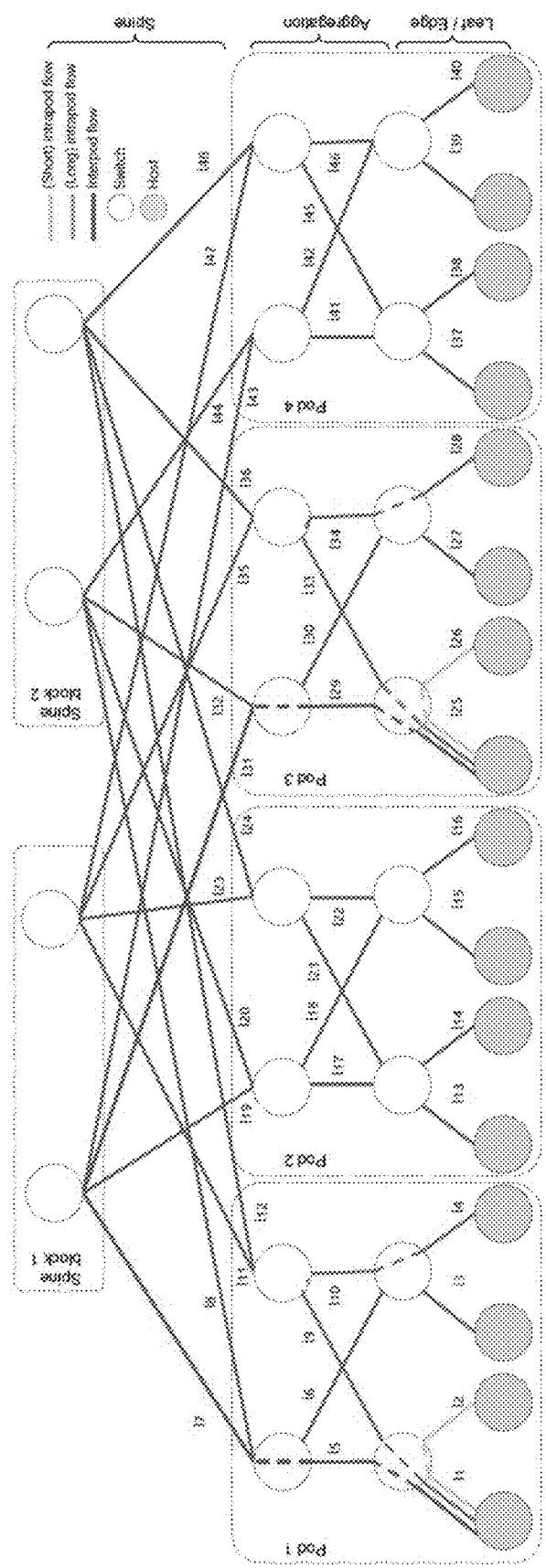
FIG. 4 shows an example folded-Clos network with 3 levels and radix 4, denoted as Clos(4,3)

We will assume the folded-Clos network is implemented using switches of radix k and identical link capacity that are interconnected using a tree structure with L levels. These two parameters, k and L, characterize a class of folded-Clos topologies denoted as Clos(k,L). Consider as an example the interconnect Clos(4,3) illustrated in FIG. 4. It includes 20 switches with radix 4, 48 links, 4 pods and 16 hosts interconnected via 120 possible paths. Links are organized in three levels (L=3), which are commonly referred from top to bottom as the spine, the aggregation and the leaf (or edge) levels. Folded-Clos interconnects with three levels have three possible types of flows, as shown in FIG. 4: interpod flows (red color) traversing the spine links, long intrapod flows (blue color) traversing the aggregation links but not the spine links, and short intrapod flows (yellow color) only traversing leaf links. A general Clos(k,3) interconnect has $5k^2/4$ switches of radix k, $3k^3/4$ links, $k^3/4$ hosts grouped in k pods, and $k^6/32-k^3/8$ possible paths. Finally, we will assume flows are routed according to any of available techniques.

Many production data centers introduce oversubscription in the spine links as a mechanism to reduce the cost of the interconnect. In this case, the oversubscription of a folded-Clos topology corresponds to the ratio between the total capacity of the leaf links across all pods and the total capacity of the spine links, denoted as $\omega$:1. Consider for instance the Clos(4,3) topology in FIG. 4. Because the total capacity of the leaf and spine links is the same (each group has 16 links of equal capacity), the oversubscription parameter is 1:1 ($\omega$=1). Suppose instead that we remove the two most-left spine switches from the network (and their corresponding eight links). Such a configuration yields an oversubscription of 2:1 ($\omega$=2). Note that the oversubscription parameter $\omega$ is equal to the inverse of the bandwidth tapering parameter $\tau$ introduced in Section 3. The main difference is that $\omega \in \mathbb{Z}_{>0}$ while $\tau \in \mathbb{R}_{>0}$, reflecting the discrete nature of the folded-Clos interconnect.

Because folded-Clos are discrete topologies, not all possible oversubscription values are available to a network designer. In particular, for the class of Clos(k,3) interconnects, oversubscription is typically implemented by grouping spine switches into blocks-called spine blocks-consisting of k/2 switches each. Since there are $k^2/4$ spine switches, this leads to a total of k/2 possible oversubscription configurations of the form $\omega$:1, with $$\omega = \frac{k}{2\beta}$$

and $1 \leq \beta \leq k/2$. Note that here $\beta$ corresponds to the number of spine blocks deployed. With this approach, network architects can decide to increase the number of spine blocks in order to increase performance of the interconnect or to decrease the number of spine blocks to reduce its cost, providing an efficient and elegant mechanism to control its performance-cost trade-off. For instance, for a folded-Clos with radix k=4, we have that $\omega \in \{1,2\}$ (since $\beta \in \{1,2\}$), which leads to two possible configurations, as shown in FIG. 4: 1:1 deploying both spine blocks (for a total of 4 spine switches) and 2:1 deploying only one of the spine blocks (for a total of 2 spine switches).

4.1 Design with Optimal Oversubscription

We now introduce the general equations that determine an optimal 3-level folded-Clos design for skewed traffic:

LEMMA 4.1. Optimal 3-level folded-Clos with radix k and skewed traffic. Assume a traffic pattern $b(f)=\sigma_i$, where f is a flow that traverses a link in level i, but no link in level i−1, such that a flow that goes through all levels of the folded-Clos transmits $\sigma_1$, and a flow between a pair of hosts that are nearest neighbors in the folded-Clos transmits $\sigma_3$. Assume that $\sigma_1=1$ and $\sigma_2=\sigma_3=\sigma$. For simplicity of discussion, we assume all intrapod traffic is equally skewed, although the equations for the general case can be derived in a straightforward manner, according to the discussion herein. Then, the traffic pattern is interference-free and the oversubscription parameter $$\omega(k, \sigma) = \frac{k}{2\beta(k, \sigma)}$$

corresponds to the optimal design, where $$\beta(k, \sigma) = \left\lceil \frac{(k^4 - k^3)}{2(k^3 - k^2) + \sigma(2k^2 - 8)} \right\rceil \quad (10)$$

is the number of deployed spine blocks and $\lceil \cdot \rceil$ is the ceiling operator. Equivalently, a Clos(k,3) with $\beta$ spine blocks is optimal if $\sigma_1=1$ and $\sigma_2=\sigma_3=\sigma(k,\beta)$, where:

$$\sigma(k, \beta) = \begin{cases} \frac{(k^3 - k^2)(k - 2\beta)}{2\beta(k^2 - 4)}, & \text{for } 1 \leq \beta < k/2 \\ 1, & \text{for } \beta = k/2 \end{cases} \quad (11)$$

Proof. See appendix A.8.

Figure 5:
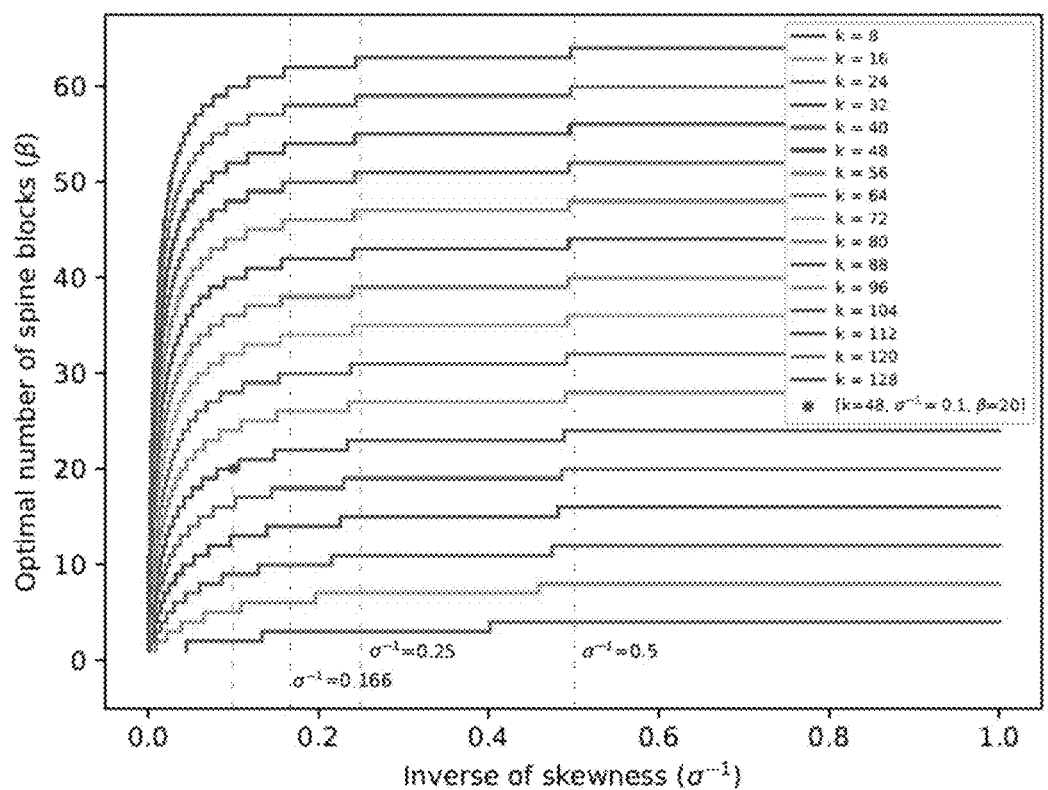
FIG. 5 shows the optimal number of spine blocks as a function of traffic skewness for various radix values (k), according to various embodiments.

Using Equation (10), FIG. 5 plots the value of the optimal number of spine blocks $\beta$ to deploy in a Clos(k,3) interconnect as a function of the inverse of traffic skewness l/O and for various values of the radix parameter k. Using the inverse of $\sigma$ helps illustrate the asymptotic bounds in this plot. Thus, for a folded-Clos with radix k=48 and traffic skewness $\sigma=10$ ($\sigma^{-1}=0.1$), it is enough to deploy $\beta=20$ spine blocks, each consisting of k/2=24 switches. Since the Clos (48,3) interconnect without oversubscription has a total of k/2=24 spine blocks, this yields a total savings of 4 spine blocks or, equivalently, 96 spine switches (this optimal design is represented as a red dot in FIG. 5).

As traffic becomes more skewed ($\sigma^{-1} \to 0$) fewer spine blocks are needed. Interestingly, FIG. 5 also reveals that as k increases, the optimal skewness value has an asymptotic bound, represented with dashed vertical lines. The position of these asymptotic lines can be obtained from Equation (11) by taking the limit of $k \to \infty$ and setting $$\beta = \frac{k}{2} - i,$$

where i corresponds to the number of spine blocks that can be eliminated from the folded-Clos without incurring any performance penalty:

$$\lim_{k \to \infty} \sigma\left(k, \beta = \frac{k}{2} - i\right) = \lim_{k \to \infty} \frac{(k^3 - k^2)\left(k - 2\left(\frac{k}{2} - i\right)\right)}{2\left(\frac{k}{2} - i\right)(k^2 - 4)} = 2i \quad (12)$$

The above equation provides a simple but succinct rule that all Clos(k,3) interconnects should satisfy to avoid unnecessary investment costs in the provisioning of the spine layer, which we formalize as follows:

COROLLARY 4.2. Minimum oversubscription requirement of Clos(k,3). If traffic skewness $\sigma$ is larger than 2(i+1), then i spine blocks can be removed from the interconnect without incurring any performance penalty, regardless of the radix value k. Equivalently, the interconnect can be oversubscribed by at least a factor $$\omega = \frac{k}{k-2i}$$

without incurring any performance penalty.

Note that the above rule provides a loose bound since it is generally applicable to any radix value. For a known specific radix, designers can directly use Equation (10) to compute a more precise bound on the minimum oversubscription requirement. Next, we state the maximum flow completion time of a Clos(k,3):

LEMMA 4.3. Network completion time of a 3-level folded-Clos with radix k and skewed traffic. Assume that every host sends $\sigma$ bits of information to every other host located in the same pod and 1 bit of information to every other host located in a remote pod. The network completion time of a 3-level folded-Clos with radix k is:

$$\mu(\beta, \sigma) = \begin{cases} \frac{k^2 + \sigma(k^3 - k^2) - 4}{2c}, & \text{if } \sigma \leq \sigma(k, \beta) \\ \frac{\sigma(k^4 - k^3)}{4\beta c}, & \text{otherwise} \end{cases} \quad (13)$$

where c is the capacity of each switch port.

Proof. See appendix A.9.

Figure 6:
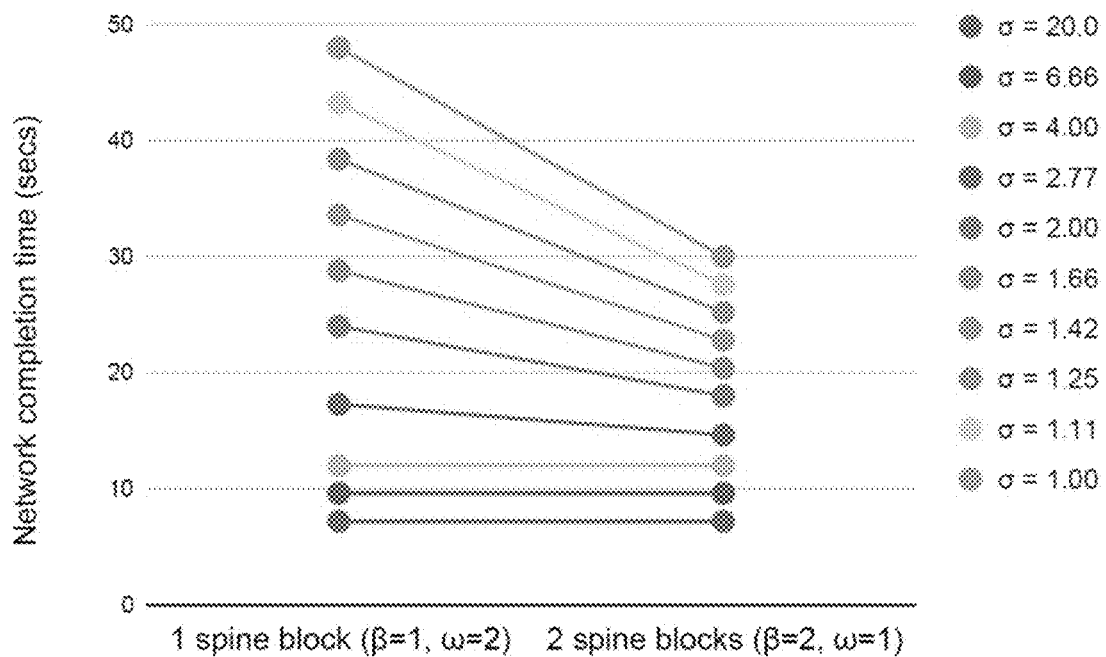
FIG. 6 illustrates that for a Clos(4,3) network with skewness σ≥4, using one spine block constitutes an optimal design, according to one embodiment.

FIG. 6 shows the network completion time of Clos(4,3) as a function of the number of spine blocks deployed $\beta$ assuming a normalized link capacity of c=1 bps. In this chart, network completion time has been normalized to (divided by) $\sigma$ to better illustrate its asymptotic behavior, so the corresponding traffic pattern is b(f)=1/$\sigma$ for interpod flows and b(f)=1 for intrapod flows. Note that from Equation (13), to obtain the maximum flow completion time for arbitrary values of c, we can simply scale the vertical axis by a factor of 1/c. This plot shows another interesting property of folded-Clos interconnects: as traffic skewness increases, the performance benefit of increasing the number of spine blocks diminishes, and no benefit at all is obtained after a certain threshold. In the case of Clos(4,3), this threshold is $\sigma$=4, indicating that for all traffic patterns with skewness $\sigma \geq 4$, a network with one spine block is as performant as one with two spine blocks. Later in Section 6.2 we empirically validate this result.

In Appendix E we provide a plot of the network completion time as a function of the oversubscription parameter @ for a production-scale folded-Clos with radix k=48.

5 Designing Dragonfly Networks

While folded-Clos is the predominant topology in large-scale data centers, evolving technology and the availability of high-radix switches have led to other new high-performance topologies that, for some applications, are able to deliver better cost-performance trade-off. One such topology is dragonfly, that can leverage modern switches with high radix to reduce the diameter, the latency and in some cases the cost of the interconnect. Dragonfly topologies are often used in supercomputer interconnects.

A dragonfly interconnect includes p pods. In the context of supercomputer interconnects, these are usually referred to as groups. We use the data center-oriented term pod for consistency with the terminology used in the analysis of the previous interconnects. Each pod has a switches. Each switch is connected with every other switch in its pod via intrapod links, forming a full-mesh. Each switch is also connected with h other switches located in other pods via interpod links. Finally, each switch is connected with t hosts. The switches in a dragonfly must offer at least a radix k=t+h+a−1 and the interconnect scales to support a·p·t hosts. We will use the notation Dragonfly(a,p,h) to denote a dragonfly with parameters a, p and h. (For the sake of simplicity, we omit the connections with the hosts, since they do not alter the core topology of the network.) A dragonfly is said to be canonical if p=a+1 and h=1, denoted as Dragonfly(a,a+1,1). Canonical dragonflies are of interest because they ensure every pair of hosts can be connected by traversing one single interpod link and have minimal diameter.

Figure 7:
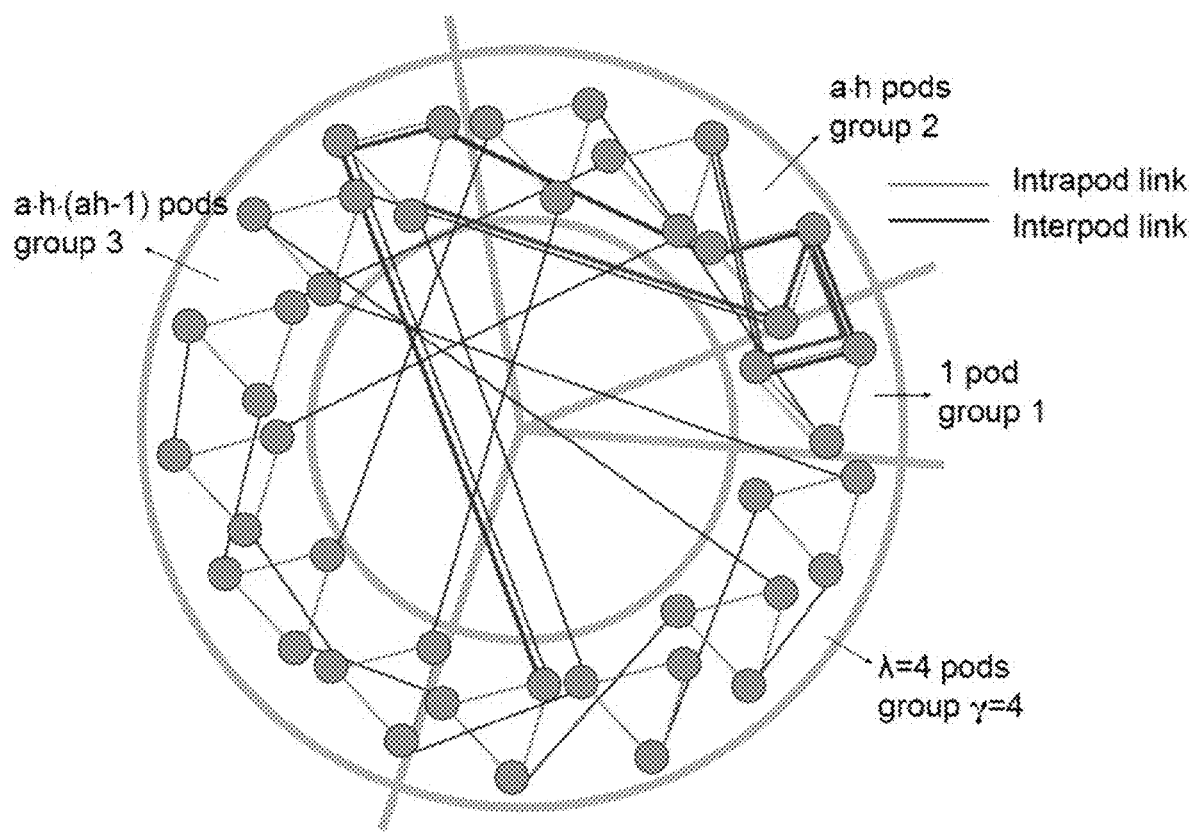
FIG. 7 depicting an example Dragonfly topology with a=3, p=14, h=1, resulting in λ=4 and γ=4.

The topology of a dragonfly interconnect is shown in FIG. 7 for the case of a=3, p=14 and h=1. A dragonfly can generally be constructed using the following iterative partitioning procedure. Position all the pods in a circle as shown in FIG. 7 and start with an arbitrary pod. Refer to this single pod as group 1. From it, connect its a·h interpod links to as many consecutive different pods as possible by traveling the ring counterclockwise. Refer to this set of pods group 2. Now, connect its ah(ah−1) interpod links to as many consecutive different pods as possible by continuing to travel the ring counterclockwise. Refer to this set of pods group 3. This process is repeated until all the interpod links have been connected. At the end of this process, we set $\lambda$ to be the total number of groups and $\gamma$ to be the number of pods in the last group. In Section 5.2 we will see that the parameters $\lambda$ and $\gamma$, together with a, p and h, uniquely determine the performance of a dragonfly interconnect.

5.1 Bottleneck Structure of Dragonflies

Figures 8A, 8B, 8C:
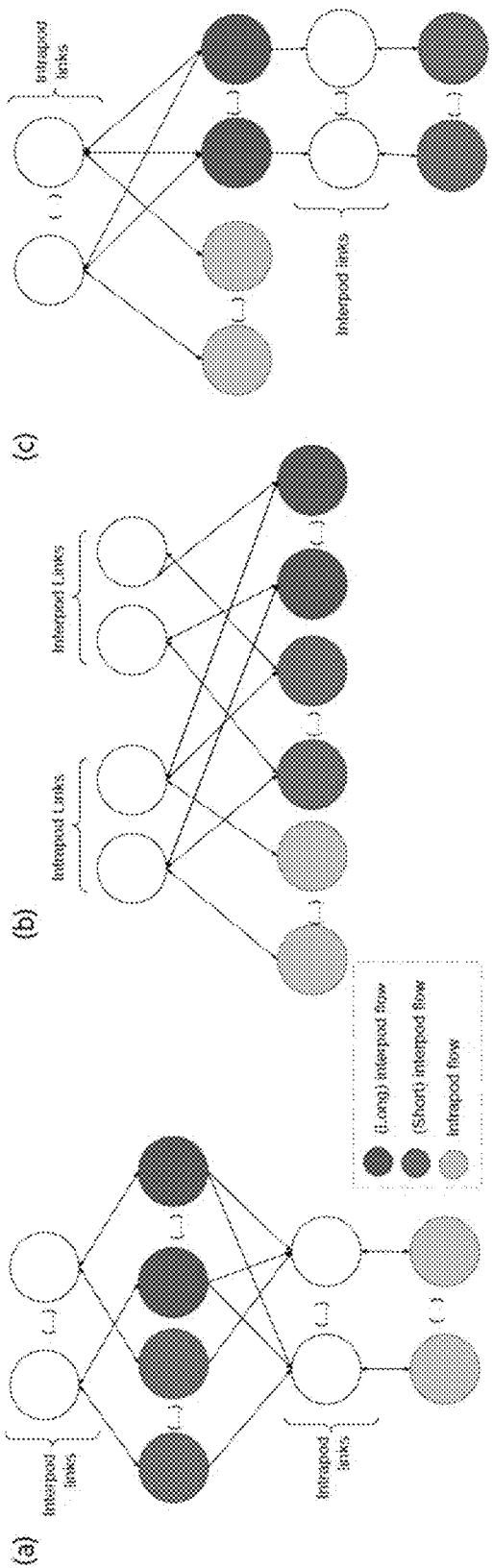
FIGS. 8A-8C show different bottleneck structures in a Dragonfly(3,4,1) network.

FIGS. 8A-8C show the possible bottleneck structures of the Dragonfly(3,4,1) interconnect. Flow colors correspond to those used in FIG. 7. There are three possible bottleneck structures: oversubscribed (FIG. 8A), balanced (FIG. 8B) and undersubscribed (FIG. 8C).

5.2 Design Equations for Skewed Traffic

The general equations that determine an optimal dragonfly design for skewed traffic are as follows:

LEMMA 5.1. Optimal dragonfly with skewed traffic. Assume that every host sends $\sigma$ bits of information to every other host located in the same pod and 1 bit of information to every other host located in a remote pod. If $\sigma \geq 1$, then the traffic pattern is interference-free and the following design is optimal:

$$c_1 = \frac{\rho_1}{\sigma + \rho_2 - 1} c_2 \quad (22)$$

where $$\rho_1 = \frac{1}{h} \left[ a(p-1) + \sum_{i=0}^{\gamma-2} \left( a(p-1) - \sum_{j=0}^{i} a^2 h(ah-1)^j \right) \right] \quad (23)$$

$$\rho_2 = p + \lambda + \quad (24)$$

$$\frac{1}{a-1} \sum_{i=0}^{\gamma-2} \left[ ah(a-1)(ah-1)^i + \frac{(a-1)h}{ah-1} \left( a(p-1) - \sum_{j=0}^{i} a^2 h(ah-1)^j \right) \right]$$

$$\gamma = \max\left\{ x \mid a(p-1) - \sum_{i=0}^{x-2} a^2 h(ah-1)^i \geq 0 \right\} \quad (25)$$

$$\lambda = p - 1 - \sum_{i=0}^{\gamma-1} ha(ah-1)^i \quad (26)$$

Proof. This proof is similar to the proof of Lemma 3.2.

In the equations above, $c_1$ is the capacity of each interpod link and $c_2$ is the capacity of each intrapod link. Per Equation (22), the interpod link capacity is a function of the intrapod link capacity. The initial capacity at a particular level ($c_1$ or $c_2$) may be informed by a performance parameter, such as the specified network/flow completion time. The capacity at the other level may then be determined according to the equations above.

With simple algebraic manipulations, we can use the above lemma to derive the optimal design for a canonical dragonfly by setting p=a+1 and h=1:

$$c_1 = \frac{a^2}{\sigma + 2a} c_2 \qquad (27)$$

Since a canonical dragonfly has a total of a(a+1)/2 interpod links and a(a−1)(a+1)/2 intrapod links, its tapering parameter T (Recall from Section 3 that we defined τ as the ratio of the aggregated interpod link capacity divided by the aggregated intrapod link capacity) corresponds to:

$$\tau = \frac{c_1 \cdot a \cdot (a+1)/2}{c_2 \cdot a \cdot (a-1)(a+1)/2} = \frac{a^2}{(\sigma + 2a)(a-1)} \qquad (28)$$

For σ=0, we have that the optimal design has a tapering parameter τ=a/(2(a−1)). Interestingly, this is in contrast with the optimal fat-tree design for σ=0, which corresponds to a full fat-tree with τ=1. This implies that dragonflies require a maximum tapering parameter which is lower than that of a fat-tree. In other words, an optimal design for σ=0 requires less aggregated capacity in the interpod links relative to the intrapod links for canonical dragonflies than it requires for fat-trees. This also implies that designing a dragonfly by allocating as much aggregated capacity to the interpod links as the intrapod links (i.e., τ=1 and $c_1$=(a−1)·$c_2$) is always suboptimal, as the optimal design for σ=0 (i.e., $c_1$=a·$c_2$/2) is less costly and yields the same network completion time and throughput.

Figure 9:
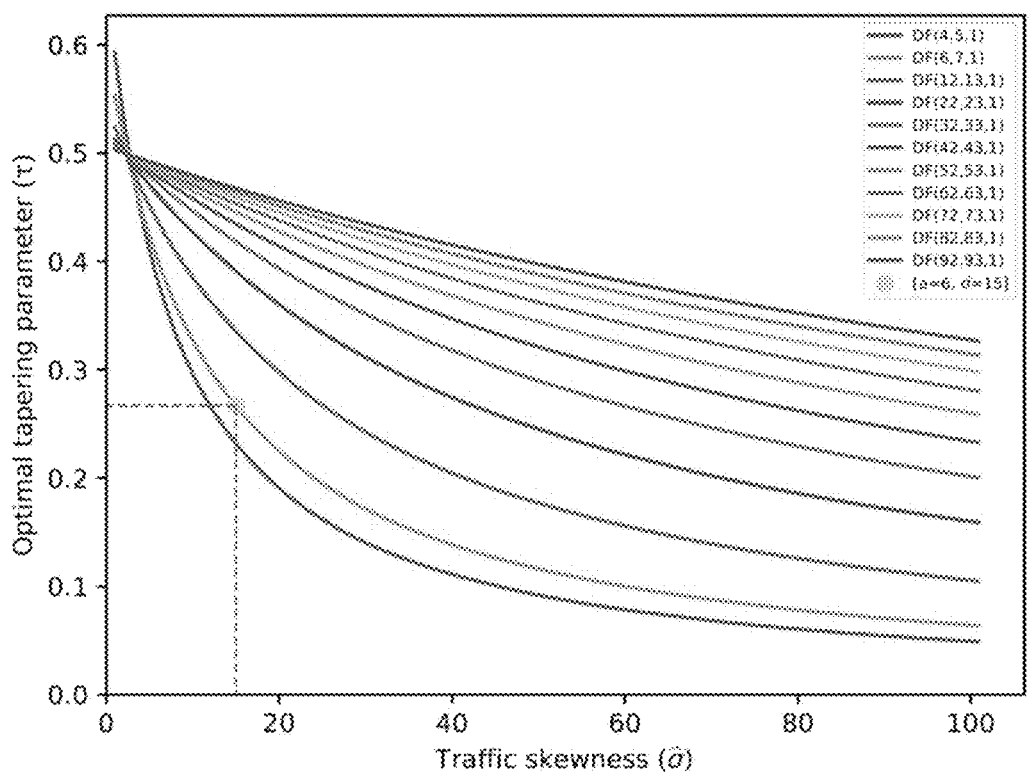
FIG. 9 shows the optimal tapering parameter as a function of traffic skewness for various designs of a Dragonfly(a,a+1,1) network.

FIG. 9 shows the optimal tapering parameter τ as a function of traffic skewness σ for a variety of canonical dragonflies. Similar to the case of fat-trees in FIG. 3, all optimal designs generally require oversubscribing the interpod links (τ<1) and, as the size of the interconnect increases, the optimal tapering parameter increases too. As an example, suppose that our goal is to design a canonical dragonfly Dragonfly(6,7,1) (i.e., a=6) to transport a traffic pattern with skewness σ=15. By using the chart in FIG. 9, we can identify the needed design (represented with a yellow dot) at the intersection of the red curve with the line σ=15, resulting in a tapering parameter of τ=0.26667.

The following lemma characterizes the design space of canonical dragonflies Dragonfly(a,a+1,1):

LEMMA 5.2. Design space of canonical dragonflies. Consider a canonical dragonfly Dragonfly(a,a+1,1) and let $c_1$ and $c_2$ be the capacity of its interpod and intrapod links, respectively. Without loss of generality, let b(f)=1 for interpod flows, and b(f)=σ for intrapod flows. Then, 1. If σ≥1, the optimal design satisfies $c_1 \leq a^2 \cdot c_2/(1+2a)$.

2. If σ<1, the optimal design satisfies $a^2 \cdot c_2/(1+2a) < c_1 \leq a \cdot c_2/2$.

Proof. See Appendix A.7. This lemma can be generalized to support any Dragonfly(a,p,h).

Figure 10:
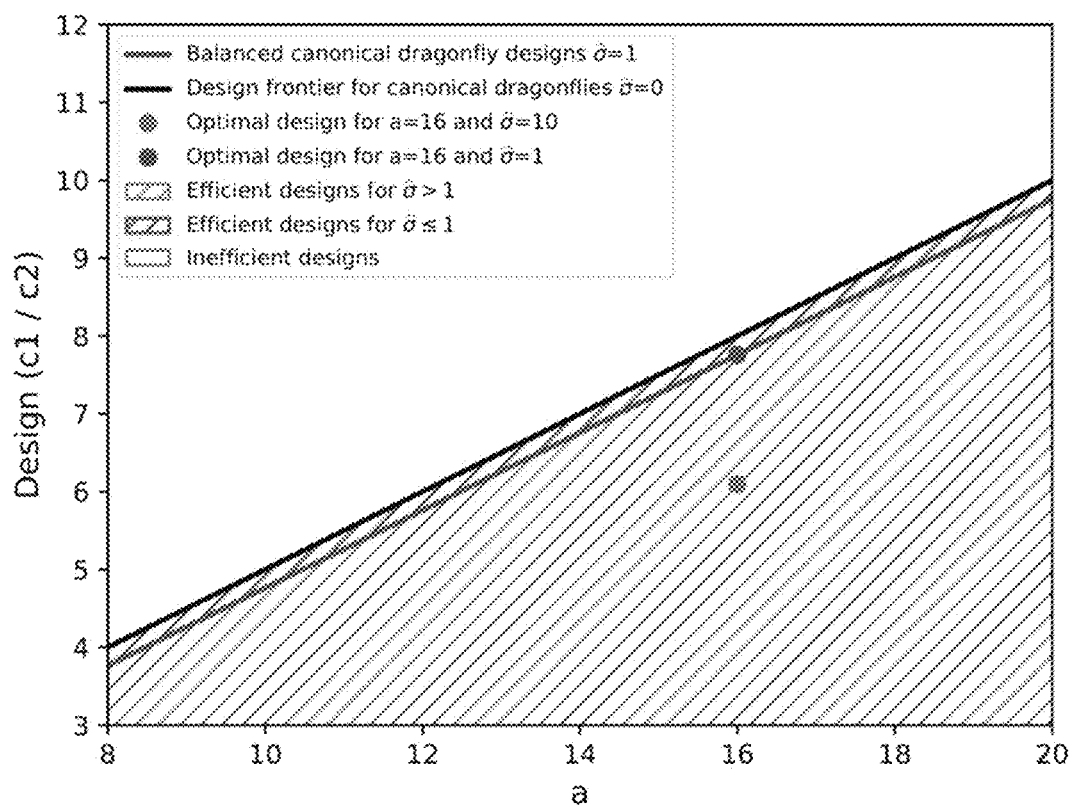
FIG. 10 shows the design space for a Dragonfly(a,a+1,1) network, according to various embodiments.

The above lemma is pictured in FIG. 10 as follows. The region of optimal designs for σ>1 is marked with gray hash lines; it falls below the optimal design line for uniform (σ=1) traffic $c_1 = a^2 \cdot c_2/(1+2a)$, shown as a red line. Note that the optimal designs for σ>1 correspond to oversubscribed interconnects (shown in FIG. 8A) because they allocate less bandwidth to the spine links than a balanced design. The region of optimal designs for σ<1 is marked with red hash lines, bordered by the design $c_1$=a·$c_2$/2 (corresponding to the optimal design when σ=0) and the optimal design line for uniform traffic. These designs correspond to undersubscribed interconnects (shown in FIG. 8C) because they allocate more bandwidth to the spine links than a balanced design. Similarly to fat-trees (although bordered by a different design curve), there exists no traffic pattern for which a design in the region $c_1$>a·$c_2$/2 is optimal, because the design $c_1$=a·$c_2$/2 yields the same network completion time and throughput and is less costly. Such designs are inefficient and network architects should avoid using them no matter the traffic pattern.

As an example, a Dragonfly(16,17,1) design in which intrapod flows carry ten times more traffic than interpod flows (σ=10) has an optimal tapering parameter τ=0.40635, yielding the design $c_1/c_2$=6.09523. This design is shown in FIG. 10 as a blue dot. Similarly, the same interconnect with uniform traffic (σ=1) has an optimal tapering parameter τ=0.51717, yielding the design $c_1/c_2$=7.75757. This corresponds to an interconnect with a balanced bottleneck structure (e.g., FIG. A6B), and is plotted in FIG. 10 as a green dot.

The discussion above of fat-tree, folded-Clos, and Dragonfly networks is illustrative only. The overall technique described herein, of proportional design and, optionally, design for interference-free traffic, is applicable to other types of network topologies, such as jellyfish, ring, butterfly, torus, etc. It should also be understood that references such as fat-tree network, Dragonfly network, etc., indicate the network topology. The underlying network can be any type of network, such as a data network, a network-on-a-chip (NOC), a transportation network, an energy distribution network, a fluidic network, or a biological network, etc., as discussed below.

6 Experiments

To experimentally demonstrate the accuracy of the QTBS model, we use G2-Mininet, a network emulation framework based on Mininet with a set of extensions developed to support the analysis of QTBS. Leveraging software defined networking (SDN), G2-Mininet enables the creation and analysis of topologies (such as fat-trees, folded-Clos and dragonflies, among others) using production TCP/IP code, including production-grade implementations of congestion control algorithms such as BBR, Cubic or Reno. (See Appendix G). More than 600 network simulations for a total of more than 800 hours of simulation time were used to verify the correctness of the model. We present a summary of these results in the following sections.

6.1 Experiments with Fat-Trees

In this first set of experiments our objective is to empirically demonstrate the existence of an optimal fat-tree design-a design that both minimizes network completion time and maximizes network throughput for a given cost. We start by simulating a FT(3,2) interconnect—i.e., a fat-tree with two levels (L=2) and with each switch having three children n=3. We connect every pair of nodes with two TCP flows (one for each direction), for a total of $n^L(n^L-1)$=72 flows. In the first set of experiments, we assume uniform traffic ($\sigma=1$). Using Equation (4), we have that the optimal design corresponds to $c_1 = n^2 \cdot c_2/(n+1) = 3^2 \cdot c_2/(3+1) = 2.25 \cdot c_2$.

FIGS. 11A-11C show the result of simulating a variety of designs with $c_2=5$ Mbps and $c_1 \in \{2.5, 5, 7.5, 10, 11.25, 15, 20, 25\}$ Mbps-resulting in values for $c_1/c_2$ of 0.5, 1, 1.5, 2, 2.25, 3, 4, 5. (Note that, without loss of generality, we could pick any value for $c_2$ and scale $c_1$ accordingly). Results are shown for the BBR (FIG. 11A), Cubic (FIG. 11B), and Reno (FIG. 11C) congestion control algorithms, and for both experimental and theoretical (according to QTBS) values. The network completion time corresponds to the upper envelope of the curves—i.e., the maximum completion time of the interpod and intrapod flows for any value of $c_1/c_2$.

As predicted by QTBS, the plots show that the optimal design is found at $c_1/c_2 = 2.25$. According to Theorem 2.10, this design wastes no bandwidth, minimizes network completion time and maximizes network throughput. For $c_1/c_2 < 2.25$, the completion time of the interpod flows increases while that of the intrapod flows decreases. Choosing a design in this region wastes bandwidth at the leaf links, increases network completion time (due to the longer completion time of the interpod flows) and decreases network throughput. As shown also, a design in the region $c_1/c_2 > 2.25$ achieves the same network completion time and network throughput as the design $c_1/c_2 = 2.25$, regardless of how large the capacity of a spine link ($c_1$) is. A design in this region wastes bandwidth at the spine links and is more costly than the optimal design, thus it should be avoided.

Figure 12:
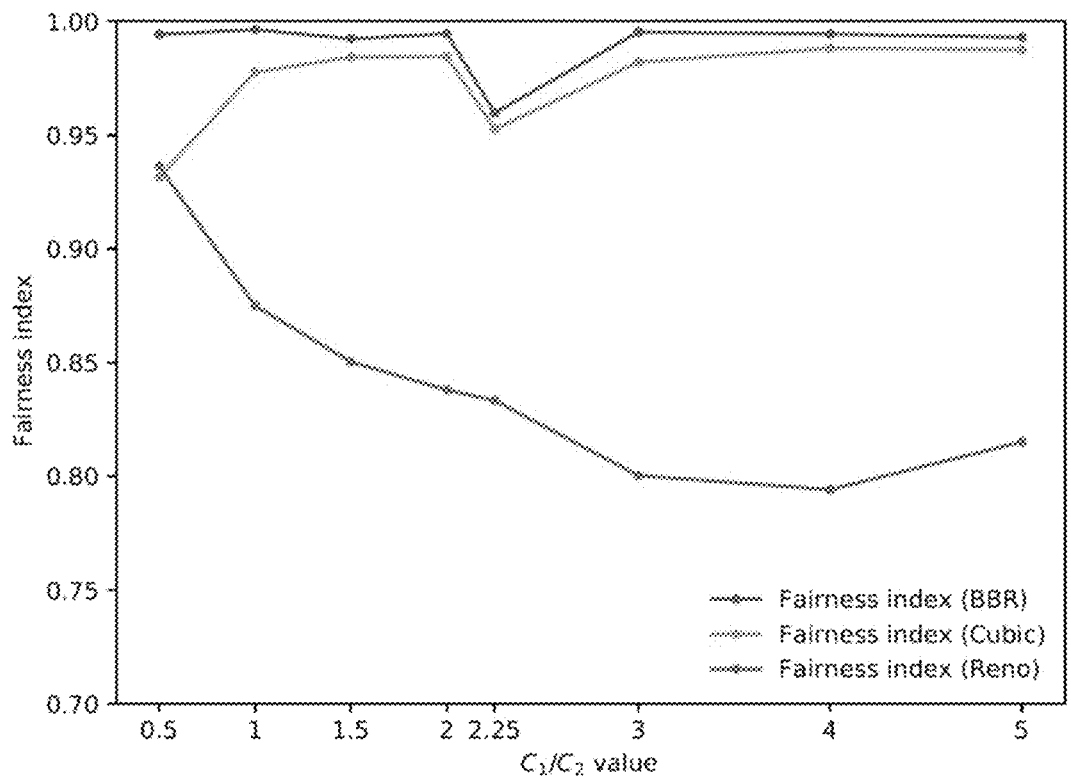
FIG. 12 shows Jain's fairness index for a FT(3,2) network link capacities optimized according to different embodiments, while applying different congestion algorithms.

BBR almost perfectly follows the predictions by QTBS. Cubic and Reno also follow them but not as accurately. This is also reflected in FIG. 12 where Jain's fairness index is presented. This index generally captures how accurately an experiment is able to match the behavior according to the QTBS model. The index ranges from 0 to 1, with values close to 1 indicating high accuracy. In FIG. 12, Jain's index for BBR is close to 1, while Cubic and Reno follow the model slightly less accurately—although they still qualitatively behave according to the model. This finding may be explained by the advanced congestion-based techniques used by BBR, which allow it to more accurately infer the optimal transmission rate of each flow.

Figure 13:
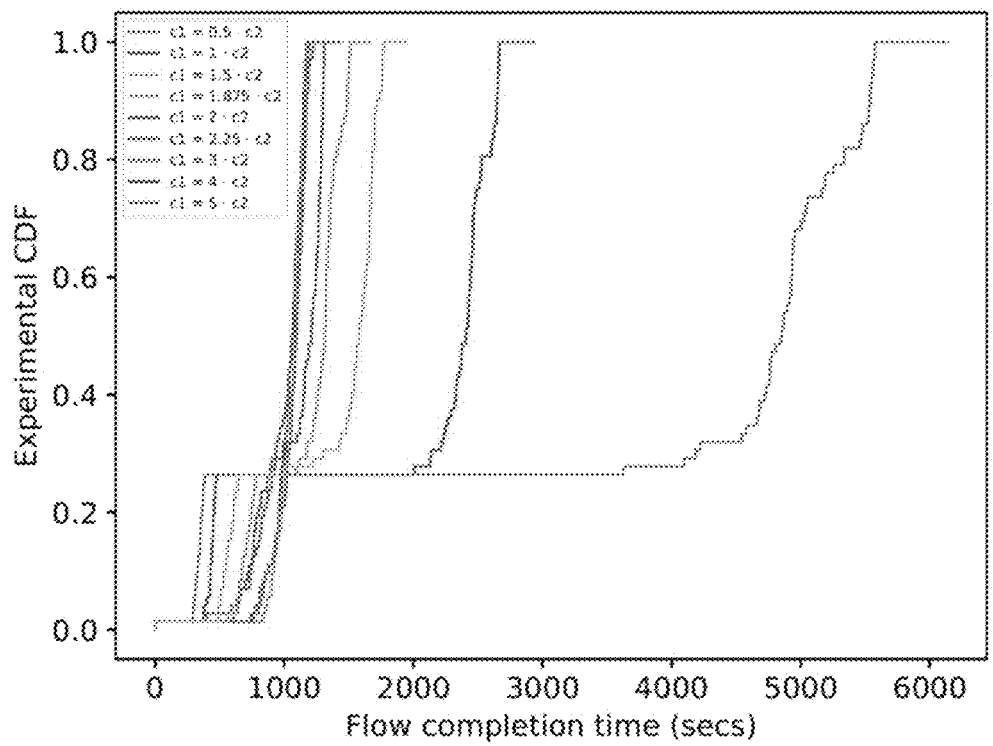
FIG. 13 shows the cumulative distribution functions (CDFs) of flow completion times for a FT(3,2) network for different link capacities.

FIG. 13 shows the cumulative distribution function of all the experiments run in FIG. 11A. FIG. 13 shows how increasing $c_1$ helps reduce the maximum flow completion time until the optimal value $c_1 = 2.25 \cdot c_2$ is reached (green line). At this point, all completion times are equalized (Theorem 2.10) and increasing $c_1$ beyond this value does not qualitatively alter the completion time of the flows.

In FIGS. 14A-14C we present experiments with skewed traffic patterns, where $b(f)=1$ for interpod flows and $b(f)=\sigma$ for intrapod flows, and where $\sigma \in \{2,4,10\}$, respectively. These values are illustrative only and not limiting; other values of $\sigma$ are contemplated. Using Equation (8), we have that the optimal design satisfies $c_1 = n^2 \cdot c_2/(n+\sigma) = 9 \cdot c_2/(3+\sigma)$. This leads to three optimal designs, one for each traffic pattern: $c_1 = 1.8 \cdot c_2$ for $\sigma=2$, $c_1 = 1.2857 \cdot c_2$ for $\sigma=4$, and $c_1 = 0.69231 \cdot c_2$ for $\sigma=10$.

As shown in FIGS. 14A-14C, the green and the red lines-which correspond to the experimental average completion time of the interpod and intrapod flows-cross each other right at the optimal design point, marked with a vertical dashed line. As it was shown in FIG. 3, the more skewed traffic is, the higher we can reduce the capacity of the spine links. This can be seen in FIGS. 14A-14C with the crossing points of the completion time curves for interpod and intrapod flows shifting to the left as $\sigma$ increases. Once again the optimal design does not waste any bandwidth (Theorem 2.10), since all flows terminate at the same time and for the whole duration of the simulation, every link is saturated. A difference with the uniform case in FIGS. 11A-11C is that, for $c_1 > 9 \cdot c_2/(3+\sigma)$, interpod flows continue to reduce their completion time. However, intrapod flows' completion time stays flat, thus the network completion time stays flat too.

An interesting ripple effect is produced in the bottleneck structure that leads to this behavior: as $c_1$ increases, interpod flows receive more bandwidth, but in doing so they need to steal some of it from the intrapod flows, since they both share the intrapod links. At the same time, the interpod flows will finish sooner as they get more bandwidth, and so they will free bandwidth for the intrapod flows sooner, creating this time a positive impact for them. The two effects (one negative, one positive) exactly cancel out, and thus intrapod flows do not see their completion time affected as $c_1$ increases beyond the optimal point.

6.2 Experiments with Folded-Clos

Figure 15:
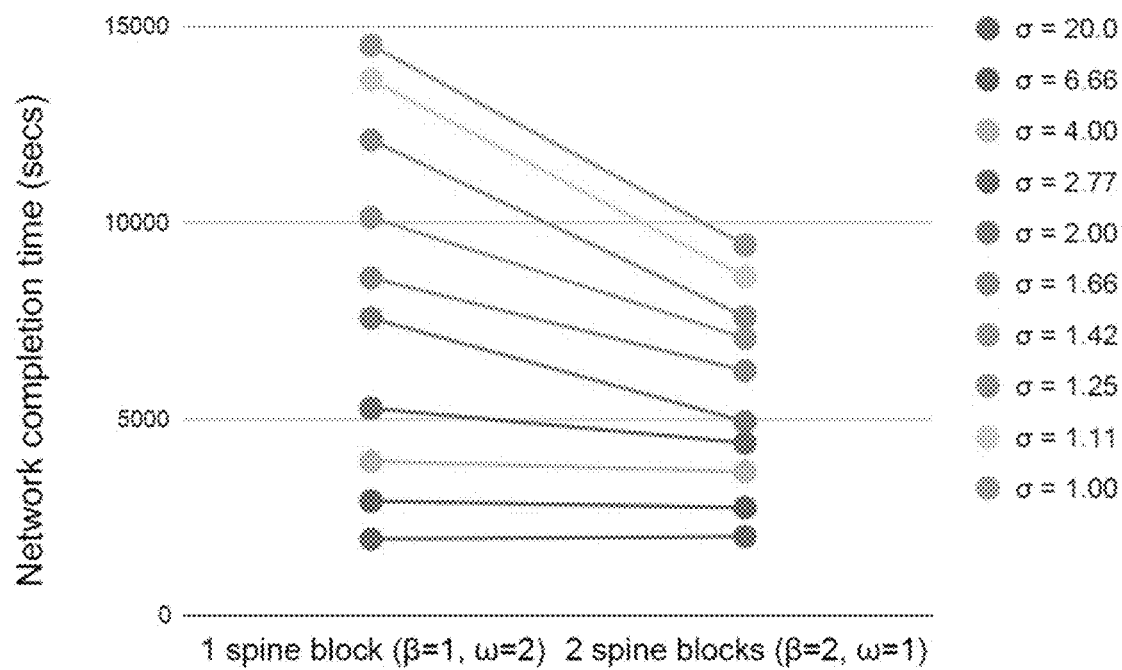
FIG. 15 demonstrates that an oversubscripton of 2:1 is an optimal design for a Clos(4,3) network, where $\sigma \geq 4$.

In this section we focus on empirically demonstrating the behavior of an optimal folded-Clos design according to the equations presented in Section 4. We use G2-Mininet to emulate a Clos(4,3) (see FIG. 4), that includes 20 switches of radix 4, 48 links, 4 pods and 16 hosts. Every pair of hosts is connected with two flows (one for each direction), for a total of 240 flows. FIG. 15 presents the results of running experiments for the two possible Clos(4,3) designs—with $\beta=1$ and $\beta=2$ spine blocks—and for a skewed traffic pattern having $b(f)=\sigma_1$ for interpod flows and $b(f)=\sigma_2$ for intrapod flows, where $\sigma_2=64$ MB, $\sigma_1=\sigma_2/\sigma$ Mbps and $\sigma \in \{1, 1.11, 1.25, 1.42, 1.66, 2, 2.77, 4, 6.66, 20\}$. These values of $\sigma$ are illustrative only and are not limiting; other values are contemplated. All experiments were performed using BBR. As shown, the interconnect behaves as predicted by QTBS in FIG. 6. Using a 1-spine block configuration (thus reducing the cost of the interconnect's spine level by half) is an optimal design for $\sigma \geq 4$, since using the 2-spine block configuration does not improve the maximum completion time and wastes bandwidth at the spine level. For $\sigma < 4$, both designs waste bandwidth, so the choice for one design or the other may be based on the budget constraints and the performance objectives of the application.

Figure 16:
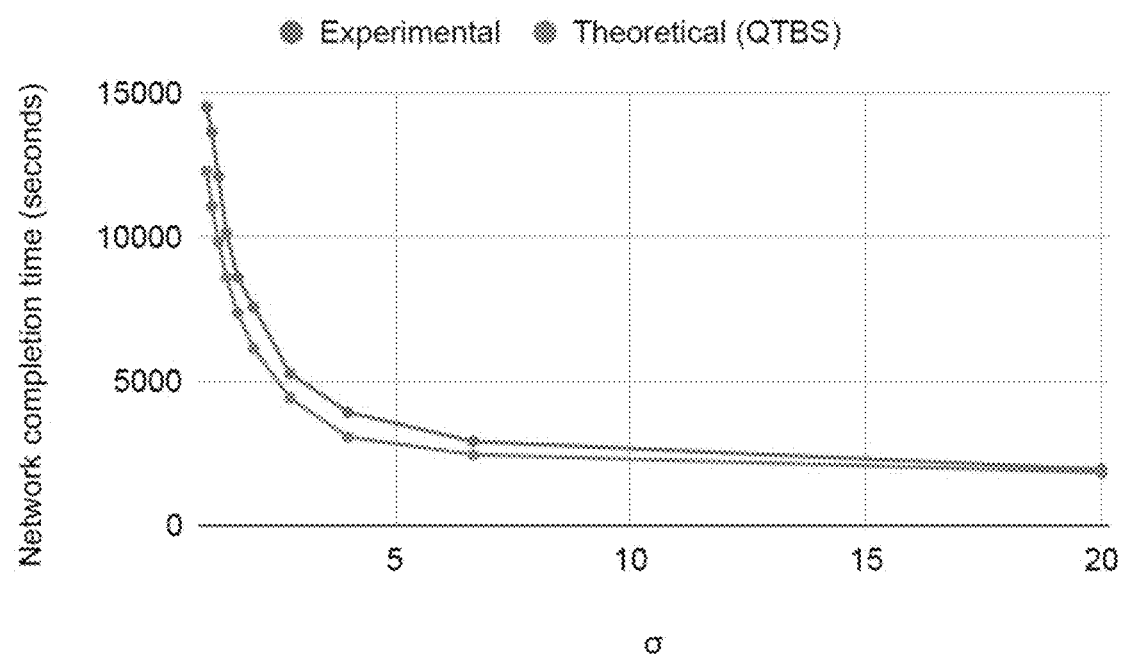
FIG. 16 shows a comparison of experimental network completion time with QTBS model for a folded-Clos network employing only a single spine block ($\beta=1$) according to one embodiment.

In FIG. 16 we compare the network completion time obtained from the experiments against the value projected by QTBS according to Equation (13) and for the case $\beta=1$ (a $\omega=2:1$ oversubscribed configuration). The plot shows that the model is able to describe the actual behavior of the interconnect fairly accurately. The model always lays below the experimental values due to imperfections of the congestion control algorithm that regulates the transmission rate of each flow, which leads to slightly higher network completion time than the theoretical one. We present additional experiments supporting the validation of the QTBS model in Appendix I.

6.3 Experiments with Dragonfly Networks

In this section we empirically demonstrate the existence of optimal dragonfly designs. (We follow a similar methodology used in Section 6.1 to empirically validate optimal fat-tree designs.) We start by simulating a Dragonfly(3,4,1) interconnect—i.e., a dragonfly with 4 pods, each with 3 routers (a total of 12 routers), every router in a pod is connected with every other router in the same pod (full-mesh connectivity) using intrapod links (a total of 12 intrapod links) and each router is connected with a router located in a different pod via an interpod link (a total of 6 interpod links). We connect every router to a host (a total of 12 hosts) and connect every pair of nodes with two TCP flows (one for each direction), for a total of 132 flows. In the first set of experiments, we assume uniform traffic ($\sigma=1$). Using Equation (27), we have that the optimal design corresponds to $c_1=a^2 \cdot c_2/(1+2a)=3^2 \cdot c_2/(1+2\cdot 3)=1.2857 \cdot c_2$.

Figure 17A:
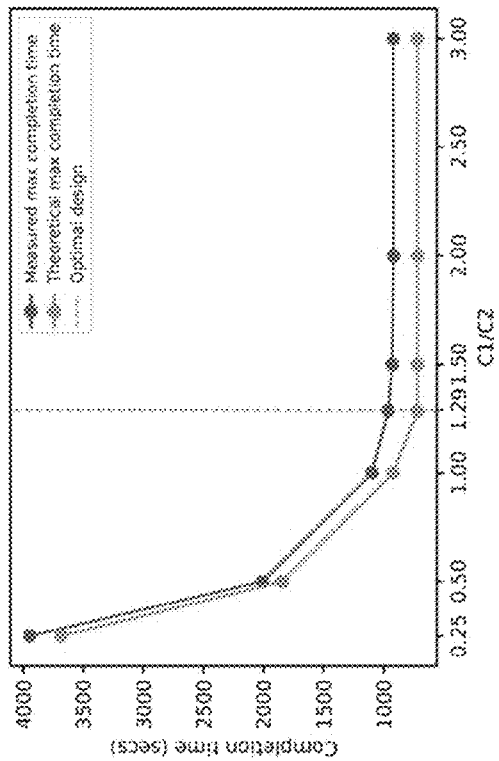
FIGS. 17A-17C respectively show the flow completion times for a Dragonfly(3,4,1) network according to one embodiment for uniform traffic that is controlled using three different congestion-control algorithms, namely, BBR, Cubic, and Reno.
Figure 17B:
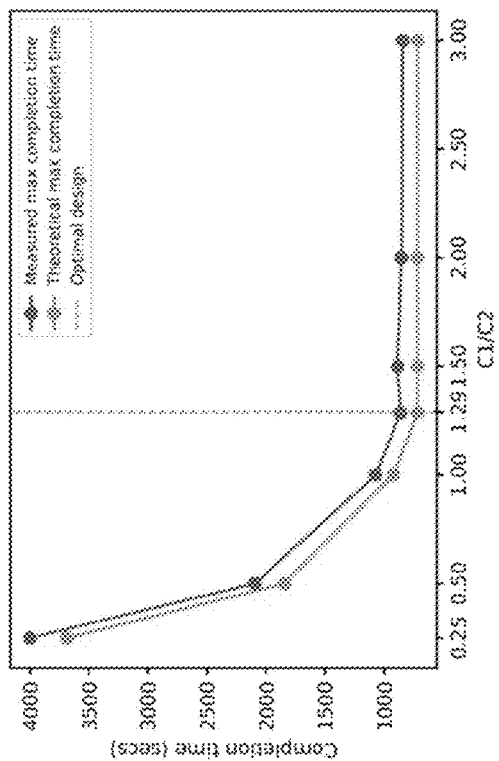
Figure 17C:
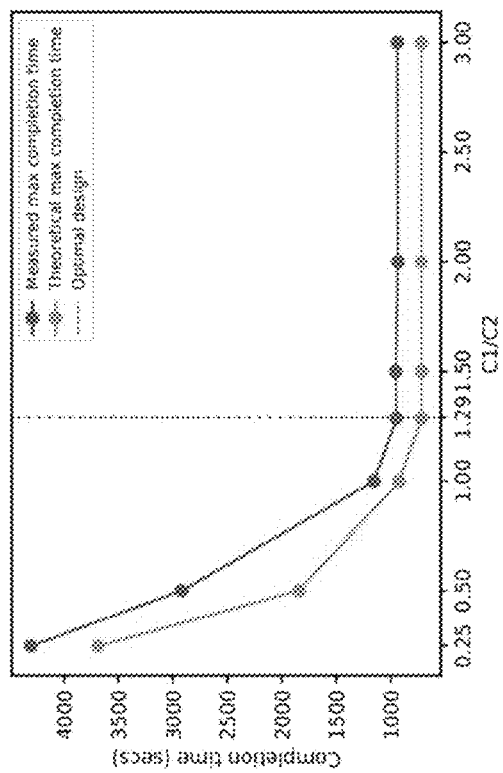

FIGS. 17A-17C show the result of simulating a variety of designs with $c_2=20$ Mbps and $c_1 \in \{5, 10, 20, 25.71, 30, 40, 60\}$ Mbps-resulting in values for $c_1/c_2$ of 0.25, 0.5, 1, 1.2857, 1.5, 2 and 3. (Again, without loss of generality, we could pick any value for $c_2$ and scale $c_1$ accordingly). Results are shown for the BBR (FIG. 17A), Cubic (FIG. 17B), and Reno (FIG. 17C) congestion control algorithms, and for both experimental and theoretical (according to QTBS) values. As predicted by the QTBS mathematical model, the plots show that the optimal design is found at $c_1/c_2=1.2857$. According to Theorem 2.10, this design wastes no bandwidth, minimizes network completion time and maximizes network throughput. Designs in the region $c_1/c_2<1.2857$ waste bandwidth at the intrapod links, increase network completion time (due to the longer completion time of the interpod flows) and decrease network throughput. As shown also, a design in the region $c_1/c_2>1.2857$ achieves the same network completion time and network throughput as the design $c_1/c_2=1.2857$, regardless of how large the capacity of a spine link ($c_1$) is. A design in this region wastes bandwidth at the spine links and is more costly than the optimal design, thus it should also be avoided.

Figure 18:
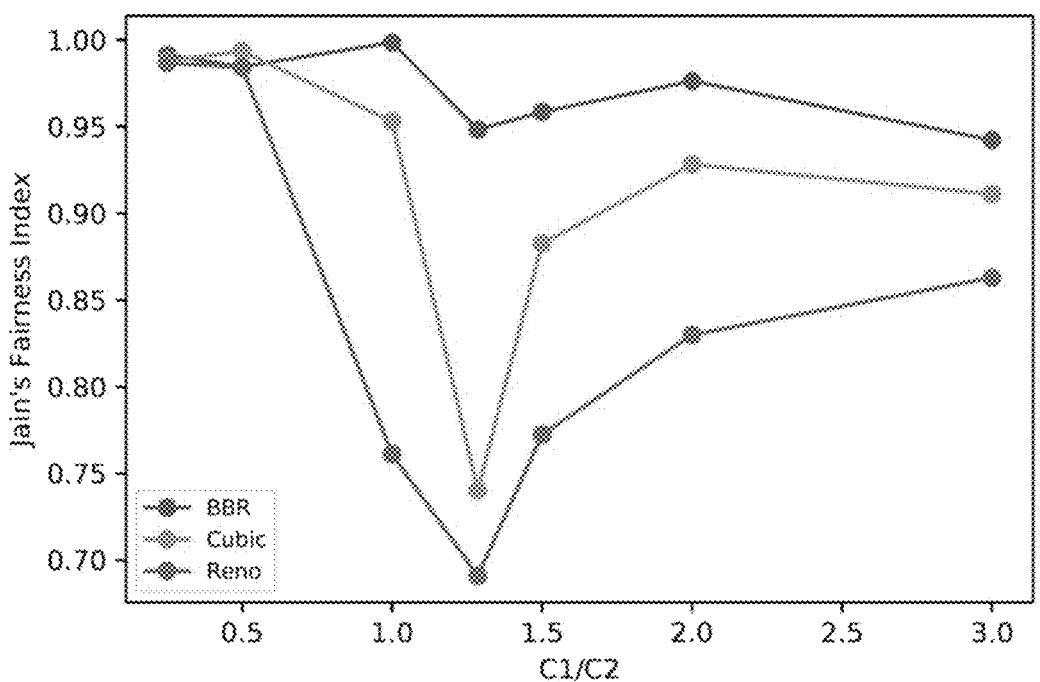
FIG. 18 shows Jain's fairness index for a Dragonfly(3,4,1) network link capacies optimized according to different embodiments, while applying different congestion algorithms.

The three congestion control algorithms closely follow the theoretical QTBS model, all reaching an inflection point right at the optimal design $c_1/c_2=1.2857$. Increasing the capacity of $c_1/c_2$ beyond this value yields a design with the same network's completion time (and, thus the same network throughput) but with a higher cost. Once again and similar to the results shown in Section 6.1, BBR is able to more accurately perform according to the optimal design than Cubic and Reno. This is also shown in FIG. 18, where BBR yields a higher Jain's index. Note that, as in all other experiments, all the results follow the model for network completion time from slightly above because of imperfections of the congestion control algorithms.

Figure 19:
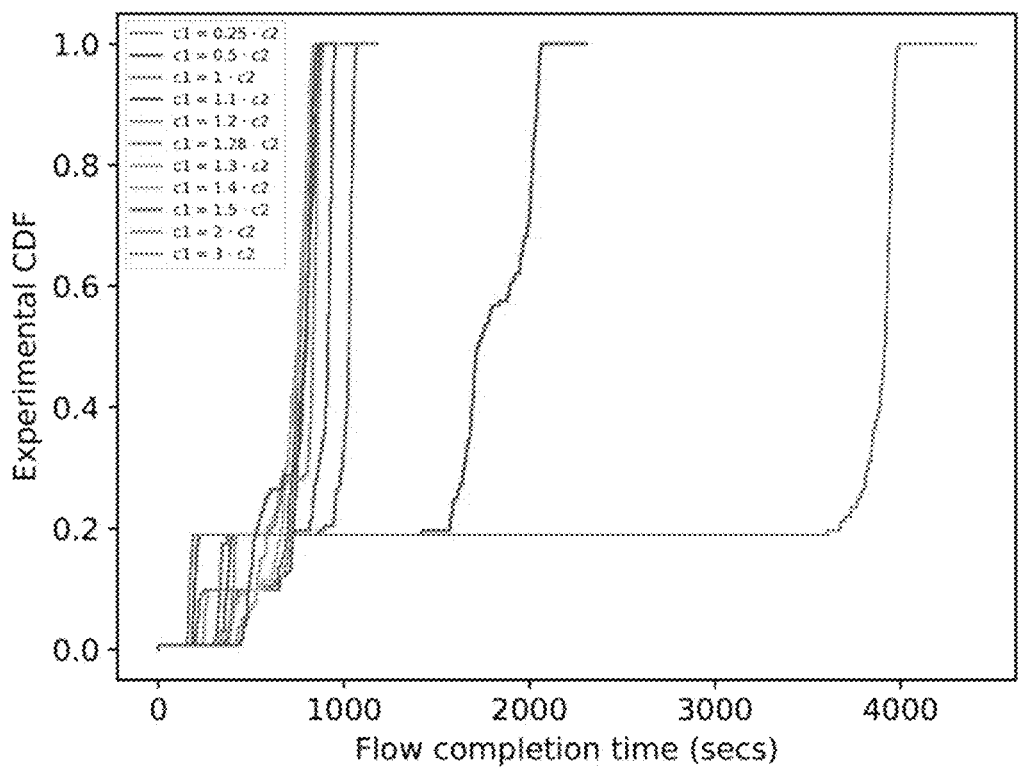
FIG. 19 shows the CDFs of flow completion times for a Dragonfly(3,4,1) network for different link capacities.

FIG. 19 shows the cumulative distribution function of all the experiments run in FIG. 17A. The figure shows how increasing $c_1$ helps reduce the maximum flow completion time until the optimal value $c_1=1.2857 \cdot c_2$ is reached. At this point, all completion times are equalized (Theorem 2.10) and increasing $c_1$ beyond this value does not qualitatively alter the completion time of the flows.

Figure 20A:
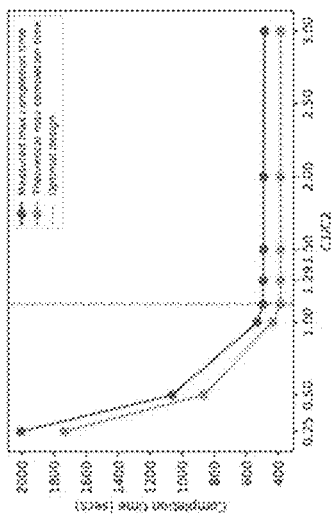
FIGS. 20A-20C respectively show the flow completion times for a Dragonfly(3,4,1) network according to different embodiments for each of three different traffic skewedness parameters, where the traffic is controlled using the BBR congestion-control algorithm.
Figure 20B:
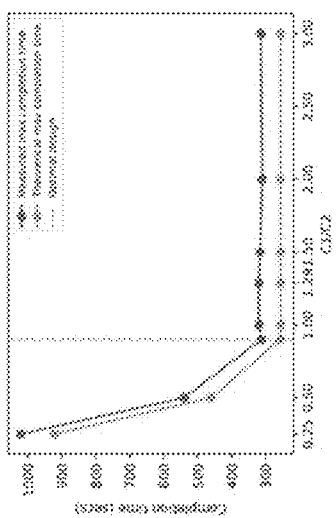
Figure 20C:
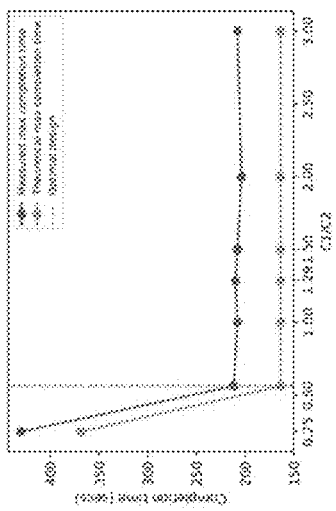

In FIGS. 20A-20C we present experiments using a skewed traffic pattern consisting of $b(f)=1$ for interpod flows and $b(f)=\sigma$ for intrapod flows, with $\sigma \in \{2,4,10\}$. Using Equation (27), we have that the optimal design satisfies $c_1=a^2 \cdot c_2/(\sigma+2a)=9 \cdot c_2/(\sigma+6)$. This leads to three optimal designs, one for each traffic pattern: $c_1=1.125 \cdot c_2$ for $\sigma=2$, $c_1=0.9 \cdot c_2$ for $\sigma=4$, and $c_1=0.5625 \cdot c_2$ for $\sigma=10$. FIGS. 20A-20C show that, experimentally, the interconnect behaves as QTBS predicts, minimizing network completion time right at the optimal design for each of traffic skewness value. As predicted by the model, for any design allocating more capacity in the interpod links than the optimal design, network completion time does not improve. Network architects should avoid these designs.

7 Assumptions and Generalizations

In our model, an optimal design is one that outperforms (in network completion time and throughput) any other design with the same or less cost, where cost corresponds to total capacity. The design is considered optimal when it is generally not possible to outperform that design by shifting capacity from one region of the network to another, or by reducing the total aggregated link capacity. QTBS however is general, and contemplates other definitions of cost. For instance, certain links might be more expensive than others (e.g., interpod links that often require longer cabling could be more expensive than intrapod links), or in some cases it may be important to model the cost of the switch or the cost of the pod in addition to links. QTBS can model such other cost metrics.

We can use our framework to design optimal overlay networks in addition to the underlying hardware network. Thus, multiple network tasks with different traffic patterns can be handled efficiently, by designing each different overlay as a network having its own expected or specified traffic pattern. The changes in the workload of the network, e.g., a hardware network or an overlay network, would result in a change in the corresponding traffic pattern, which can be used to reconfigure the hardware network or an overlay network.

The techniques described herein can also be used to address the multi-tenancy network-resource allocation (e.g., link capacities or bandwidths, number of switches/routers, etc.) and network slicing problems. In a network slicing problem, the available resources of an underlying network are distributed across virtual or overlay networks to be supported. In particular, if an underlying hardware network is to be sliced into two or more (e.g., 5, 10, 30, etc.) virtual networks, the optimal designs may be determined for each such virtual or slice network based on the respective traffic patterns thereof. The optimal designs (e.g., in terms of link capacities and/or the number of switches) for one or more of such virtual or slice networks (typically the highest priority networks) may be used to determine network-resource allocation for all the slices.

To illustrate, suppose a hardware network is to be sliced into three virtual networks V1, V2, V3, of which the network V1 is high priority. Based on the expected traffic patterns and specified completion time for the network V1, the required link capacities and/or the required number of switches for V1 can be determined. Networks V2 and V3 may be designed in a similar manner. If the resources of the underlying network can support all three designs, network resources (link capacities, switches/routers, etc.) may be allocated for each network accordingly.

If the resources of the underlying network cannot support all three designs, however, resources required by the high priority network V1 may be allocated to that network. The remaining resources may then be allocated in proportion of the respective resources requirements of networks V1 and V2, where those resource requirements are determined according to the respective optimal designs of networks V2 and V3. The proportional allocation of resources for V2 and V3 may be weighted according to the respective priorities of V2 and V3. In some cases, all virtual networks may be allocated resources proportionally, based on their respective optimal designs, and where the proportions are weighted according to the respective network priorities.

The techniques described herein can also be used to design a network on-chip (NOC). A NOC is a network integrated into a microprocessor that connects multiple processing cores. NOCs allow processors to scale up performance by integrating multiple cores. Cores execute tasks in a distributed fashion and use the NOC to exchange data. NOCs in a microprocessor face similar design challenges as those faced by interconnects in a datacenter, and, thus, use similar congestion control, routing and topology solutions.

For instance, a NOC can use a fat-tree, a folded-Clos or a dragonfly topology. Depending on the type of tasks the chip needs to execute, certain topologies might be more performant than others. Using the techniques described herein, chip designers can identify optimized topologies.

We refer to data networks in the discussion above for the sake of convenience only. The techniques described herein are generally applicable to networks that transport commodity flows and also to systems that can be modeled as networks. In addition to data networks, examples include (but are not limited to) vehicle networks, energy networks, fluidic networks, and biological networks. For example, the problem of vehicle networks generally involves identifying optimized designs of the road system that allows for a maximal amount of vehicles that can circulate through the network without congesting it or, similarly, minimizing the level of congestion for a given amount of circulating vehicles. In this case, vehicles are analogous to packets in a data network, while flows correspond to the set of vehicles going from location A to location B at a given time that follow the same path.

The capacity planning techniques described herein can be used to analyze the need to construct and/or widen a road, and/or to add one or more lanes, to mitigate congestion hotspots and compute the right amount of capacity needed for each road segment.

The problem of energy networks generally includes transporting energy from the locations where energy is generated to the locations where it is consumed. For instance, energy can be in the form of electricity carried via the electrical grid. Other examples include fluidic networks, which can carry crude oil, natural gas, water, etc., or biological networks that may carry water, nutrients, etc. In these networks, substations can be brough on-line or off-line, which is analogous to adding or removing switches in a data network.

Biological networks, through evolution, may tend to organize themselves in optimized structures that maximize their performance (in terms of transporting nutrients) and/or minimize the transportation costs. For instance, a tree transports sap from the root to its branches and in both directions. The sap transported from the root to its branches and leaves is called xylem, which carries energy and nutrients found from the soil where the tree is planted. The sap transported from the leaves and branches to the root is called phloem, which carries also important nutrients obtained from the biochemical process of photosynthesis performed in the cells of the leaves. In both networks (upward and downward), it is likely that the network transporting the sap performs optimally in terms of minimizing the amount of energy required to transport a given amount of sap. Such optimized designs can be generated for other types of bio-inspired networks, using the techniques described herein.

In case of data networks, the network nodes may be data centers and/or computing centers, the links include data links, whether cable, wireless, or satellite based, the flow rates may include number of bits, bytes, packets, etc., passing through the links, and link capacities may be expressed in terms of available or allotted bandwidth or bit rate. In case of transportation networks, the network nodes can be cities, locations within cities or a metropolitan area, airports, marine ports, etc., the links can be roadways, railways, subway routes, airline routes, marine routes, etc., the flow rates and link capacities can be expressed in terms of the number of passengers or travelers, the number of vehicles, number of lanes, tracks, or channels, the number of cars on a train, the number of containers on a ship, etc.

In case of energy networks, the network nodes can be energy generators such as power plants and consumers, such as towns, cities, industrial complexes, shopping centers, etc. The links include energy delivery systems including high-voltage transmission lines, substations (which can also be considered as switches), local energy distribution lines, etc. The flow rates and link capacity can be expressed in terms of peak energy demand, average energy demand, etc.

In case of fluidic or biological networks, the nodes can be sources and consumers of material, such as oil, gas, nutrients, blood, etc., and the link capacity can be the sizes of conduits or vessels carrying the fluids or biological materials, the pressure in such conduits or vessels, etc. In some cases, the capacity and/or rate of flow in one or more conduits/vessels can be adjusted by shutting off or pruning other conduits/vessels. The flow rate optimization and/or capacity planning can thus be used to manage or control irrigation systems, fertilizer delivery system, plant/crop disease control systems, etc.

8 Conclusions

We present a model to compute optimal link capacity settings in data center networks based on the recently introduced Quantitative Theory of Bottleneck Structures (QTBS). Using this framework, we show that for interconnects with traffic patterns that are interference-free, there exists a design that optimizes both the completion time and throughput needed to execute such traffic patterns. We demonstrate that fat-trees, folded-Clos and dragonfly topologies satisfy this property for typical production traffic patterns that display data locality properties. In particular, we identify the set of designs that are always inefficient (more costly without yielding any performance benefit), regardless of the traffic pattern. QTBS proves that if the traffic pattern is such that more data is transmitted between two hosts in the same pod than two hosts in different pods (which holds in most production interconnects), proportional designs are optimal in both latency and throughput. Moreover, we demonstrate that increasing the capacity of the interpod links (the most expensive layer in modern data center interconnects) above the value determined by this optimal design yields no performance gain. These results provide an engineering framework to help network architects and operators identify the right size of an interconnect that delivers maximum performance while avoiding unnecessary costs. Forthcoming work will focus on applying QTBS to production-level traffic patterns and validating these results in production interconnects.

The contributions of the discussion above are as follows:
- We introduce a class of network designs called proportional designs. We show that for traffic patterns that we call interference-free, proportional designs achieve maximal throughput and minimal flow completion time for any fixed cost (Section 2).
- We show that three widely-used types of data center topologies—fat-tree (Section 3), folded-Clos (Section 4), and dragonfly (Section 5)—are interference free for common traffic patterns that exhibit data locality properties.
- We derive optimal designs for these topologies and identify designs that are wasteful and ought to be avoided (Sections 3-5).
- Through extensive simulations using production-grade TCP/IP code, we demonstrate that the predictions of our theory hold for the three studied topologies (Section 6).

9 Appendices

A Mathematical Proofs

A.1 Proof of Theorem 2.6

Optimality of wasteless designs. For a given topology and traffic pattern, if a design c is wasteless, then it is impossible to improve on the network completion time or network throughput of the design without adding more capacity. That is, if c' is an alternative design for which $\mu(b,c') < \mu(b,c)$ or $T(b,c') > T(b,c)$, then $\Sigma_{l \in \mathcal{L}} c'(l) > \Sigma_{l \in \mathcal{L}} c(l)$.

Proof. We first prove the statement regarding network completion time. The total amount of data transmitted by any flow f over the course of the transmission is b(f). So if $r_c(f,t)$ is the rate of flow f at time t under design c, then $$b(f) = \int_0^{\mu(b,c)} r_C(f, t) dt$$

Taking sums on both sides:

$$\sum_{l \in \mathcal{L}} \sum_{f \in \mathcal{F}_l} b(f) = \int_0^{\mu(b,c)} \sum_{l \in \mathcal{L}} \sum_{f \in \mathcal{F}_l} r_C(f, t) dt$$

where $\mathcal{F}_l$ is the set of flows that use link l. The same holds for the alternative design c':

$$\sum_{l \in \mathcal{L}} \sum_{f \in \mathcal{F}_l} b(f) = \int_0^{\mu(b,c')} \sum_{l \in \mathcal{L}} \sum_{f \in \mathcal{F}_l} r_{c'}(f, t) dt$$

As always, the rates must respect the capacity constraint of each link:

$$\sum_{f \in \mathcal{F}_l} r_{c'}(f, t) \le c'(l)$$

Combining this with the equation above, $$\sum_{l \in \mathcal{L}} \sum_{f \in \mathcal{F}_l} b(f) \le \int_0^{\mu(b,c')} \sum_{l \in \mathcal{L}} c'(l) dt = \mu(b, c') \cdot \sum_{l \in \mathcal{L}} c'(l)$$

By assumption, the original design c is wasteless, so the full capacity of each link is used:

$$\sum_{f \in \mathcal{F}_l} r_c(f, t) = c(l)$$

Thus for c, we derive an equality instead of an inequality:

$$\sum_{l \in \mathcal{L}} \sum_{f \in \mathcal{F}_l} b(f) = \mu(b, c) \cdot \sum_{l \in \mathcal{L}} c(l)$$

Combining this with the inequality involving c' above, $$\mu(b, c) \cdot \sum_{l \in \mathcal{L}} c(l) \le \mu(b, c') \cdot \sum_{l \in \mathcal{L}} c'(l)$$

Thus, if $\mu(b,c') < \mu(b,c)$, then $\Sigma_{l \in \mathcal{L}} c(l) < \Sigma_{l \in \mathcal{L}} c'(l)$. If no bandwidth is wasted for one batch, the scheduling n batches sequentially wastes no bandwidth either. Thus the same argument proves the statement about network throughput.

A.2 Proof of Theorem 2.8

Non-proportional designs waste bandwidth. If a design wastes no bandwidth on a given traffic pattern, then it is the proportional design for the traffic pattern.

Proof. Let c be the design, and let b be the traffic pattern. Let $\mu$ be the completion time of the network. The design wastes no bandwidth, so for all links l and all $t \in [0,\mu]$, $$\sum_{f \in \mathcal{F}_l} r_c(f, t) = c(l)$$

where $\mathcal{F}_l$ is the set of flows that traverse link l. The total amount of data transmitted by a flow f during $[0,\mu]$ is exactly b(f) (i.e., all of its data), so taking the integral of the left side of the above equation, $$\int_0^\mu \sum_{f \in \mathcal{F}_l} r_c(f, t) dt = \sum_{f \in \mathcal{F}_l} \int_0^\mu r_c(f, t) dt = \sum_{f \in \mathcal{F}_l} b(f)$$

Integrating the right side of the equality above, $$\int_0^\mu c(l) dt = \mu \cdot c(l)$$

These two expressions are equal. Thus, $$c(l) = \frac{1}{\mu} \sum_{f \in \mathcal{F}_l} b(f)$$

and c is proportional.

A.3 Proof of Theorem 2.10

We first prove the following lemma:

LEMMA A.1. If the traffic pattern is interference free, all flows start transmitting at the same time, and the proportional design is used, then each flow's rate is proportional to its size: $r_f = \alpha \cdot b(f)$, where $\alpha$ is the coefficient of the proportional design.

Proof. We prove the lemma by induction on the flows f, going in order from smallest to largest (if there are repeated sizes, this order may not be unique but the argument still holds). The induction hypothesis is that all flows that precede f in this ordering have rates proportional to their size. This hypothesis holds for the first flow, since there are no preceding flows. Now let f be any flow. We must prove that if the induction hypothesis holds, then $r_f = \alpha \cdot b(f)$. Since b is interference-free, there exists a link l such that f traverses l, and for all flows f' that traverse l, $b(f') \le b(f)$. Since c is proportional, $$c(l) = \alpha \sum_{f' \in \mathcal{F}_l} b(f')$$

By the induction hypothesis, all flows for which $b(f')<b(f)$ have rates proportional to their size. Thus, the remaining capacity of l is $$c(l) - \sum_{\substack{f' \in \mathcal{F}_l \\ b(f')<b(f)}} \alpha \cdot b(f') = \alpha \sum_{\substack{f' \in \mathcal{F}_l \\ b(f')=b(f)}} b(f')$$

This capacity is divided among the remaining flows that traverse l, which all have the same size as f. Thus, the fair share of link l is $\alpha \cdot b(f)$, and the transmission rate of flow f is $\alpha \cdot b(f)$ too. By induction, the rate of any flow f is $r_f = \alpha \cdot b(f)$.

We now prove Theorem 2.10:

Interference-free proportional designs are wasteless. If the traffic pattern is interference free and all flows start transmitting at the same time, then the proportional design wastes no bandwidth, and furthermore, all flows finish transmitting at the same time.

Proof. By Lemma 10.3, for all $f \in \mathcal{F}$, $r_f = \alpha \cdot b(f)$ where $\alpha$ is the coefficient of the proportional design. For any link l, the unused capacity at the beginning of the transmission is $$c(l) - \sum_{f \in \mathcal{F}_l} r_f = c(l) - \sum_{f \in \mathcal{F}_l} \alpha \cdot b(f) = 0$$

Thus, at the beginning of the transmission, the capacity of each link is fully utilized. Since each flow's rate is proportional to its size, all flows finish simultaneously. Thus, none of the flows' rates change during the transmission. Thus, throughout the transmission, the capacity of each link is fully utilized.

A.4 Proportional Designs Yield Maximal Throughput

THEOREM A.2. For a given topology and traffic pattern, if the design of the network is proportional, then it is impossible to improve network throughput without adding more capacity to the network.

Proof. We will show that if the design is proportional, there exists some integer B and some schedule for B batches such that no bandwidth is wasted. By Theorem 2.2, this shows that any alternative design with a better completion time for the n batches must have more capacity than the proportional design, and continues to hold as the number of batches grows without bound. Assume without loss of generality that the size of each flow b(f) is an integer. (In this discussion, we use the word "flow" to mean one of the flows of a single batch, not one of multiple copies of these flows from different batches.) Let B be the least common multiple of $\{b(f)|f \in \mathcal{F}\}$. If $\alpha$ is the scale parameter of the proportional design, then we will transmit B batches according to the following schedule:

For each flow f, begin transmitting b(f) copies of f every $b(f)/\alpha$ seconds until time $B/\alpha$.

We now prove that for a proportional design, this schedule wastes no bandwidth. Since c is proportional, for each link l, the capacity is $$c(l) = \alpha \cdot \sum_{f \in \mathcal{F}_l} b(f)$$

For each $f \in \mathcal{F}_l$, we begin transmitting b(f) copies at time 0. Thus, the initial fairshare of link l is $$\frac{c(l)}{\sum_{f \in \mathcal{F}_l} b(f)} = \alpha$$

This is true for all links. Thus the initial transmission rate of each flow is $\alpha$. This means that no bandwidth is wasted; since there are b(f) copies of each flow traversing each link, $$\sum_{f \in \mathcal{F}_l} b(f) r_c(f, t) = \sum_{f \in \mathcal{F}_l} b(f) \cdot \alpha = c(l)$$

Thus, all b(f) copies of flow f will finish transmitting at time $b(f)/\alpha$. According to our schedule, these are immediately replaced by b(f) more copies of f. Thus, for as long as the network transmits, the rate of each flow is $\alpha$, and no bandwidth is wasted. At time $B/\alpha$, the number of times that we will have begun new transmissions of flow f is $B/\alpha \div b(f)/\alpha = B/b(f)$ (this is an integer since b(f) divides B by definition). During each of these periods, we transmit b(f) copies of f, so by the end we will have finished transmitting B copies. Since we have completed B copies of every flow, this schedule successfully transmits B batches in the time $B/\alpha$ without wasting any bandwidth. Furthermore, the throughput (completed batches per second) is $B \div B/\alpha = \alpha$ A.5 Proof of Lemma 3.1

Optimal fat-tree with uniform traffic. Consider a generalized fat-tree FT $([n_1, n_2, \ldots, n_L])$ and let $c_i$ be the capacity of its links at level i, for $1 \leq i \leq L$. Then, if the traffic pattern is uniform, it is interference-free and the following design is optimal:

$$c_i = \frac{\rho_i}{\rho_L} c_L \text{ where} \tag{14}$$

$$\rho_i = 2\left(\prod_{j=1}^{i} n_j - 1\right) \prod_{j=i+1}^{L} n_j^2 \tag{15}$$

Proof. We first derive an expression for $\rho_i$, the number of flows traversing each link in level i. Each edge divides the hosts into two groups—the set of descendants of the edge, and the complement of that set. Let $d_i$ be the number of hosts that are descendants of each link in level i of the tree. Then $$d_i = \prod_{j=i+1}^{L} n_j$$

We now count the number of flows that traverse each link in level i. For a given link, two flows traverse it for each pair of one host that is descendant of the link and one host that is not a descendant (two flows because there are two possible directions along that path). The total number of hosts in the tree is:

$$\prod_{j=1}^{L} n_j$$

$$\rho_i = 2\left(\prod_{j=1}^{L} n_j - d_i\right) d_i = 2\left(\frac{1}{d_i} \prod_{j=1}^{L} n_j - 1\right) d_i^2 =$$

-continued $$= 2\left(\prod_{j=1}^{i} n_j - 1\right)\prod_{j=i+1}^{L} n_j^2$$

Thus,

We now show that the design given in the lemma is optimal. First, note that the given traffic pattern is trivially interference-free, since all flows are the same size. Next, note that the design is proportional. Each link in level i has capacity $$c_i = \frac{\rho_i}{\rho_L} c_L$$

and is traversed by $\rho_i$ flows of equal size. Thus, the capacity of each link is proportional to the sum of the sizes of the flows traversing it. Thus, by Theorem 2.3 the design is optimal with respect to completion time and throughput.

A.6 Proof of Lemma 3.2

Optimal fat-tree with skewed traffic. Consider a generalized fat-tree $FT([n_1, n_2, \ldots, n_L])$ and let $c_i$ be the capacity of its links at level i, for $1 \leq i \leq L$. Assume a traffic pattern $b(f)=\sigma_i$, where f is a flow that traverses a link in level i, but no link in level i−1. If $i \leq j \sigma_i \leq \sigma_j$ for all $1 \leq i,j \leq L$, then the traffic pattern is interference free and the following design is optimal:

$$c_1 = \pi_1 \sigma_1 \quad (16)$$

$$c_i = \pi_i \sigma_i + \frac{c_{i-1}}{n_i} \text{ where} \quad (17)$$

$$\pi_i = (n_i - 1)\prod_{j=i+1}^{L} n_j^2 \quad (18)$$

Proof. We begin by deriving the expression for $\pi_i$, which is the number of flows that traverse each link in level i but do not traverse any link in level i−1. According to our definition of the traffic pattern, these flows will all be of size $\sigma_i$. The number of hosts that are descendants of each link in level i is $$d_i = \prod_{j=i+1}^{L} n_j$$

(See the proof of Lemma 3.1.) Any given link in level i has a single parent link in level i−1. For a flow to be counted in $\pi_i$, it must traverse the given link, but not its parent. That is, it must have one endpoint that is a descendant of the given link, and one endpoint that is a descendant of the given link's siblings. Since the given link is in level i, it has i siblings, and each of them has $d_i$ descendants. Thus, $$\pi_i = 2d_i \cdot (n-1)d_i = 2(n-1)\prod_{j=i+1}^{L} n_j^2$$

(We include the factor of two because there are two possible flows for each pair of hosts, one in each direction).

We now show that the specified design is optimal. Note that while multiple designs specify the given equations, they are all equivalent up to scaling. First note that because of the assumption $\sigma_i \leq \sigma_j$, the traffic pattern is interference free. The flows of size $\sigma_i$ traverse links of level i, which are only traversed by other flows of smaller or equal size $\sigma_1, \ldots \sigma_i$. Second, we prove by induction that the given design is proportional. By definition, the number of flows that traverse each link in level 1 is simply $\pi_1$. Thus, for links in level 1:

$$\sum_{f \in \mathcal{F}_l} b(f) = \pi_1 \sigma_1 = c_1$$

So far, the design is proportional. Now assume that for all links in levels $1 \leq i \leq N-1$, the capacity corresponds to that of a proportional design:

$$c_i = \sum_{f \in \mathcal{F}_l} b(f)$$

Each switch in level i−1 has $n_i$ children, all with symmetric traffic. Thus, for each class of flows $\sigma_1 \ldots \sigma_{i-1}$, the number of flows of that class that traverse each link in level i−1 is $n_i$ times the number that traverse each link in level i. So the contribution of flows in the classes $\sigma_1 \ldots \sigma_{i-1}$ to $\Sigma_{f \in \mathcal{F}_l} b(f)$ is simply $c_{i-1}/n$. In addition, $\pi_i$ flows traverse each link in level i that do not traverse level i−1. These flows are of size $\sigma_i$. Thus for all l in level i $$\sum_{f \in \mathcal{F}_l} b(f) = \pi_i \sigma_i + \frac{c_{i-1}}{n_i} = c_1$$

By induction, the formula holds for links in all levels $1 \leq i \leq L$. Since the traffic pattern is interference free and the design is proportional, by Theorem 2.3 the design is optimal with respect to completion time and latency.

A.7 Proof of Lemma 3.2

Design space of fat-trees FT(n,2). Consider a fat-tree FT(n,2) and let $c_1$ and $c_2$ be the capacity of its spine and leaf links, respectively. Without loss of generality, let $b(f)=1$ for interpod flows, and $b(f)=\sigma$ for intrapod flows. Then, 1. If $\sigma \geq 1$, the optimal design satisfies $c_1 \leq n^2 \cdot c_2/(n+1)$.
2. If $0 < \sigma < 1$, the proportional design satisfies $n^2 \cdot c_2/(n+1) < c_1 < n \cdot c_2$, but every design wastes bandwidth.
3. If $\sigma = 0$, the optimal design corresponds to $c_1 = n \cdot c_2$.

Proof. Applying Lemma 3.2, and substituting $n_1 = n_2 = n$ and L=2, the proportional design is $$c_1 = (n-1)n^2 \sigma_1$$

$$c_2 = (n-1)\sigma_2 + \frac{(n-1)n^2}{n}\sigma_1$$

Substituting $\sigma_1 = 1$, $\sigma_2 = \sigma$, $$c_1 = (n-1)n^2$$

$$c_2 = (n-1)\sigma + \frac{(n-1)n^2}{n} = (n-1)(\sigma + n)$$

It follows immediately that $$c_1 = \frac{n^2}{n+\sigma} c_2$$

The inequalities in the three cases all follow from plugging the hypotheses about $\sigma$ into the above equation. The optimality of the proportional design in cases (1) and (3) follows from the fact that the traffic patterns are interference free in these cases. It remains only to show that when $0<\sigma<1$, every design wastes bandwidth. By Theorem 2.3, it suffices to show that the proportional design wastes bandwidth. For the proportional design, the initial fair share allocation of each links is the quotient of its capacities and the number of flows that traverse it:

$$\frac{c_1}{(n-1)n^2} = 1$$

$$\frac{c_2}{n-1+n(n-1)} = \frac{\sigma+n}{1+n} < 1$$

Since the leaf links have the smaller initial allocation, they are the initial bottlenecks for both interpod and intrapod flows, and bandwidth is wasted at the spine links.

A.8 Proof of Lemma 4.1

Optimal 3-level folded-Clos with radix k and skewed traffic. Assume a traffic pattern $b(f)=\sigma_i$, where f is a flow that traverses a link in level i, but no link in level i−1. Assume that $\sigma_1=1$ and $\sigma_2=\sigma_3=\sigma$. Then, the traffic pattern is interference-free and the oversubscription parameter $$\omega(k, \sigma) = \frac{k}{2\beta(k, \sigma)}$$

corresponds to the optimal design, where $$\beta(k, \sigma) = \left\lceil \frac{(k^4 - k^3)}{2(k^3 - k^2) + \sigma(2k^2 - 8)} \right\rceil \quad (19)$$

is the number of deployed spine blocks and $\lceil \cdot \rceil$ is the ceiling operator. Equivalently, a Clos(k,3) with $\beta$ spine blocks is optimal if $\sigma_1=1$ and $\sigma_2=\sigma_3=\sigma(k,\beta)$, where:

$$\sigma(k, \beta) = \begin{cases} \frac{(k^3 - k^2)(k - 2\beta)}{2\beta(k^2 - 4)}, & \text{for } 1 \leq \beta < k/2 \\ 1, & \text{for } \beta = k/2 \end{cases} \quad (20)$$

Proof. From Theorem 2.3, we know that the optimal design is one that makes all flows complete at the same time in the following network configuration:
1. Set up a flow between every pair of hosts in the folded-Clos network;
2. Have each host start transmitting data to every other host according to the traffic pattern b(f).

Consider an oversubscribed configuration of the folded-Clos. From FIG. 24A (discussed below), we know that interpod flows are bottlenecked at the spine links while intrapod flows are bottleneck at the leaf (or edge) links. Using QTBS, since interpod flows are bottlenecked at the top level in the bottleneck structure, their transmission rate $r_1$ can be obtained by dividing the capacity of a spine link with the total number of flows traversing it. It's easy to see that the total number of flows traversing a spine link when $\beta=k/2$ (i.e., an oversubscription of 1:1) is $\rho_1=k^3/2-k^2/2$. Such number increases by a factor of $k/(2\beta)$ when only $\beta$ spine blocks are deployed, i.e., $\rho_1=(k^3/2-k^2/2)\cdot k/(2\beta)$. Taking a normalized spine link capacity of $c_1=1$, this yields:

$$r_1 = \frac{c_1}{\rho_1} = \frac{1}{\rho_1} = \frac{2\beta/k}{(k^3 - k^2)/2} = \frac{4\beta}{k^4 - k^3}$$

Figure 24A:
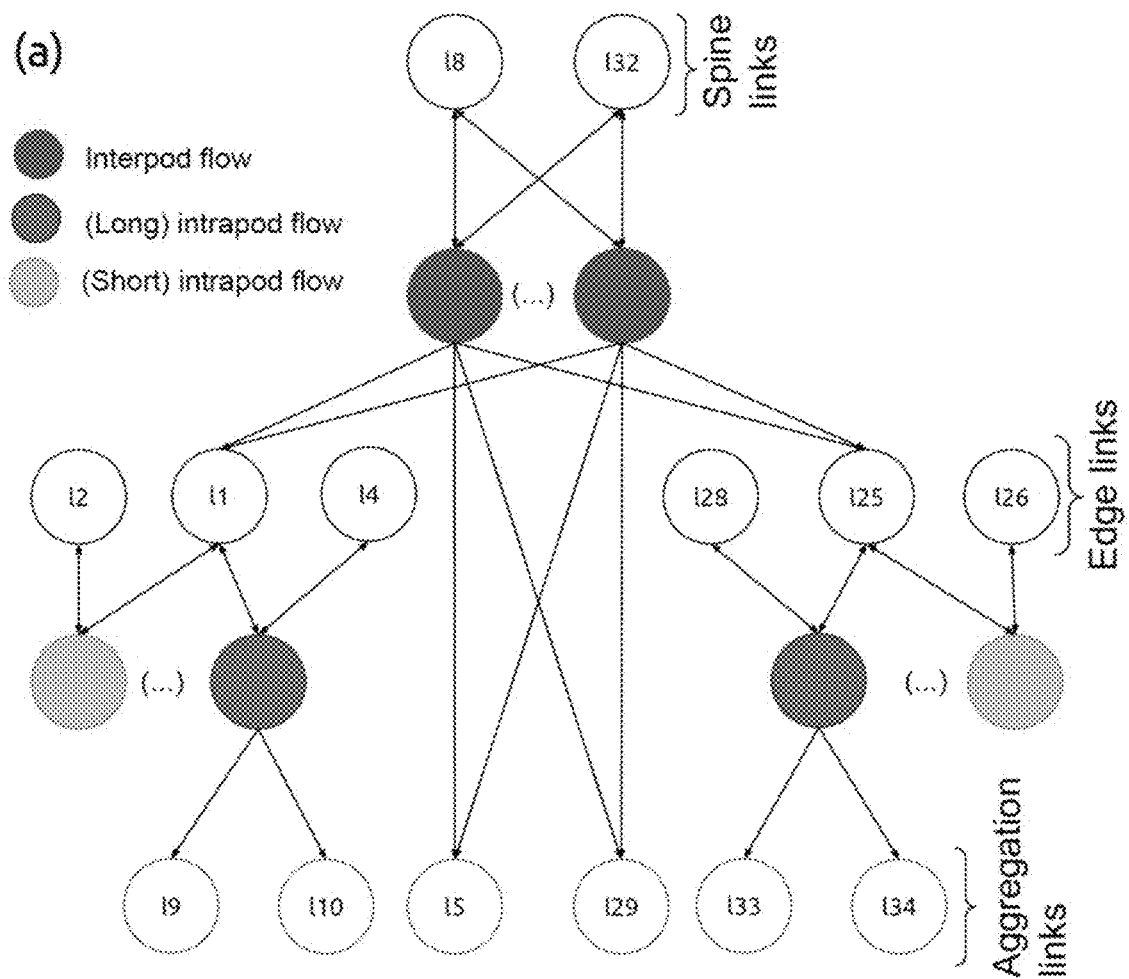
FIGS. 24A-24B show the respective bottleneck structures in an oversubscribed and undersubscribed Clos(4,3) network.
Figure 24B:
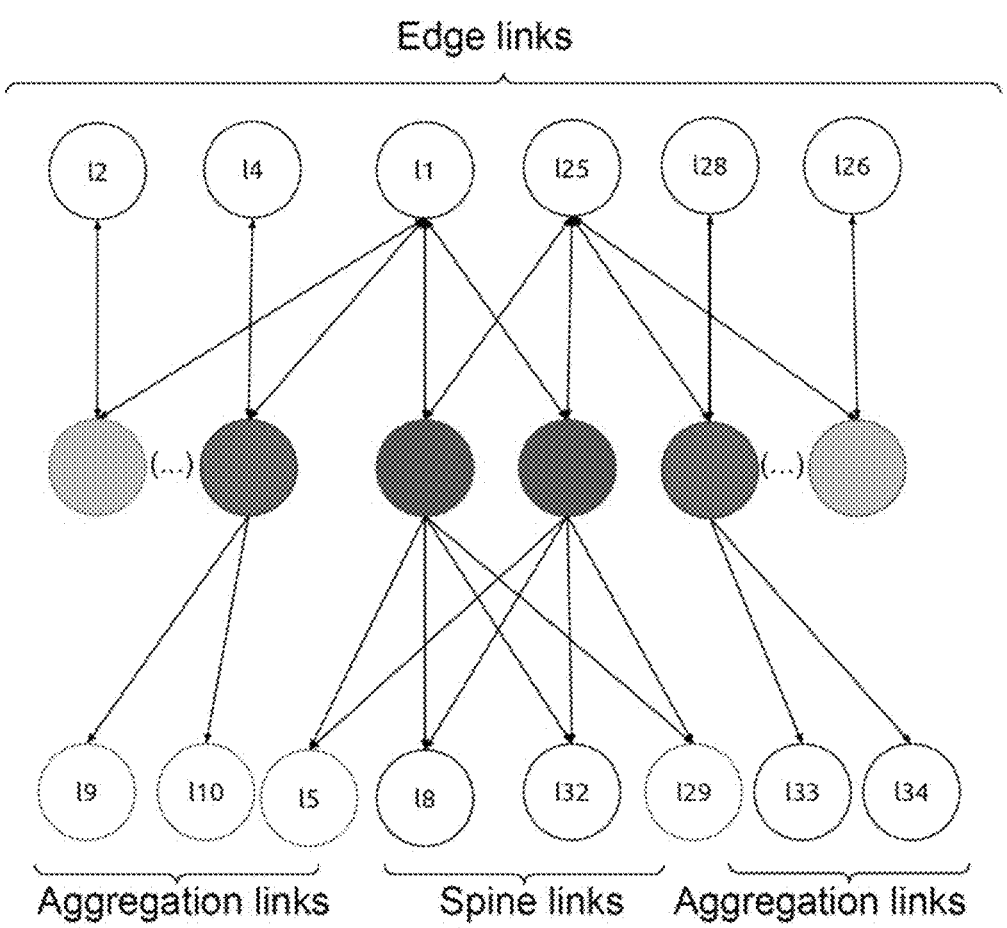

From FIGS. 24A-24B, the intrapod flows are bottlenecked at the leaf links. It's easy to see that the number of flows traversing a leaf link (the third level in the folded-Clos) is $\rho_3=k^3/2-2$. These flows will get a fair share of the leaf link capacity minus the bandwidth taken by the interpod flows (since these also traverse the leaf links), leading to the following transmission rate for both long and short intrapod flows (taking again the normalized leaf link capacity of $c_3=1$):

$$r_2 = r_3 = \frac{1 - r_1 \cdot \rho_1}{\rho_3 - \rho_1} = \frac{2(k - 2\beta)}{k(k^2 - 4)}$$

Using Theorem 2.10, the optimal design equalizes flow completion time, thus we have:

$$\frac{1}{r_1} = \frac{\sigma}{r_3}$$

Doing some algebraic manipulation we obtain:

$$\beta = \frac{(k^4 - k^3)}{2(k^3 - k^2) + \sigma(2k^2 - 8)}$$

Since folded-Clos is a discrete network, we need to take the smallest integer that is higher than the above expression, leading to Equation (19). Equation (20) can also be derived from the above expression in a straightforward manner.

A.9 Proof of Lemma 4.1

Network Completion Time of a 3-Level Folded-Clos with Radix k and Skewed Traffic.

Assume that every host sends $\sigma$ bits of information to every other host located in the same pod and 1 bit of information to every other host located in a remote pod. The network completion time of a 3-level folded-Clos with radix k is:

$$\mu(\beta, \sigma) = \begin{cases} \frac{k^2 + \sigma(k^3 - k^2) - 4}{2c}, & \text{if } \sigma \leq \sigma(k, \beta) \\ \frac{\sigma(k^2 - k^3)}{4\beta c}, & \text{otherwise} \end{cases} \quad (21)$$

where c is the capacity of each switch port.

Proof. This proof is similar to the proof of Lemma 4.1.

B Formal Definition of the Bottleneck Structure Graph

At the core of QTBS lies the concept of a bottleneck. The theory builds upon a definition that captures the mathematical relationship between a link and a flow bottlenecked at it:

Definition B.1. Bottleneck link. Let $\mathcal{L}$ and $\mathcal{F}$ be the sets of links and flows in a network, respectively. Let $c_l$ and $r_f$ be the capacity of link $l \in \mathcal{L}$ and the transmission rate of flow $f \in \mathcal{F}$, respectively. We say that flow f is bottlenecked at a link $l \in \mathcal{L}$ if and only if flow f traverses link l and $\partial r_f / \partial c_l \neq 0$.

The above definition provides the starting-point connection between QTBS and the congestion control problem. Intuitively, the transmission rate $r_f$ of a flow f depends on the capacity $c_l$ of its bottleneck link l. This is expressed mathematically with the expression $\partial r_f / \partial c_l \neq 0$; that is, a flow f is bottlenecked at a link l if and only if a change in the capacity of l affects flow f's transmission rate. Link l here constitutes the point of congestion of flow f. The key to a congestion control algorithm is to identify each flow's point of congestion and determine an optimal transmission rate that both maximizes throughput without creating congestion while ensuring fairness among all flows. Further, this definition allows us to introduce the concept of bottleneck structure, the core building block of QTBS used to model the system-wide performance of a network:

Definition B.2. Bottleneck Structure. Let $\mathcal{L}$ and $\mathcal{F}$ be the set of links and flows in a network, respectively. The bottleneck structure is the directed graph such that:
1. There exists a vertex for each link and each flow.
2. If $f \in \mathcal{F}$ traverses link $l \in \mathcal{L}$, then there exists a directed edge from f to l.
3. If $f \in \mathcal{F}$ is bottlenecked at link $l \in \mathcal{L}$, then there exists a directed edge from l to f.

The bottleneck structure of a network can describe how perturbations (small variations) in link capacities and flow transmission rates propagate through the network. Intuitively, imagine that flow f is bottlenecked at link l. From Definition B.2, this necessarily implies that a perturbation in the capacity of link l will cause a change on the transmission rate of flow f, $\partial r_f / \partial c_l \neq 0$. This is reflected in the bottleneck structure by the presence of a directed edge from link l to flow f (Condition 3 in Definition B.2).

A change in the value of $r_f$, in turn, affects all the other links traversed by flow f. This is reflected by the directed edges from f to the links it traverses (Condition 2). This process of (1) inducing a perturbation in a vertex (either in a link or a flow vertex) followed by (2) propagating the effects of the perturbation along the departing edges of the vertex creates a ripple effect in the bottleneck structure much like an instantaneous picture of a wave traveling through water, with some flows and links seeing an increment in the available bandwidth (the crest of the wave) and others seeing a reduction (the trough of the wave).

C Bottleneck Structure of Fat-Trees

For the sake of illustration, consider the case of the binary, 2-level fat-tree FT(2,2) shown in FIG. 1. To study the behavior of this network, we build its possible bottleneck structures by using the GradientGraph algorithm, introduced in the '718 application, the '261 application, and the '387 application, and plot them in in FIGS. 21A-21C. Depending on the design, the interconnect has one of three possible bottleneck structures, which we call oversubscribed (FIG. 21A), balanced (FIG. 21B) and undersubscribed (FIG. 21C). Note that when we use the terms oversubscribed and undersubscribed, we mean with respect to the balanced solution—not with respect to a full fat-tree, as sometimes that term is used in the literature. Each white vertex in the bottleneck structure represents a link, while each colored vertex represents a flow, with each flow's color indicating its path according to the coloring scheme of FIG. 1. (Note that since there is bidirectional communication between every pair of hosts, for each different color there are two vertices.)

These bottleneck structures allow us to make initial qualitative observations about the design problem for fat-trees. Consider a design in which the spine links are oversubscribed; for example, imagine that the leaf links each had a capacity of 100 and the spine links each had a capacity of 1. Clearly the interpod flows, which use the spine links, will experience a lower transmission rate than the intrapod flows, which do not use the spine links. This observation is reflected in the bottleneck structure corresponding to the oversubscribed configuration (FIG. 21A). Links 1 and 2 (the spine links) are at the top of the graph, since they constrain the flows that traverse them to have a very small rate. The interpod flows are bottlenecked at the spine links, so they are directly adjacent to them in the graph. The leaf links (links 3-6) do not bottleneck the interpod flows, but they are traversed by them; so according to the definition of bottleneck structure, they are directly adjacent to these flows in the graph. Finally, the intrapod flows are at the bottom of the graph because they only traverse the leaf links and so they get a very fast rate. This design is desirable when the intrapod flows transmit much more traffic than the interpod flows, because the intrapod flows get a correspondingly faster rate. But if all flows transmit the same amount of data, then the intrapod flows will finish transmitting long before the interpod flows, leading to wasted bandwidth at the leaf links later on.

Next consider a design in which the spine links are undersubscribed; for example, one where the leaf links have capacity of 1 and the spine links have capacity of 100. Now all flows (interpod and intrapod) are bottlenecked by the leaf links and experience equal rates, and the spine links aren't bottlenecks at all. This is reflected in the bottleneck structure for this case (FIG. 21C), where all flow vertices lie below the leaf links, and the spine links have no children in the graph. This bottleneck structure shows that this design wastes bandwidth, since we can reduce the capacity (and the cost) of the spine links without harming the performance of any flows. The balanced configuration is less costly (as it requires less capacity in the spine links) and is as performant as the undersubscribed configuration (since in both configurations all flows are bottlenecked at the leaf links and, thus, will experience the same throughput). Another way of seeing this is to note that spine links are not bottlenecks for any flows and, thus, some of their capacity is being wasted.

Finally, for the balanced configuration (FIG. 21B), all flows are bottlenecked at both the spine and the leaf links equally. Since all flows are on the same level of the bottleneck structure, they will all get the same rate. In Section 3.1 we prove that this design is optimal when the traffic pattern is uniform (Definition 2.2). Since production networks typically experience skewed traffic patterns, with intrapod flows sending more data than interpod flows, this design is usually sub-optimal.

D Traffic Skewness and Interconnect Size for FT(n,2)

Figure 22:
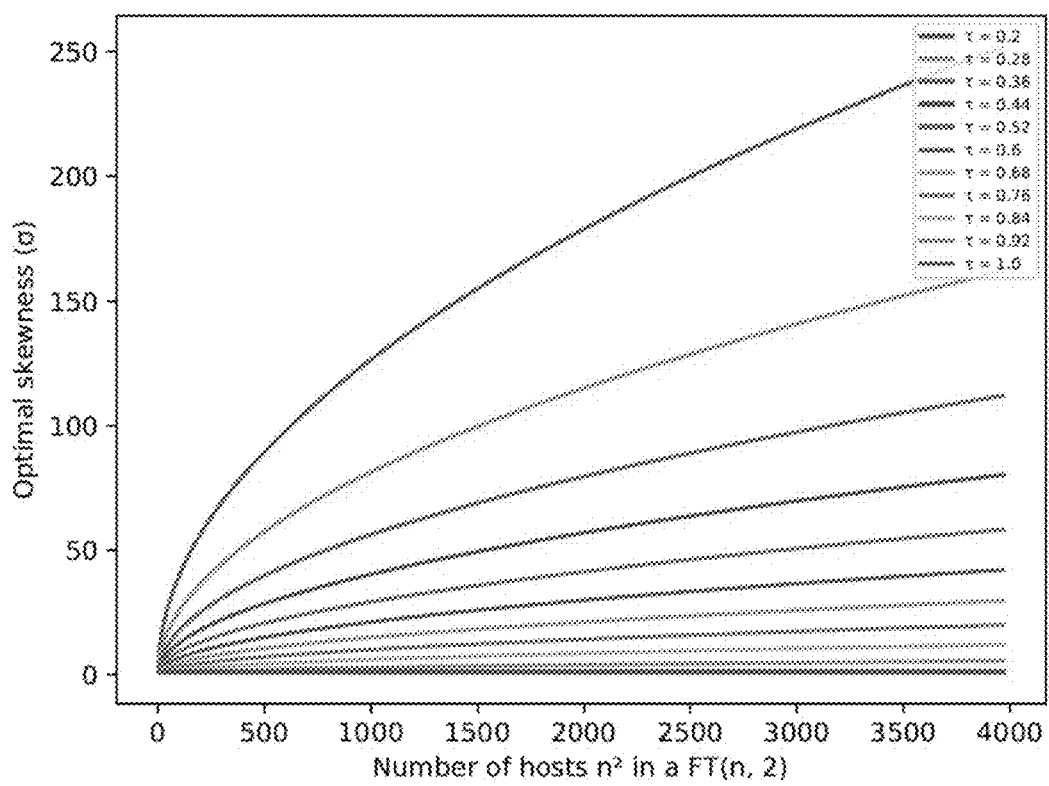
FIG. 22 depicts the optimal traffic skewness in FT(n,2) as a function of the number of hosts in the network.

In FIG. 22 we present a chart representing the traffic skewness value needed to optimally operate a FT(n,2) as a function of the number of hosts $n^2$ supported by the interconnect and for various tapering parameters T. As shown, the higher the degree of oversubscription (lower value of t), the higher the skewness level required to operate efficiently. In the limit where there is no oversubscription ($\tau=1$), the optimal skewness is a horizontal line $\sigma=1$ corresponding to the case of uniform traffic and a balanced bottleneck structure (e.g., FIG. 21B).

E Network Completion Time of Clos(48,3)

Figure 23:
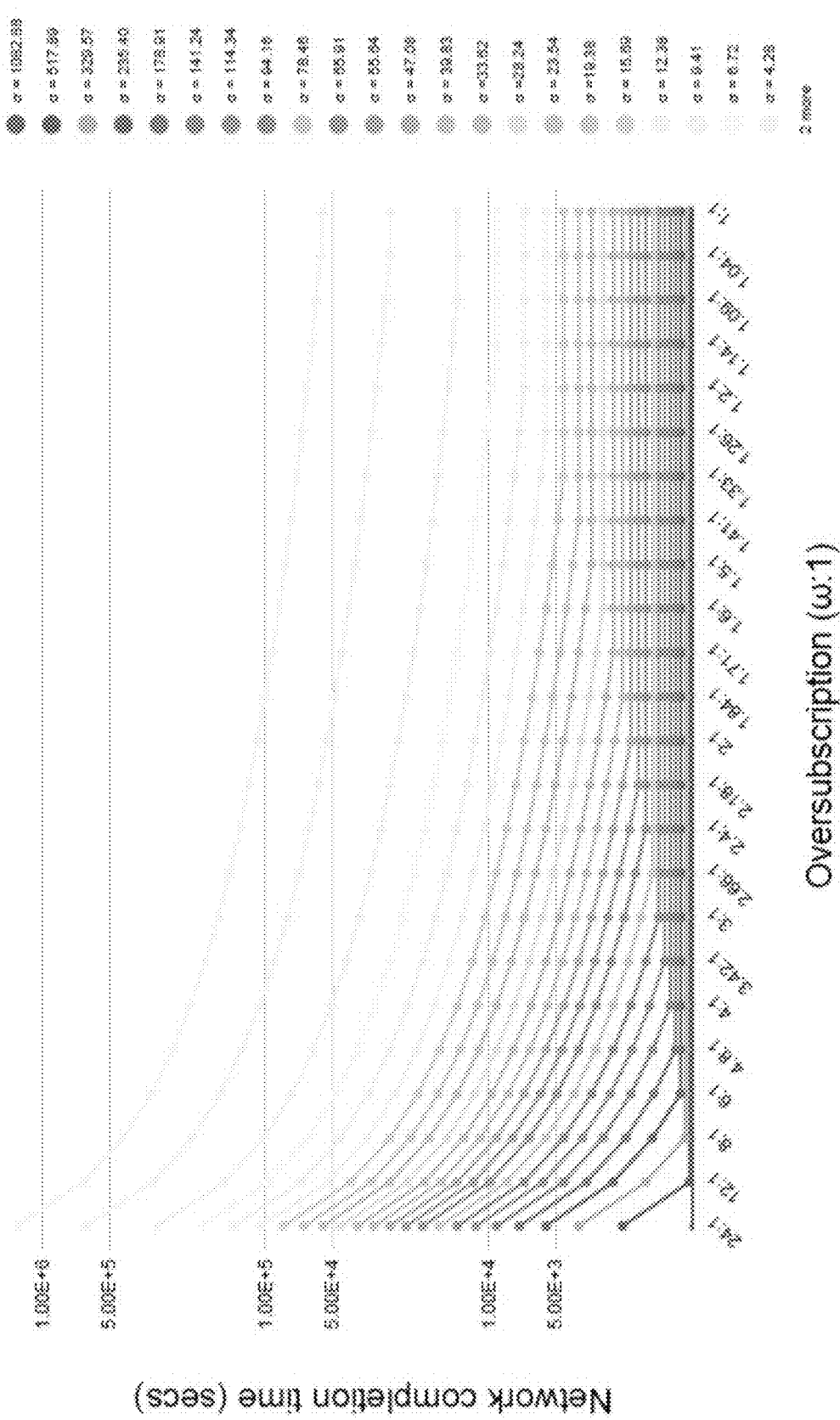
FIG. 23 illustrates the effect of oversubscribing a Clos (48,3) network on the maximum flow completion time.

FIG. 23 provides a plot of the network completion time as a function of the oversubscription parameter $\omega$ for a production-scale folded-Clos with radix k=48 assuming a normalized link capacity of c=1 bps. The plot is based on the network completion time Equation (13). In this chart, network completion time has been normalized to (divided by) $\sigma$ to better illustrate its asymptotic behavior, so the corresponding traffic pattern is $b(f)=1/\sigma$ for interpod flows and $b(f)=1$ for intrapod flows.

F Bottleneck Structure of Folded-Clos Networks

FIGS. 24A and 24B show the possible bottleneck structures of the Clos(4,3) interconnect. Link labels inside the white vertices and flow colors correspond to those used in FIG. 4. Because folded-Clos are discrete networks, there are only two possible bottleneck structures: oversubscribed (FIG. 24A) and undersubscribed (FIG. 24B). (Thus, unlike fat-trees, folded-Clos don't have a balanced bottleneck structure).

G G2-Mininet

The G2-Mininet tool provides a powerful, flexible interface to emulate networks of choice with customizable topology, routing and traffic flow configurations, with a focus to help experimentally demonstrate the quantitative theory of bottleneck structures (QTBS). It uses Mininet and the POX SDN controller to create such highly customizable networks. It also uses iPerf internally to generate network traffic and offers an interface to configure various flow parameters such as the source and destination hosts, routing, start time, data size, and traffic pattern, among others. G2-Mininet also offers an integration with sFlow-RT agent that enables real-time access to traffic flows and real-time computation of the emulated network's bottleneck structure.

The extensions to Mininet include scripts to automatically generate the specifications of data center networks such as fat-trees, folded-Clos and dragonflies, that are then used as inputs to the emulation environment to measure the accuracy of the QTBS model and equations. Mininet uses real, production grade TCP/IP stack from the Linux kernel, enabling a testbed to run experiments using congestion control protocols such as BBR, Cubic and Reno to study bottleneck structures and flow performance. Apart from its flexible configuration interface, G2-Mininet also offers a set of useful utilities to compute and plot various performance metrics such as instantaneous network throughput, flow convergence time, flow completion time, Jain's fairness index, and the computation in real time of the network's bottleneck structure, among others for a given experiment.

H Additional Experiments

Figures 25A, 25B, 25C:
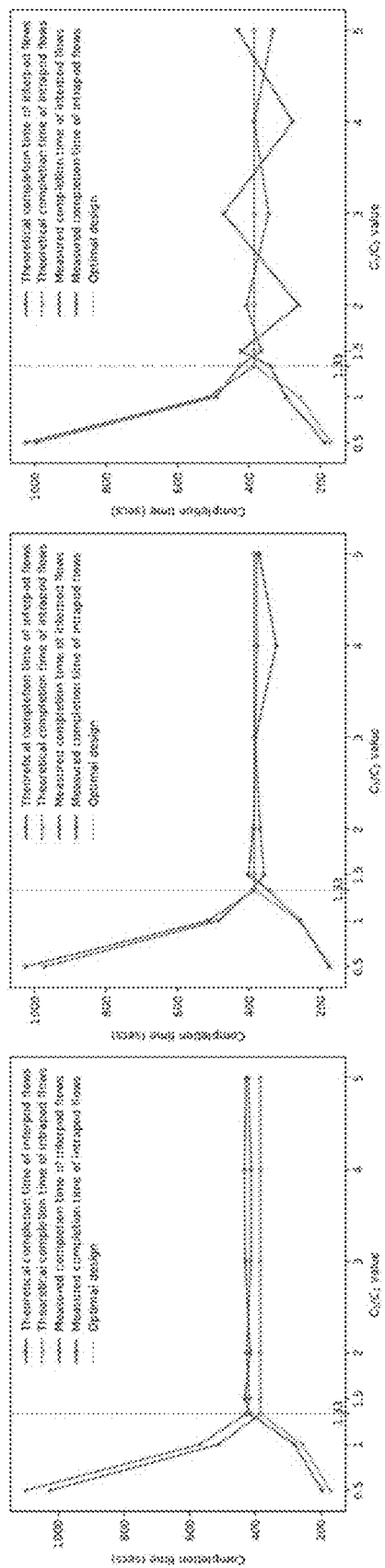
FIGS. 25A-25C show the flow completion times for different designs of a fat tree FT(2,2) network, assuming uniform traffic that is controlled using the BBR congestion-control algorithm.
Figure 26A:
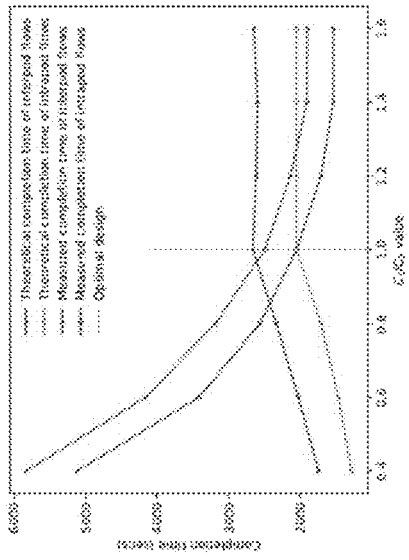
FIGS. 26A-26C respectively show the flow completion times for different designs of a fat tree FT(2,2) network for three different values of traffic skewedness network, where BBR was employed for congestion control.
Figure 26B:
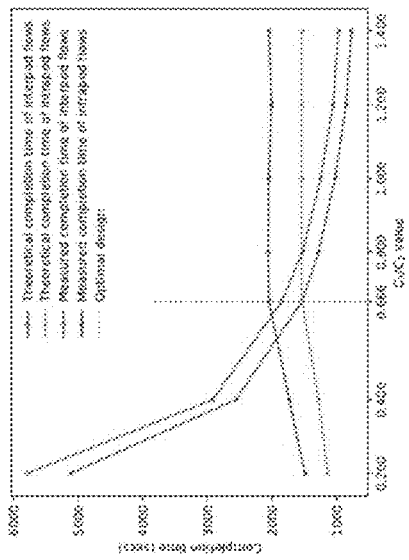
Figure 26C:
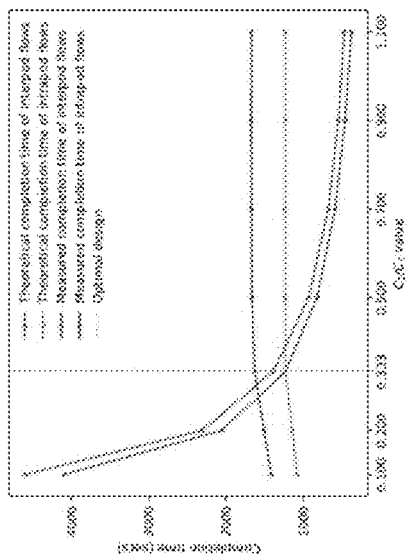
Figure 27A:
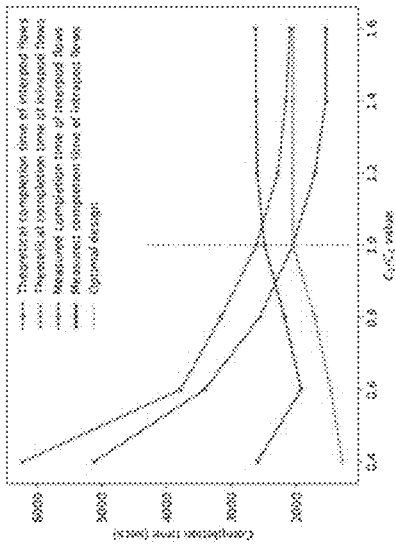
FIGS. 27A-27C respectively show the flow completion times for different designs of a fat tree FT(2,2) network for three different values of traffic skewedness network, where Cubic was employed for congestion control.
Figure 27B:
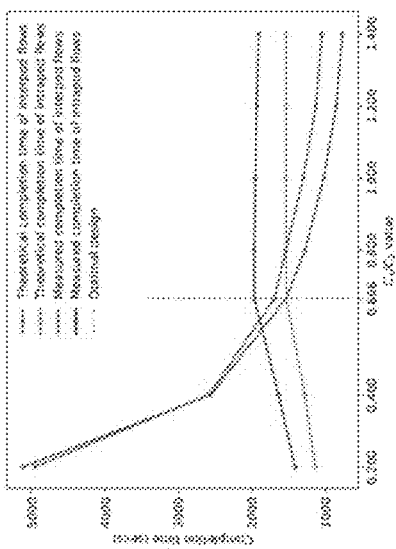
Figure 27C:
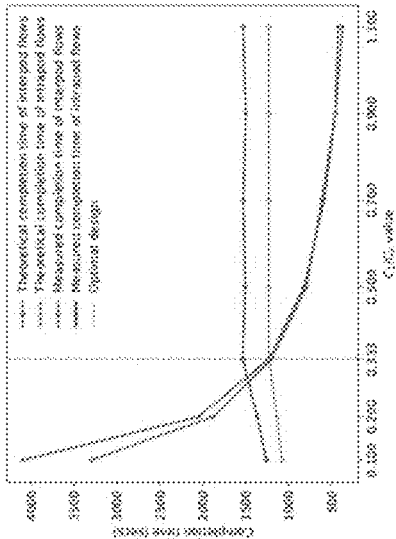
Figure 30C:
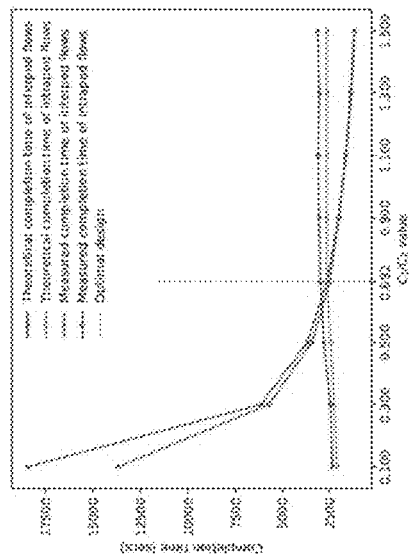
FIGS. 30A-30C respectively show the flow completion times for different designs of a fat tree FT(3,2) network for three different values of traffic skewedness network, where Reno was employed for congestion control.
Figure 30B:
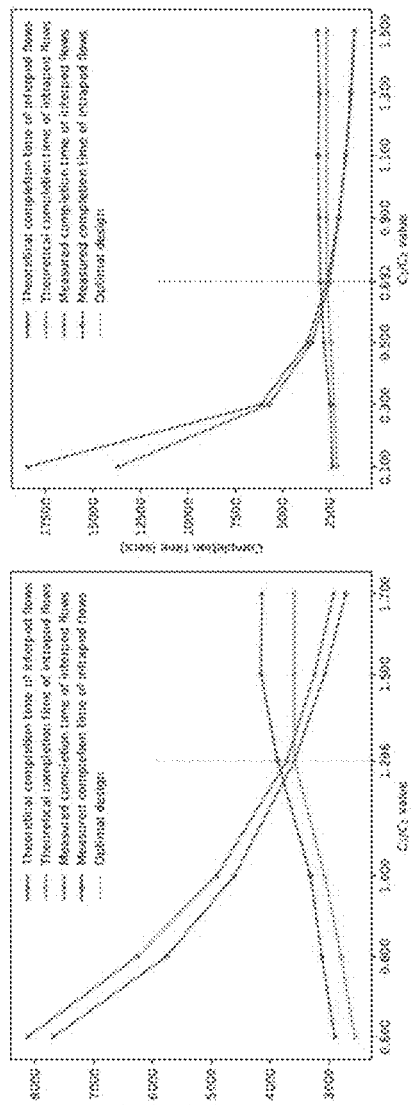
Figure 30A:
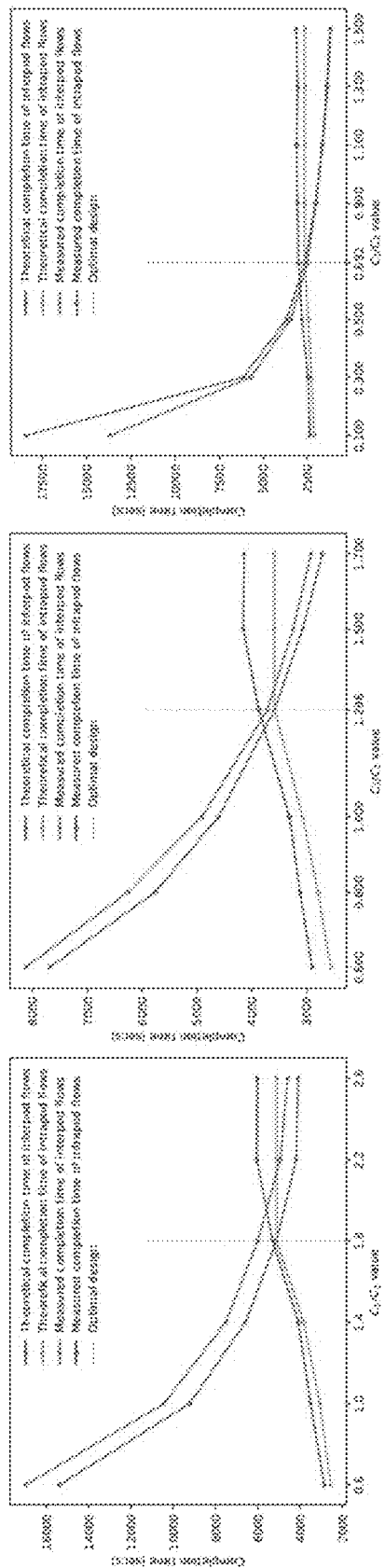

As mentioned in Section 6, more than 600 simulation (or the equivalent of 800 hours) were run to verify that the three interconnects behave according to the design equations presented herein. Specifically, FIGS. 25A-25C show a comparison of theoretical (using QTBS) and experimental (i.e., using the embodiments described in Section 3 and 6.1) flow completion times for a fat tree FT(2,2) assuming uniform traffic and employing BBR (FIG. 25A), Cubic (FIG. 25B), and Reno (FIG. 25C), for congestion control. The traffic pattern was changed to skewed traffic for the fat tree FT(2,2) employing BBR for congestion control. Results for different degrees of skewedness for different ratios of the interpod link capacity to intrapod link capacity ($c_1/c_2$) are shown in FIGS. A26A-26C, respectively. FIGS. 27A-27C show similar results, but when Cubic is use for congestion control, and FIGS. 28A-28C show similar results, but when Reno is use for congestion control. The experiments in FIGS. 27A through 27C were repeated for a different fat tree FT(3,2). These results are shown in FIGS. 29A through 30C.

Figure 31C:
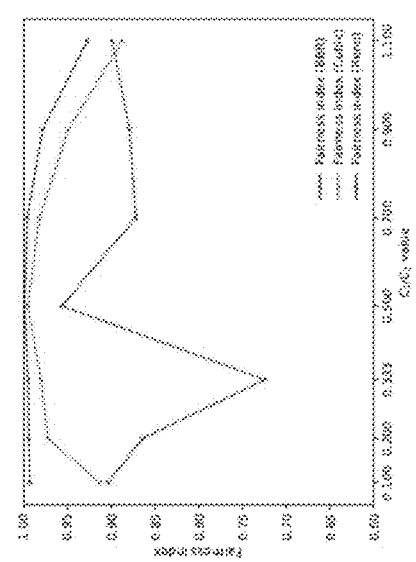
FIGS. 31A-31C respectively show Jain's fairness indices for the experiments for the fat tree FT(2,2) network.
Figure 31B:
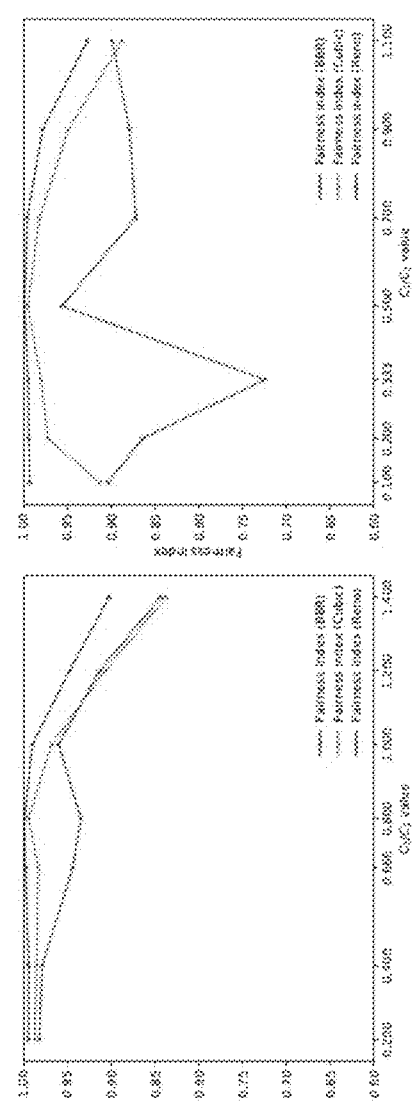
Figure 31A:
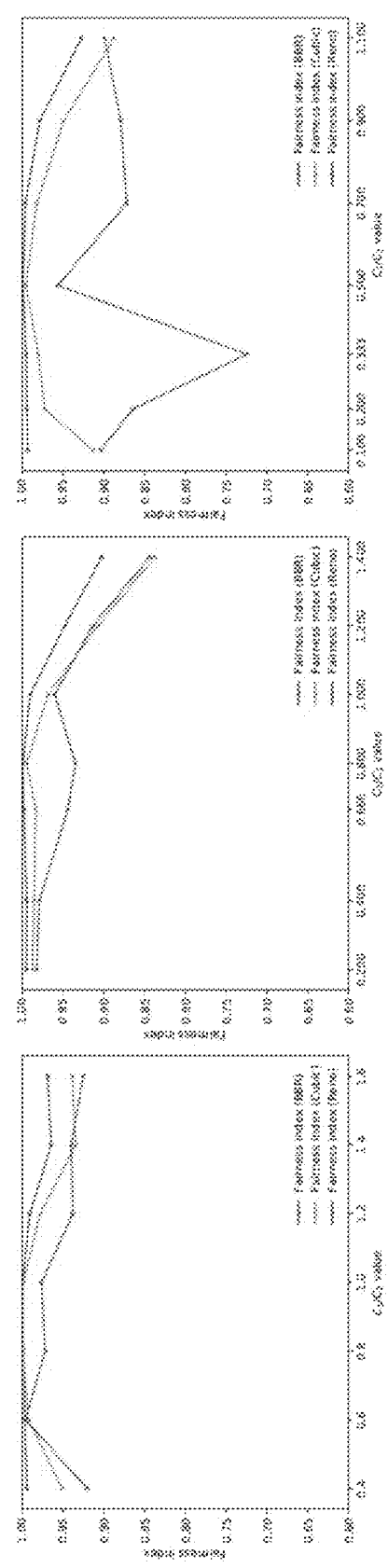
Figures 32A, 32B, 32C:
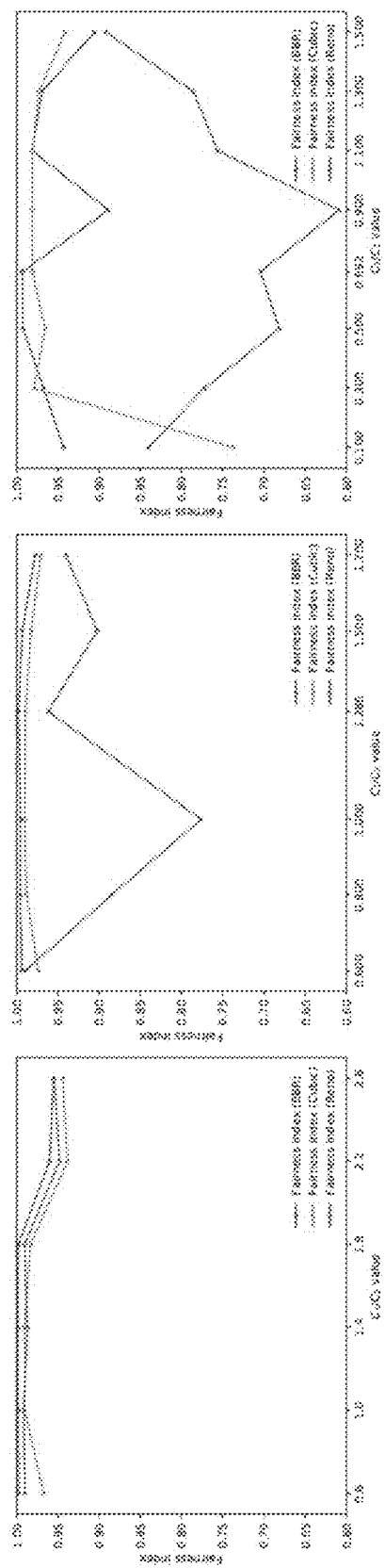
FIGS. 32A-32C respectively show Jain's fairness indices for the experiments for the fat tree FT(3,2) network.

Jain's fairness indices, which provide a measure of closeness between the theoretical and experimental results is shown in FIGS. 31A-31C for the experiments involving the fat tree FT(2,2). Similar indices are presented in FIGS. 32A-32C for fat tree FT(3,2).

I Design Tables for FT($[n_1,n_2]$)

Figure 33:
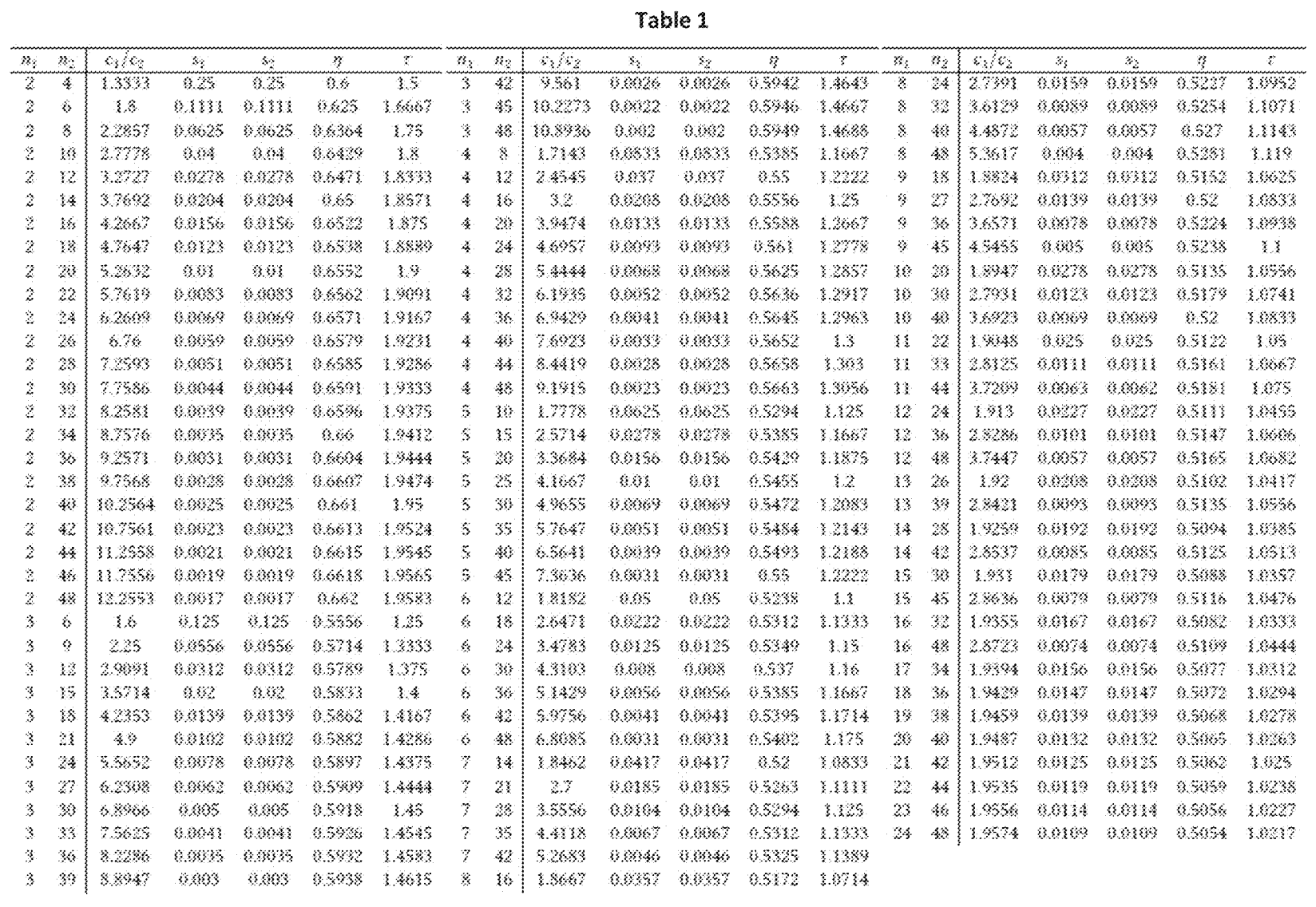
Figure 34:
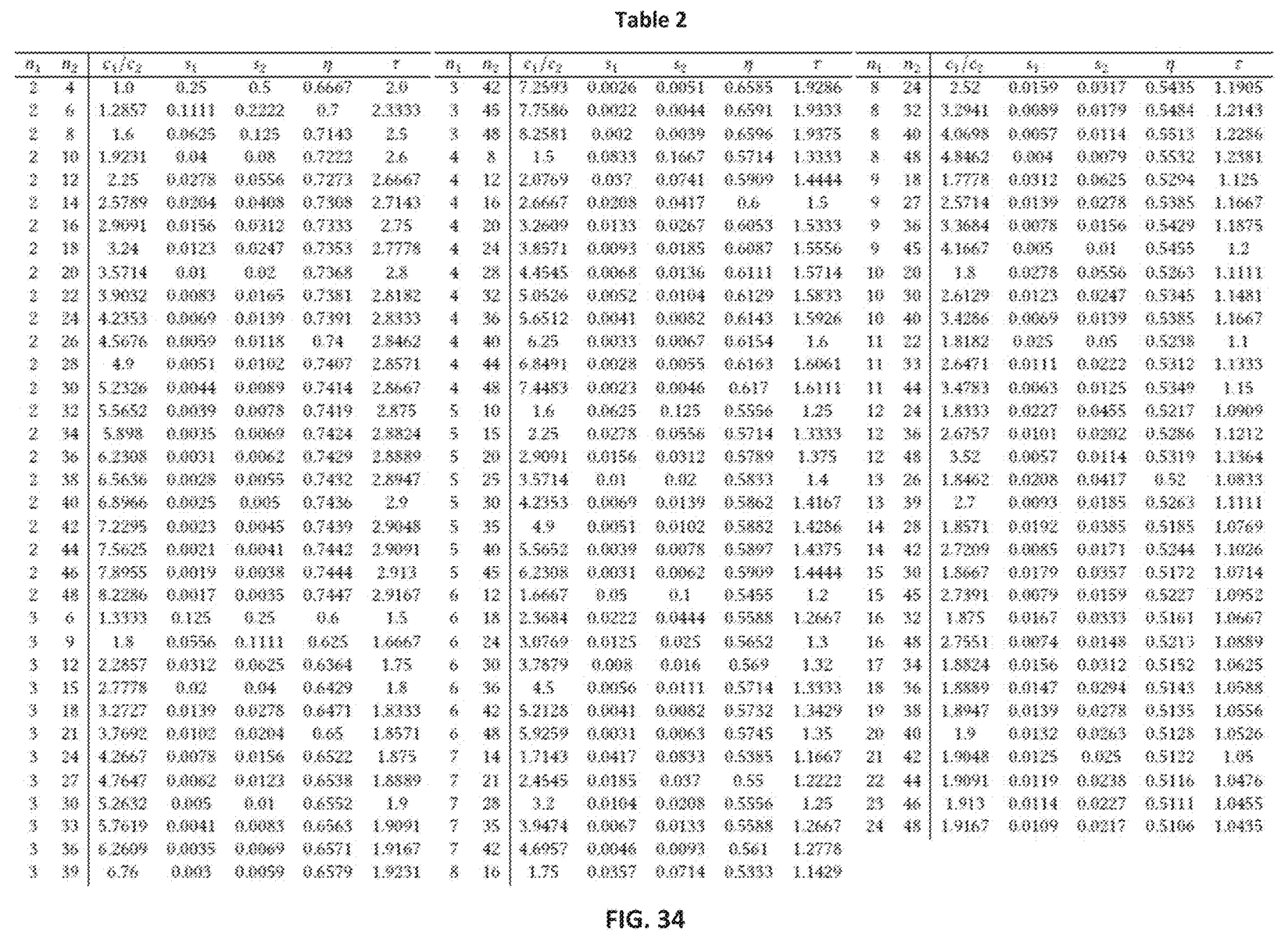

This section presents sample tables that can help network designers identify optimal designs as a function of network size and traffic pattern. Tables can be derived for any of the studied interconnects using the design equations provided herein. For the sake of illustration, we only provide two examples for the design of fat-trees for skewness $\sigma=1$ (FIG. 33, Table 1) and $\sigma=2$ (FIG. 34, Table 2). The parameters shown in this table are:
  $c_1$: capacity of spine links.
  $c_2$: capacity of leaf links.
  $r_1$: transmission rate of interpod flows.
  $r_2$: transmission rate of intrapod flows.
  $s_1$: fair share of spine links.
  $s_2$: fair share of leaf links.
  $\tau$: tapering parameter.
  $\eta$: total flow throughput divided by total link capacity. This metric can provide an estimate of how efficient the design is.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. The disclosed methods and systems can be integrated with known network management systems and methods. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for selecting a network parameter, the method comprising performing by a processor the steps of:
   obtaining expected traffic pattern for a network, the network comprising a plurality of levels of switches and corresponding links; and
   selecting a network parameter corresponding to a switch or link at a selected level based on, in part, a portion of the expected network traffic associated with that switch or link;
   wherein:
   the network comprises a folded-clos network;
   the network parameter comprises a number of spine blocks of the folded clos network; and
   selecting the number of spine blocks is further based on, in part, a radix of spine-level switches,
   wherein a radix value reduces a number of switches and cabling in the network wherein the network parameter improves a network performance and optimize performance-cost trade-off.

2. The method of claim 1, further comprising:
   determining from the expected traffic pattern skewedness of the traffic, wherein selecting the network parameter is based on, in part, the skewedness.

3. The method of claim 2, wherein selecting the network parameter is based on, in part, a tapering parameter that is based on, in part, the skewedness.

4. The method of claim 1, wherein:
   the network comprises a fat-tree network;
   the network parameter comprises capacity of links at a particular level of switches; and
   selecting the capacity of links at one level of switches is further based on, in part, capacity of links at another level of switches.

5. The method of claim 1, wherein:
   the network comprises a Dragonfly network;
   the network parameter comprises a capacity of interpod links and a capacity of intrapod links; and
   selecting the capacity of interpod links is further based on, in part, the capacity of intrapod links.

6. The method of claim 5, further comprising:
   iteratively partitioning pods in the Dragonfly network into a plurality of groups, wherein selecting the capacity of interpod links is further based on, in part, a total number of groups and a total number of pods in a last group.

7. The method of claim 1, wherein a capacity of a link at one of the plurality of levels is selected to be proportional to an expected size of flows traversing that link.

8. The method of claim 1, further comprising:
   obtaining an updated traffic pattern; and
   updating the network parameter based on, at least in part, the updated traffic pattern.

9. The method of claim 1, wherein:
the network comprises a sliced network having a plurality of virtual network slices; and
selecting the network parameter comprises selecting a corresponding network parameter of at least one network slice.

10. A system for selecting a network parameter, the system comprising:
a first processor; and
a first memory in electrical communication with the first processor, and comprising instructions that, when executed by a processing unit that comprises one or more computing units, wherein one of the one or more computing units comprises the first processor or a second processor, and wherein the processing unit is in electronic communication with a memory module that comprises the first memory or a second memory, program the processing unit to:
obtain expected traffic pattern for a network, the network comprising a plurality of levels of switches and corresponding links; and
select a network parameter corresponding to a switch or link at a selected level based on, in part, a portion of the expected network traffic associated with that switch or link;
wherein:
the network comprises a folded-clos network;
the network parameter comprises a number of spine blocks of the folded clos network; and
selecting the number of spine blocks is further based on, in part, a radix of spine-level switches,
wherein a radix value reduces a number of switches and cabling in the network wherein the network parameter improves a network performance and optimize performance-cost trade-off.

11. The system of claim 10, wherein the instructions further program the processing unit to:
determine from the expected traffic pattern skewedness of the traffic; and
select the network parameter is based on, in part, the skewedness.

12. The system of claim 10, wherein:
the network comprises a fat-tree network;
the network parameter comprises capacity of links at a particular level of switches; and
the instructions program the processing unit to select the capacity of links at one level of switches based on, in part, capacity of links at another level of switches.

13. The system of claim 10, wherein:
the network comprises a Dragonfly network;
the network parameter comprises a capacity of interpod links and a capacity of intrapod links; and
the instructions program the processing unit to select the capacity of interpod links based on, in part, the capacity of intrapod links.

14. The system of claim 10, wherein the instructions program the processing unit to select a capacity of a link at one of the plurality of levels to be proportional to an expected size of flows traversing that link.

15. The system of claim 10, wherein the instructions program the processing unit to:
obtain an updated traffic pattern; and
update the network parameter based on, at least in part, the updated traffic pattern.

16. The system of claim 10, wherein:
the network comprises a sliced network having a plurality of virtual network slices; and
to select the network parameter, the instructions program the processing unit to select a corresponding network parameter of at least one network slice.

* * * * *